United States Patent
Yu

(10) Patent No.: US 7,778,162 B2
(45) Date of Patent: Aug. 17, 2010

(54) MULTIPLE SERVICE RING OF N-RINGLET STRUCTURE BASED ON MULTIPLE FE, GE AND 10GE

(75) Inventor: Shaohua Yu, Hubei (CN)

(73) Assignee: Wuhan Fiberhome Networks Co. Ltd., Wuhan (CN)

( * ) Notice: Subject to any disclaimer, the term of this patent is extended or adjusted under 35 U.S.C. 154(b) by 930 days.

(21) Appl. No.: 10/534,211

(22) PCT Filed: Nov. 6, 2002

(86) PCT No.: PCT/CN02/00792

§ 371 (c)(1),
(2), (4) Date: Jan. 23, 2006

(87) PCT Pub. No.: WO2004/043011

PCT Pub. Date: May 21, 2004

(65) Prior Publication Data

US 2006/0224659 A1 Oct. 5, 2006

(51) Int. Cl.
*H04L 1/00* (2006.01)
*H04L 12/26* (2006.01)
*G06F 11/00* (2006.01)
(52) U.S. Cl. .................. 370/223; 370/395.65; 370/404
(58) Field of Classification Search ................ 370/401, 370/466, 469, 403, 254, 228, 476, 223, 395.65, 370/404; 709/201, 251; 398/4
See application file for complete search history.

(56) References Cited

U.S. PATENT DOCUMENTS 4,930,123 A 5/1990 Shimizu
(Continued)

FOREIGN PATENT DOCUMENTS

CN 1428959 7/2003
(Continued)

OTHER PUBLICATIONS

Action and Response History in U.S. Appl. No. 10/504,015, as retrieved from PAIR, through Mar. 23, 2009.
(Continued)

*Primary Examiner*—Ayaz R Sheikh
*Assistant Examiner*—Chuong T Ho
(74) *Attorney, Agent, or Firm*—Fish & Richardson P.C.

(57) ABSTRACT

A data transmission apparatus used in a multiple service ring includes at least two nodes coupled to at least one aggregate pipe and at least one tributary. The data transmission apparatus includes a tributary RX framer coupled to a tributary for deframing data frames received from the tributary and extracting a destination node address and a TX framer for encapsulating the destination node address and the data received from the tributary into frames of the multiple service ring and transmitting the same along an aggregate pipe to a downstream neighbor node in the ring. The data transmission apparatus also includes a RX framer for receiving and deframing data frames of the multiple service ring from a upstream neighbor node to obtain at least a destination node address and actual data, a filter for determining data frames for local node according to the destination node address, and a tributary TX framer for encapsulating the data frames for local node into tributary data frames and sending the tributary data frames to a corresponding tributary.

16 Claims, 14 Drawing Sheets

Tx and Rx Function Diagram of MSR Data Node

U.S. PATENT DOCUMENTS

| | | |
|---|---|---|
| 5,208,811 A | 5/1993 | Kashio et al. |
| 5,323,392 A | 6/1994 | Ishii et al. |
| 5,402,452 A | 3/1995 | Powell et al. |
| 5,404,380 A | 4/1995 | Powell et al. |
| 5,452,306 A | 9/1995 | Turudic et al. |
| 5,497,363 A | 3/1996 | Gingell |
| 5,524,212 A | 6/1996 | Somani et al. |
| 5,528,530 A | 6/1996 | Powell et al. |
| 5,544,161 A | 8/1996 | Bigham et al. |
| 5,548,534 A | 8/1996 | Upp |
| 5,640,512 A | 6/1997 | Czerwiec |
| 5,680,235 A | 10/1997 | Johansson |
| 5,684,799 A | 11/1997 | Bigham et al. |
| 5,719,862 A | 2/1998 | Lee et al. |
| 5,784,377 A | 7/1998 | Baydar et al. |
| 5,822,298 A | 10/1998 | Matsumoto et al. |
| 5,848,065 A * | 12/1998 | Gorshe et al. ............... 370/376 |
| 5,886,996 A | 3/1999 | Wolf |
| 5,930,237 A | 7/1999 | Horiuchi et al. |
| 6,014,708 A | 1/2000 | Klish |
| 6,041,042 A | 3/2000 | Bussiere |
| 6,041,056 A | 3/2000 | Bigham et al. |
| 6,049,550 A | 4/2000 | Baydar et al. |
| 6,097,720 A | 8/2000 | Araujo et al. |
| 6,134,238 A * | 10/2000 | Noh ...................... 370/395.51 |
| 6,151,641 A | 11/2000 | Herbert |
| 6,163,527 A | 12/2000 | Ester et al. |
| 6,188,699 B1 | 2/2001 | Lang et al. |
| 6,256,292 B1 | 7/2001 | Ellis et al. |
| 6,301,254 B1 | 10/2001 | Chan et al. |
| 6,241,318 B1 | 6/2002 | Coltro |
| 6,414,966 B1 | 7/2002 | Kulkarni et al. |
| 6,487,177 B1 | 11/2002 | Weston-Dawkes |
| 6,496,519 B1 | 12/2002 | Russell et al. |
| 6,542,516 B1 | 4/2003 | Vialen et al. |
| 6,584,118 B1 | 6/2003 | Russell et al. |
| 6,603,770 B2 | 8/2003 | Lin et al. |
| 6,657,969 B1 | 12/2003 | Neuendorff et al. |
| 6,658,013 B1 * | 12/2003 | de Boer et al. ............... 370/404 |
| 6,690,679 B1 | 2/2004 | Turunen et al. |
| 6,707,789 B1 * | 3/2004 | Arslan et al. ................ 370/218 |
| 6,731,876 B1 | 5/2004 | Okamoto et al. |
| 6,757,243 B1 | 6/2004 | Chaudhuri et al. |
| 6,765,928 B1 | 7/2004 | Sethuram et al. |
| 6,795,446 B2 | 9/2004 | Matsumoto et al. |
| 6,804,248 B1 | 10/2004 | Tomar et al. |
| 6,888,791 B1 | 5/2005 | Ellis et al. |
| 6,961,348 B2 * | 11/2005 | Yu ............................. 370/466 |
| 6,990,065 B1 | 1/2006 | Chaudhuri et al. |
| 6,993,047 B1 | 1/2006 | Nigam et al. |
| 7,016,379 B2 * | 3/2006 | Falkenstein et al. ......... 370/535 |
| 7,031,341 B2 | 4/2006 | Yu |
| 7,042,835 B1 * | 5/2006 | de Boer et al. ............... 370/222 |
| 7,068,773 B2 | 6/2006 | McCann et al. |
| 7,079,555 B2 | 7/2006 | Baydar et al. |
| 7,145,882 B2 * | 12/2006 | Limaye et al. ............... 370/258 |
| 7,277,443 B2 | 10/2007 | Goode et al. |
| 7,289,428 B2 | 10/2007 | Chow et al. |
| 7,382,789 B2 * | 6/2008 | Yu ............................. 370/401 |
| 7,428,211 B2 * | 9/2008 | Yu ............................. 370/223 |
| 7,486,614 B2 * | 2/2009 | Yu ............................. 370/223 |
| 7,554,904 B1 | 6/2009 | Chaudhuri et al. |
| 2001/0012288 A1 | 8/2001 | Yu |
| 2001/0043603 A1 | 11/2001 | Yu |
| 2002/0080445 A1 * | 6/2002 | Falkenstein et al. ......... 359/127 |
| 2002/0085563 A1 | 7/2002 | Mesh et al. |
| 2002/0091862 A1 | 7/2002 | Ahn |
| 2003/0189895 A1 * | 10/2003 | Limaye et al. ............... 370/216 |
| 2004/0105453 A1 | 6/2004 | Shpak et al. |
| 2004/0184450 A1 | 9/2004 | Omran |
| 2004/0252688 A1 | 12/2004 | May et al. |
| 2005/0063396 A1 | 3/2005 | Yu |
| 2006/0007854 A1 | 1/2006 | Yu |
| 2006/0126651 A1 | 6/2006 | Yu |
| 2006/0224659 A1 | 10/2006 | Yu |
| 2007/0014573 A1 | 1/2007 | Wei et al. |

FOREIGN PATENT DOCUMENTS

| | | |
|---|---|---|
| EP | 0981260 | 2/2000 |
| EP | 1063803 A1 | 12/2000 |
| EP | 1076468 | 2/2001 |
| EP | 1083696 | 3/2001 |
| EP | 1083706 | 3/2001 |
| EP | 1093266 A2 | 4/2001 |
| EP | 1158831 | 11/2001 |
| JP | 11-004276 | 1/1999 |
| JP | 11-252108 | 9/1999 |
| WO | WO95/28779 | 10/1995 |
| WO | WO97/26737 | 7/1997 |
| WO | WO99/04340 | 6/1999 |
| WO | WO99/52237 | 10/1999 |
| WO | WO01/06728 | 1/2001 |
| WO | WO01/08356 | 2/2001 |
| WO | WO01/84875 | 11/2001 |
| WO | WO03/067843 | 8/2003 |
| WO | WO2004/008708 | 1/2004 |
| WO | WO2004/008710 | 1/2004 |
| WO | WO2004/043011 | 5/2004 |
| WO | WO2004/047374 | 6/2004 |
| WO | WO2005/022782 | 3/2005 |

OTHER PUBLICATIONS

Action and Response History in U.S. Appl. No. 10/521,999, as retrieved from PAIR, through Mar. 23, 2009.
Action and Response History in U.S. Appl. No. 10/535,473, as retrieved from PAIR, through Mar. 23, 2009.
Action and Response History in U.S. Appl. No. 09/804,144, as retrieved from PAIR, through Mar. 23, 2009.
Action and Response History in U.S. Appl. No. 09/817,269, as retrieved from PAIR, through Jun. 18, 2009.
Widjaja et al., "Communications Networks: Fundamental Concepts and Key Architectures", McGraw-Hill, p. 200 (2000).
Yu, "Draft New Recommendation X.86 on Ethernet over LAPS", Int'l Telecomm. Union, (Apr. 2000).
Ayhay et al., "An Introduction to Resilient Packet Ring Technology", Resilient Packet Ring Alliance, (Oct. 2001).
Lu et al., "IP Over WDM Metropolitan Networks", Study on Optical Communications, No. 107, pp. 23-31 (2001).
Darwin, "Proposed Draft Standard for Information Technology Telecommunications and Information Exchange Between Systems . . . Specifications", Submitted to IEEE 802.17 as the Proposal, Darwin, Draft 0.3, (Jan. 14, 2002).
Simpson, RFC 1662, (Jul. 1994), pp. 1-19.
Li et al., Discussion on Protection of Dual Node Interconnection in Metro/Local Transmitting Networks:, Fiberhome Telecommunications Co., Ltd., Wuhan 430074, Telecom Engineering Technics and Standardization, pp. 46-48 (May 2003). [English Abstract].
International Search Report in Application No. PCT/CN02/000792, dated Jun. 5, 2003.
International Search Report in Application No. PCT/CN03/00735, dated Jan. 1, 2004.
ITU-T X.86/Y.1323 Recommendation, Amendment 1: Using Ethernet Flow Control as Rate Limiting / Ethernet Over LAPS, (Apr. 2002).
ITU-T X.85/Y.1321 Recommendation, IP Over SDH Using LAPS, (Mar. 2001).
ITU-T X.86/Y.1323 Recommendation, Ethernet Over LAPS, (Feb. 2001).
International Search Report in Application No. PCT/CN02/00066, dated Dec. 26, 2002.
International Preliminary Examination Report in Application No. PCT/CN02/00066, dated Oct. 25, 2003.

International Preliminary Examination Report in Application No. PCT/CN2003/000540, dated Sep. 20, 2004.
International Search Report in Application No. PCT/CN2003/000540, dated Sep. 4, 2003.
International Search Report in Application No. PCT/CN02/00503, dated Feb. 13, 2003.
International Search Report in Application No. PCT/CN2002/000816, dated Aug. 7, 2003.
International Search Report in Application No. PCT/CN00/00211, dated Nov. 9, 2000.
ANSI TI.105 -1991, "Digital Hierarchy - Optical Interface Rates and Formats Specification", American National Standard for Telecommunications, 1991.
EN 300 429: "Digital Video Broadcasting (DVB); Framing structure, channel coding and modulation for cable systems". (1998).
EN 300 814: "Digital Video Broadcasting (DVB); DVB interfaces to Synchronous Digital Hierarchy (SDH) networks". (1998).
EN 500 83: "Cabled distribution systems for television, sound and interactive multimedia signals; Part 9: Interfaces for CATV/SMATV headends and similar professional equipment for DVB/MPEG2 transport streams" (CENELEC), (1998).
ETR 290: ETR 290: "Digital Video Broadcasting (DVB); Measurement guidelines for DVB systems", (1997).
Hiatt, F., "SONET: Synchronous Optical Networking, Technical Overview", Lucent Technologies / Bell Labs Innovations (Jan. 1999).
IEEE 802.17, "Resilient Packet Ring Access Method & Physical Layer Specifications", Draft 802.17/D2.5 (2003).
IEEE 802.3 CSMA/CD Access Method and Physical Layer Specifications, (1998).
IEEE 802.3 CSMA/CD Access Method and Physical Layer Specifications, (2002).
ITU-T Rec. X.200 / ISO/IEC 7498-1, "Information technology - Open System Interconnection - Basic reference: The basic model", (1994).
ITU-T Rec. X.211 / ISO/IEC 10022 , "Information technology—Open Systems Interconnection - Physical service definition", (1995).
ITU-T Rec. X.212 / ISO/IEC 8886, "Information technology - Open Systems Interconnection - Data link service definition", (1995).
ITU-T Recommendation I.321, "B-ISDN protocol reference model and its application", (1991).
ITU-T Recommendation I.361, "B-ISDN ATM Layer specification", (1999).
ITU-T Recommendation G.702, "Digital Hierarchy Bitrates", (1988).
ITU-T Recommendation G.703, "Physical / Electrical Characteristics of Hierarchical Digital Interfaces", (2001).
ITU-T Recommendation G.707, "Network node interface for the synchronous digital hierarchy (SDH)", (1996).
ITU-T Recommendation G.707, "Network node interface for the synchronous digital hierarchy (SDH)", (2000).
ITU-T Recommendation G.708, "Sub STM-0 network node interface for the synchronous digital hierarchy (SDH)", (1999).
ITU-T Recommendation G.711, "Pulse Code Modulation (PCM) of Voice Frequencies" (1988).
ITU-T Recommendation G.783, "Transmission Systems and Media, Digital Systems and Networks", (2000).
ITU-T Recommendation G.805 "Generic Functional Architecture of Transport Networks", (2000).
ITU-T Recommendation G.823, "The Control of Jitter and Wander within Digital Networks Which Are Based on the 2048 kbits/s Hierachy", (2000).
ITU-T Recommendation G.824, "Control of Jitter and Wander Within Digital Networks Which are Based on the 1544 kbit/s Hierarchy" (1993).
ITU-T Recommendation G.957, "Optical interfaces for equipments and systems relating to the synchronous digital hierarchy", (1995).
ITU-T Recommendation H.261, "Video codec for audiovisual services at p x 64kbit/s", (1993).
ITU-T Recommendation H.262, "Information technology—Generic coding of moving pictures and associated audio information: Video Common text with ISO/IEC", (1995).
ITU-T Standard G.841, "Transmission Systems and Media, Digital Systems and Networks", (1998).
ITU-T Standard G.842, "Transmission Systems and Media, Digital Systems and Networks", (1997).
ITU-Telecommunication Standardization Sector, Study Group 15, Proposal for Amendments to the text of ITU-T Draft Recommendation H.310, Document No. AVC-0883 (1996).
ITU-Telecommunication Standardization Sector, Study Group 17, Contribution 21 (COM 17-21-E), (2002).
ITU-Telecommunication Standardization Sector, Study Group 7, Delayed Contribution D 191/3; Beijing, China, Sep. 14-25, 1998, Shaohua Yu, "The IP-Over-SKDH/SONET Model".
ITU-Telecommunication Standardization Sector, Study Group 7, Temporary Document 3147/Rev. 3, Geneva, Jun. 7-18, 1999, Shaohua Yu, "IP Over-SDH Using LAPS".; Beijing, China, Sep. 14-25, 1998, Shaohua Yu, "The IP-Over-SKDH/SONET Model".
RFC 1548, "The Point-to-Point Protocol", (1993).
RFC 1570, "PPP LCP Extensions", (1994).
RFC 1619, "PPP Over SONET/SDH", (1994).
RFC 1661, "The Point-to-Point Protocol", (1994).
RFC 1662, "PPP in HDLC-like Framing", W. Simpson, Internet Engineering Task Force, (1994).
RFC 1717, "The PPP Multilink Protocol (MP)" (1994).
RFC 2225, "Classical IP and ARP over ATM", (1998).
RFC 2460, "Internet Protocol, V.6", (1998).
RFC 2615, "PPP over SONET/SDH", A. Malis, Internet Engineering Task Force, (1999).
Yue, W. et al., "MSPPs Can Deliver Digital Video Over Existing Networks", Lightwave (Dec. 2003).
ITU-T I.363.1 "B-ISDN ATM Adaptation Layer Specification: Type 1 AAL" (1996).
Simpson, RFC 1662, (Jul. 1994), pp. 1-19.

* cited by examiner

The Topology of Multiple Services Ring

Tx and Rx Function Diagram of MSR Data Node

Generic Protocol Stack of MSR

Protocol Stack of IP over LEP in GE and 10GE based Aggregate Pipe, it will be used to Layer 3 forwarding packet Generic Frame Format of MSR for the working ring Generic Format of CS & NM Frames Expressions of TN ID and TCCR ID The TDM Service Channel along MSR

THE TDM SERVICE CHANNEL OVER BIT FE/GE/10GE

Expressions of 1+1 and 1:1 tributary protection parameters

Expressions of 1:N tributary protection parameter

The Single Fibre Ring of MSR

A MSR Topology, Link-type with Adding and Dropping Tributary Services

A MSR Topology, Broadcast Connection to DVB Application

A MSR Topology, Pseudo-mesh Connection

The Physical Architecture of a MSR node (Out-of-band CS&NM Bus)

The Physical Architecture of a MSR node (in-band CS&NM Bus)

Layout of system equipment of a MSR node

US 7,778,162 B2

MULTIPLE SERVICE RING OF N-RINGLET STRUCTURE BASED ON MULTIPLE FE, GE AND 10GE

FIELD OF THE INVENTION

The present invention relates to Link Encapsulation Protocol (LEP) used to Multiple Services Ring (MSR) based on FE/GE/10GE aggregates, specifically, relates to data transmission apparatus and method used in Multiple Service Ring of N-ringlet structure based on multiple FE, GE and 10GE.

BACKGROUND ART

The present invention is further improvement related to MSR after the two PCT international applications of the same applicant of PCT/CN02/00066 filed on Feb. 6, 2002 and PCT/CN02/00503 filed on Jul. 17, 2002. Therefore, the contents of the two previous applications are incorporated in the present application.

The expansion of business and personal use of data network services are driving the need to deploy data services infrastructure facilities with connection oriented and pre-plan method. The dynamic bandwidth allocation and differentiated services over an aggregate pipe, tributary based bandwidth management, security function, protection, multicast, performance monitoring and their applications in the different topologies are the basic requirements of carrier class. Therefore, the development of MSR data network, LEP and related application in this Patent needs at least to provide the following capabilities:

(1) The protocol encapsulation and transport of G.702 PDH circuit—Synchronous and asynchronous circuit transport, Video signal, Voiceband signal, Digital channel supported by 64 kbit/s-based ISDN etc over a two-fibre ring, a single fibre ring, a link-type and broadcast topology of fibres.
(2) Service (or tributary) based protection of 1+1, 1:1, and 1:N models within 50 ms.
(3) Service or tributary based multicast and station-based multicast and broadcast.
(4) Bandwidth limitation of service (or tributary) based with symmetry and asymmetry.
(5) Tributary merging with symmetry and asymmetry.
(6) Line-speed filtering of tributary based.
(7) Tributary based performance monitoring in 15-minute and 24-hour.
(8) Mirroring of tributary.
(9) Frame based transparent PPPoE and PPPoA transport from access to backbone along a MSR ring or other topologies, in order to simplify accounting mechanism (e.g. Radius), reduce maintenance work, and improve latency variation (compared to Layer 2 and Layer 3 switch) in Access network application.

SUMMARY OF THE INVENTION

The object of the present invention is to provide a packet-based transport model to multiple services and multiple topologies for continuation and extension of ITU-T Recommendation X.85/Y.1321 and X.86/Y.1323. Continued compatibility with all existing requirements and standards from ITU-T and other organizations is required.

To achieve the above object, the present invention provides a data transmission apparatus used in a multiple service ring including at least two nodes coupled to at least one aggregate pipe and at least one tributary, said apparatus comprising: a tributary RX framer coupled to a tributary for deframing data frames received from said tributary and extracting a destination node address; a TX framer for encapsulating the destination node address and the data received from the tributary into frames of the multiple service ring and transmitting the same along an aggregate pipe to a downstream neighbor node in the ring; a RX framer for receiving and deframing data frames of the multiple service ring from a upstream neighbor node along an aggregate pipe to obtain at least a destination node address and actual data; filtering means for determining data frames for local node according to the destination node address, and forwarding the other frames to said TX framer so as to forward the other frames to a next node; a tributary TX framer for encapsulating said data frames for local node into tributary data frames and sending the tributary data frames to a corresponding tributary. Each aggregate pipe may comprise a N-ring structure consisting of N−M unidirectional ringlets and M unidirectional counter-rotating ringlets, where N and M are integers and $1 \leq M < N$. And said apparatus further comprises a ring management unit for controlling the use of the ringlets in one aggregate pipe, including assigning a specific (n−1)-th ringlet for transporting data packets in said (n−1)-th ringlet in unidirectional direction and a n-th ringlet for transporting control packets in said n-th ringlet in the opposite direction, where $1 < n \leq N$.

The present invention further provides a data transmission method used in a multiple service ring including at least two nodes coupled to at least one aggregate pipe and at least one tributary, said method comprising the steps of: for data frames from a tributary: receiving and deframing data frames from said tributary and extracting a destination node address; and encapsulating the destination node address and the data received from the tributary into frames of the multiple service ring and transmitting the same along an aggregate pipe to a downstream neighbor node in the ring; and for data frames from a upstream neighbor node along an aggregate pipe: receiving and deframing data frames of the multiple service ring from the upstream neighbor node along the aggregate pipe to obtain at least a destination node address and actual data; determining data frames for local node according to the destination node address, and forwarding the other frames to a next node; and encapsulating said data frames for local node into tributary data frames and sending the tributary data frames to a corresponding tributary. Each aggregate pipe may comprise a N-ring structure consisting of N−M unidirectional ringlets and M unidirectional counter-rotating ringlets, where N and M are integers and $1 \leq M < N$. The data transmission method may further comprise the step of controlling the use of the ringlets in one aggregate pipe, including assigning a specific (n−1)-th ringlet for transporting data packets in said (n−1)-th ringlet in unidirectional direction and a n-th ringlet for transporting control packets in said n-th ringlet in the opposite direction, where $1 < n \leq N$.

The present invention presents Link Encapsulation Protocol (LEP) used to Multiple Services Ring (MSR) based on FE/GE/10GE aggregates. LEP used to MSR is provided for specific use on a N-ring structure (N=1, 2, 4, 8, 16, 32, 64, 128 . . . , ) consisting of the unidirectional (N−M) ringlets and M ($1 \leq M < N$) unidirectional counter-rotating ringlets as illustrated in FIG. 1. Normally, a specific (N−1) ringlet transports its data packets into (N−1)-ringlet in unidirectional direction and control packets into N-ringlet in the opposite direction. Analogically, a specific N-ringlet transports its data packets into N-ringlet in unidirectional direction and control packets into FWR in the opposite direction (if N is even) or in the same direction (if N is odd). Similarly, N-ringlet as a control channel of (N−1)-ringlet is also set default to protection channel of (N−1)-ringlet in the case of fibre facility failure or signal degradation of (N−1)-ringlet. In the case of fibre facility failure or signal degradation, tributary services over N-ring structure are protected automatically each other within 50 ms if the protection path from a ringlet to other counter-rotating ringlet is set in a node. Architecturally, single-ring, the link, broadcast and pseudo-mesh topologies are supported also. Primary optical transport mechanism is defined to leverage FE/GE/10GE as an aggregate pipe. The applications used to LEP are defined to support tributary transparent transport with various existing data networks and services (e. g. DVB, FR, ATM, ISDN, DDN, G.702 etc), tributary based bandwidth management with symmetry and asymmetry (e.g. bandwidth limitation and tributary merging), tributary based 1+1, 1:1 and 1:N protection within 50 ms, tributary based multicast of service, tributary based security application (e.g. line-speed filtering), tributary based performance monitoring in the 15-minute and 24-hour, and is also defined to support forwarding of the MSR data link frames (also being a tributary) similar to functionality found in a more complex routing data system. LEP is connection based and pre-plan solution, tributary bandwidth is programmable by network management system, or initiated by end user according to customer needs and payment. The way of the bandwidth allocation is changed from the fixed to dynamic. This patent is a continuation and extension of multiple services transport platform or multiple services provisioning platform (one method is described in ITU-T Recommendation X.85/Y.1321 and X.86/Y.1323) to multiple topologies and multiple services transport of packet based.

DETAILED DESCRIPTION OF THE PREFERRED EMBODIMENT

Figure 1:
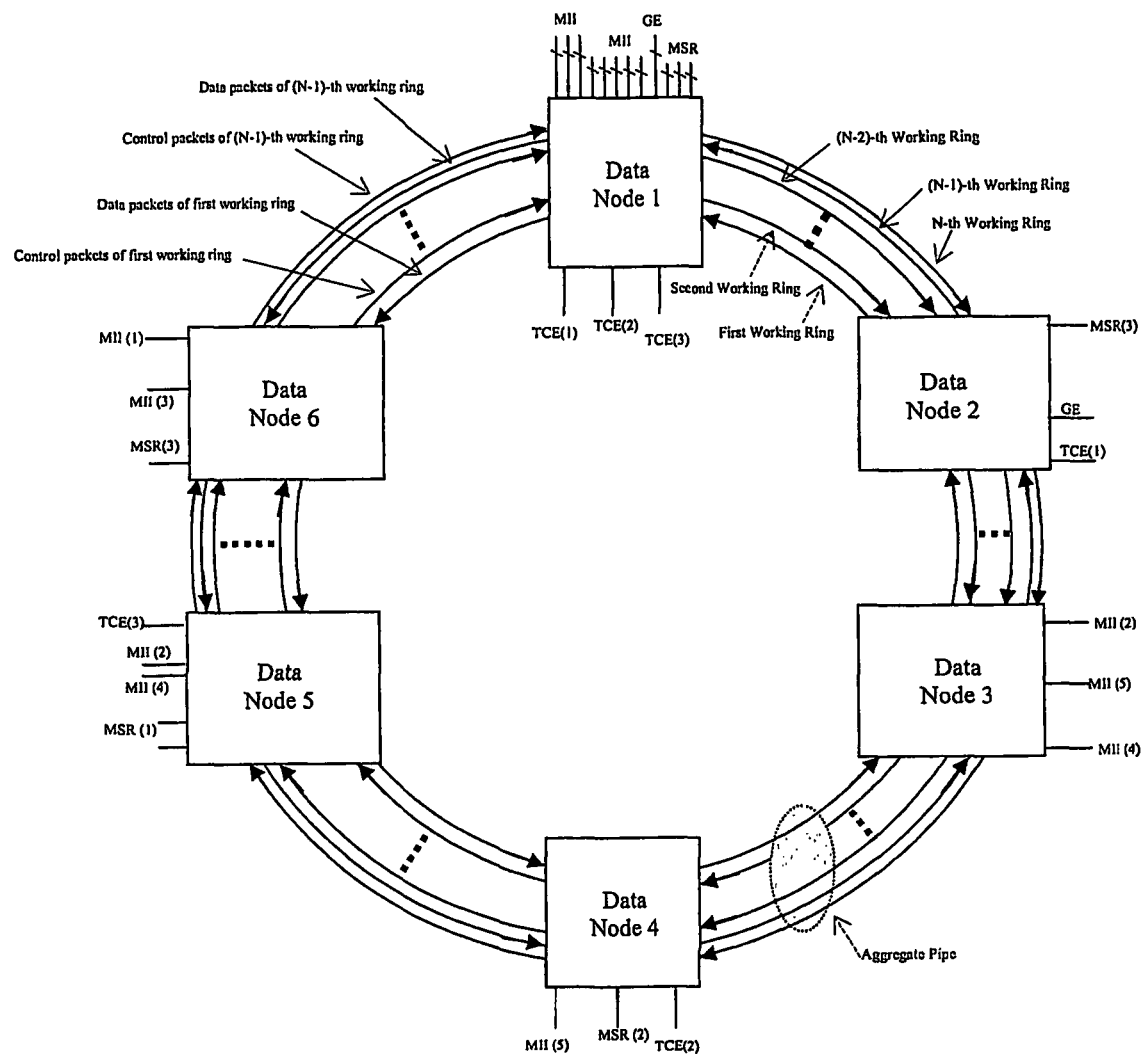
FIG. 1 illustrates the Topology of Multiple Services Ring according to one embodiment of the invention.

The key words related to the invention are given as follows: N-ringlet structure, aggregate, FE, GE, 10GE, tributary, TDM Circuit Emulation, bandwidth management, 1+1, 1:1 and 1:N protection within 50 ms, multicast of service, packet based performance monitoring, single-ring, the link, broadcast and pseudo-mesh topologies, line-speed filtering 1 Scope This Patent presents Link Encapsulation Protocol (LEP) used to Multiple Services Ring (MSR) based on FE/GE/10GE aggregates in the way of pre-plan and connection based. LEP is provided for specific use on a N-ring structure (N=1, 2, 3, 4, 5, ..., ) consisting of the unidirectional (N−M) ringlets and M ($1 \leq M < N$) unidirectional counter-rotating ringlets as illustrated in FIG. 1. It is recommended that N=4,8,16,32,64,128, .... Normally, a specific (N−1) ringlet transports its data packets into (N−1)-ringlet in unidirectional direction and control packets into N-ringlet in the opposite direction. Analogically, a specific N-ringlet transports its data packets into N-ringlet in unidirectional direction and control packets into FWR in the opposite direction (if N is even) or in the same direction (if N is odd). Similarly, N-ringlet as a control channel of (N−1)-ringlet is also set default to protection channel of (N−1)-ringlet in the case of fibre facility failure or signal degradation of (N−1)-ringlet. In the case of fibre facility failure or signal degradation, tributary services over N-ring structure are protected automatically each other within 50 ms if the protection path from a ringlet to other counter-rotating ringlet is set in a node. Architecturally, single-ring, the link, broadcast and pseudo-mesh topologies are supported also. The service tributary interfaces of MSR node are defined to support TDM Circuit Emulation. LEP supports tributary based 1+1, 1:1 and 1:N protection within 50 ms, and tributary based multicast, tributary bandwidth limitation with symmetry and asymmetry, tributary merging, tributary Line-Speed Filtering of packet, tributary Mirroring, tributary performance monitoring in the 15-minute and 24-hour and is also defined to support forwarding of the MSR data link frame (also being a tributary) similar to functionality found in a more complex routing data system. MSR-LEP provides a packet-based transport model to multiple services and multiple topologies for continuation and extension of ITU-T Recommendation X.85/Y.1321 and X.86/Y.1323.

This patent will be used to Metro Area Network, concentrator of telecom and datacom, enterprise and campus network, and other private network. The related network may not or may interface to coarse wavelength division multiplex (CVDM) or dense wavelength division multiplex (DWDM) equipments.

2 References

The following ITU-T Recommendations, and other references contain provisions which, through reference in this text, constitute provisions of this patent. At the time of publication, the editions indicated were valid. All references are subject to revision: all users of this patent are therefore encouraged to investigate the possibility of applying the most recent edition of the references and listed below.

2.1 ITU-T Recommendations

[1] ITU-T Recommendation X.85/Y.1321, IP over SDH using LAPS.
[2] ITU-T Recommendation X.86/Y.1323, Ethernet over LAPS.
[3] ITU-T Recommendation X.211 (1995)|ISO/IEC 10022 (1996), Information technology—Open Systems Interconnection—Physical service definition.
[4] ITU-T Recommendation X.212 (1995)|ISO/IEC 8886 (1996), Information technology—Open Systems Interconnection—Data link service definition.
[5] ITU-T Recommendation X.200 (1994)|ISO/IEC 7498-1 (1994), Information technology—Open System Interconnection—Basic reference model: The basic model.
[6] ITU-T Recommendation I.363.1 (1996), B-ISDN ATM Adaptation Layer specification: Type 1 AAL 2.2 IEEE Specifications

[7] IEEE 802.3 CSMA/CD Access Method and Physical Layer Specifications, 2002 Edition.

3 Definitions

For the purposes of this patent, the following definitions apply:

3.1 Aggregate Pipe: a physical connection of two adjacent nodes. Aggregate pipe is a channel of FE/GE/10GE. It is recommended that the same bandwidth of Aggregate Pipe in different span ) along the same ring be used. Aggregate pipe can be 10/100 Mb/s auto-sense Ethernet, Fast Ethernet, Gigabit Ethernet, 10 gigabit Ethernet (10GBASE-R, 10GBASE-W, 10GBASE-X).

3.2 Control Signaling Frame: a frame used to tributary connection establishment, topology discovery, Layer 2 protection switching of manual switch or forced switch etc in a node.

3.3 CT_Request Frame: a frame used to send a configuration table request from Node A to Node B along a MSR ring.

3.4 CT_Response Frame: a frame used to send a configuration table response from Node B to Node A along a MSR ring.

3.5 Configuration Table (CT): a mapping table reflecting the actual value of TT and TN in a node and TCCR between nodes on the MSR ring during engineering operation or project installation phase.

3.6 Configuration Table Inquiry (CTI): a function to get CT from a node. CT_Request frame with a CTI parameter reflecting changing part of TCCR of a node on MSR ring is sent to other nodes (called one of them as Node B) by unicast/multicast/broadcast mode from a node (called Node A, e.g. Central station in the most case) by network management interface during normal engineering operation or project installation phase. All nodes received CT_Request frame with a CTI parameter will give a point-to-point response by CT_Response frame with a CTI parameter reflecting actual configuration table of the local node on MSR ring to Node A.

3.7 Configuration Updating Table (CUT): a mapping table reflecting the available value modification of TT and TN in a node and TCCR between nodes on the MSR ring during engineering operation or project installation phase. The incorrect ICT will lead to fault of Tributary on MSR ring. CT_Request frame with an CUT parameter reflecting changed part of TCCR of all node on MSR ring is sent to other nodes by broadcast mode from a node (e.g. Central station in the most case) by network management interface during normal engineering operation or project installation phase. All nodes received CT_Request frame will build corresponding mapping relations of TCCR in the local node and give a point-to-point response by CT_Response frame to that node sending CT_Request frame. After getting CT_Response frame, that node sourcing CT_Request frame issues a CT_Confirm frame to that remote node sending CT_Response frame.

3.8 First Working Ring (FWR): a first outer ring of N-ring structure (N=1, 2, 3, 4, 5, . . . ). Normally, it is ringlet and both data and control packets are sent in one direction. In the case of NWR fibre facility or node failure, tributary services over N-ring structure are protected automatically each other within 50 ms if the protection path from a ringlet to other counter-rotating ringlet is set in a node.

3.9 Forced Switch: operator does by network management or software debug facility, perform L2PS on the target span. Operational priority is higher than Manual Switching.

3.10 FWR-Fibre-Cut: a parameter of L2PS_Request Frame, used to stand for status indication of single fibre cut on FWR.

3.11 Initial Configuration Table (ICT): a mapping table reflecting the initial and available value of TT and TN in a node and TCCR between nodes on the MSR ring during engineering installation or project installation phase. The ICT must be pre-installed before MSR engineering operation or project installation phase. The incorrect ICT will lead to fault of Tributary services on MSR ring. CT_Request frame with an ICT parameter reflecting initial TCCR of all nodes on MSR ring is sent to other nodes by broadcast mode from a node (e.g. Central station in the most case) by network management interface during initial engineering operation or project installation phase. All nodes received CT_Request frame will build corresponding mapping relations of TCCR in the local node and give a point-to-point response by CT_Response frame to that node sending CT_Request frame. After getting CT_Response frame, that node sourcing CT_Request frame issues a CT_Confirm frame to that remote node sending CT_Response frame.

3.12 L2 Protection Switching (L2PS): a powerful self-healing feature that allows to recovery from fibre facility or node failure within 50 ms. Analogous to the K1/K2 protocol mechanism that SONET/SDH ring does. L2PS entity in a node detects link status. If neither Inter-frame Gap of MAC nor MAC frame is received by a node in Rx direction within 20 ms (its value is programmable) from aggregate pipe, or if fibre facility or a node is failure (e.g. PSD or PSF), two nodes on failure span will enter L2PS State. This function is only used in the case of MSR ring (dual ring).

3.13 Layer 3 Forwarding Packet: a packet used to forward data packet in a node. This packet is different from those packets of reaching a Tributary in a node, is also different from network management frames and control signalling frames. Logically, a node can be treated as a router of performing Layer 3 forwarding when a Layer 3 forwarding Packet is forwarded according to routing table and routing protocols of Ipv4/6 in a node from the node to other node along the MSR.

3.14 L2PS_Request Frame: a frame used to send a Manual Switch or Forced Switch request from Node A to two adjacent nodes (Node B and C) of targeted span or to two adjacent nodes (Node B and C) of failure node.

3.15 L2PS State: If a node receives neither Inter-frame Gap of MAC nor MAC frame within 20 ms (its value is programmable) from aggregate pipe, or if fibre facility or a node is failure (e.g. PSD or PSF), two nodes on failure span will enter L2PS State, if the L2PS function is set. The L2PS function is set to off when a single ring, link or broadcast topology is applied.

When a node enters L2PS State, forwarding means that received frame from a side of node will be forwarded to same side of this node (that is, received frame from westward on FWR will be forwarded to westward on the counter-rotating N-th ring.). It does not look like a node in Normal State, forwarding means that received frame from westward on FWR will be forwarded to eastward on N-th ring.

3.16 Manual Switch: operator does by network management or software debugging facility; perform L2PS on the target span.

3.17 Multiple Services Ring (MSR): FIG. 1 illustrates the Topology of Multiple Services Ring according to one embodiment of the invention.

A N-ring structure (N=1, 2, 3, 4, 5, . . . , ) consisting of the unidirectional (N−M) ringlets and M ($1 \leq M < N$) unidirectional counter-ro ringlets as illustrated in FIG. 1. Normally, a specific (N−1) ringlet transports its data packets into (N−1) ringlet in unidirectional direction and control packets into N ringlet in the opposite direction. In the case of fibre facility failure or signal degradation, tributary services over N-ring structure are protected automatically each other within 50 ms if the protection path from a ringlet to other counter-rotating ringlet is set in a node. Architecturally, single-ring, the link, broadcast and pseudo-mesh topologies are supported also. Each node could add and drop one or more independent tributary. MSR supports multiple nodes transmit simultaneously and traffic engineering. A node can be inserted or removed online from the MSR ring while other protected services in the working channel will be operated normally without packet loss and service loss along a MSR ring in the case of one ring being set to standby of any other single ring.

3.18 MSR Broadcast: a frame transmitted from a node along MSR ring can be sent to all other nodes along MSR.

3.19 MSR Filter Unit: a filtering and checking function unit for NA and TTL. All frames reaching to the MSR filter Unit will be sent first to a buffer in the Node. The MSR data node will check frame TTL and NA and perform XOR function with local NA. This frame will be taken away if TTL is zero. If its NA is match, those frames reaching destination will not be sent to neighbour (except for multicast and broadcast frames) along the same single ring. Otherwise, those mismatched frame will go to neighbour directly by schedule unit without any processing after decrementing TTL field.

3.20 MSR Multicast: a frame transmitted from a node can be sent to several different nodes along one Working Ring by using MSR-LEP.

3.21 MSR Data Node: a network node that has an eastward Rx, an eastward Tx, a westward Rx and a westward Tx Aggregate Pipe connections along MSR ring, and one or more adding and dropping independent tributaries. It also has functions of receiving, transmitting and forwarding of network management frame, control signalling and data frame in a Node. The different connection configuration is applied for the different topologies.

3.22 MSR-LEP: a data link protocol between MAC/TCE (or PPP/Ipv4/Ipv6) frame (or packet) and the physical layer of aggregate pipe, used to communication between different nodes on the MSR. The MSR-LEP does operate by sending both data frame and the associated network management/signalling frames in a single ring.

3.23 MSR-LEP Rx Processor: a set of functions used to MSR-LEP processing in Rx direction. It includes Rx Filter Unit, discrimination of multicast/broadcast, TT/TN value and other associated MSR-LEP protocol processing.

3.24 MSR-LEP Tx Processor: a set of functions used to MSR-LEP protocol processing in Tx direction. It includes Tx schedule unit, functions of determination of NA, TTL, TT, TN, FCS, multicast/broadcast. The other associated MSR-LEP protocol processing is also included.

3.25 MSR Schedule Unit: a control function for transmitted frame in a node according to the priority level of forwarded frames from upstream node, multicast/broadcast frames and transmitted frame from the local station. If there are several frames to be sent in a node at the same time, the schedule unit will check priority of frame and decide which frame will go first to the downstream along this ring.

3.26 N_ct: a count of retransmission used to Configuration Table Operation. All nodes on a ring will wait to be assigned ICT during engineering installation phase. After issuing CT_Request frame, Node A will automatically send CT_Request frame again after retransmit Timer_ct (it is programmable) if Node A does not receive corresponding CT_Response frame. It is believed that Node B is not reachable after N times of retransmission (N_ct is programmable also). N_ct is also used by CUT operation.

3.27 Network Management Frame: a frame used to performance and fault monitoring, node configuration management etc along a MSR ring or other different topologies.

3.28 Node Address (NA): an address of Node Link on the MSR ring. NA is a local address and has local meaning only along the MSR ring or other different topologies. It contains 4 octets. Each bit (binary "0" or "1") corresponds to a node for any single ring. For example, the binary "00100000 00000000 00000000 00000000" stands for the $3^{rd}$ Node Address (station), the binary "00000100 00000000 00000000 00000000" stands for the $6^{th}$ Node Address (station) (refer to as FIG. 1). You may also use binary "00000010 00000000 00000000 00000000" to stand for 7th Node Address of new insertion and the actual number location of the $7^{th}$ Node Address may be corresponded to middle position between Station 1 and Station 2 shown in FIG. 1 since the MSR supports online node insertion. All Node Address must be leftward alignment and be pre-installed by (NVROM) before operation. The maximum node number of the MSR Ring is 32 (For implementation, people can use Ethernet MAC and Ipv4 address to perform external network management).

3.29 Normal State: a state used to describe a node that has normal Tx and Rx functions on MSR ring and does not work on L2PS State. In Normal State, forwarding means that received frame from upstream will be forwarded to downstream. This state is only used along a MSR ring.

3.30 N-th Working Ring (NWR): a single ring of N-ring structure (N=1, 2, 3, 4, 5, . . . ). Normally, it is ringlet or counter-rotating ringlet and both data and control packets are sent in one direction. In the case of (N−1)-th ring facility or node failure, tributary services over N-ring structure are protected automatically each other within 50 ms if the protection path from a ringlet to other counter-rotating ringlet is set in a node.

3.31 N-ring Structure: a N-ring structure (N=1, 2, 3, 4, 5, . . . , ) consisting of the unidirectional (N−M) ringlets and M ($1 \leq M < N$) unidirectional counter-rotating ringlets as illustrated in FIG. 1. The value of N and M is dependent upon the need of application, capacity allocation and protection strategy. It can be configured to 1:N or M:N. Optionally, some ringlet uses GE, other uses 10GE. Normally, a specific (N−1) ringlet transports its data packets into (N−1)-ringlet in unidirectional direction and control packets into N-ringlet in the opposite direction. Analogically, a specific N-ringlet transports its data packets into N-ringlet in unidirectional direction and control packets into FWR in the opposite direction (if N is even) or in the same direction (if N is odd). Similarly, N-ringlet as a control channel of (N−1)-ringlet is also set default to protection channel of (N−1)-ringlet in the case of fibre facility failure or signal degradation of (N−1)-ringlet. In the case of fibre facility failure or signal degradation, tributary services over N-ring structure are protected automatically each other within 50 ms if the protection path from a ringlet to other counter-rotating ringlet is set in a node.

3.32 NWR-Fibre-Cut: a parameter of L2PS_Request Frame, used to stand for status indication of single fibre cut on NWR.

3.33 Physical Signal Degrade (PSD): random or automatic, caused by a physical signal degrade (e.g. excessive block or bit error rate). Once it happens, L2PS will be applied on the failure span along a MSR ring.

3.34 Physical Signal Failure (PSF): random or automatic, caused by a physical signal failure (e.g. fibre facility failure). Once it happens, L2PS will be applied on the failure span along a MSR ring.

3.35 Reference Point G1: a reference point between Rx Framer and RX Filter. It stands for processing sink of 10GMAC/GMAC physical layer before aggregate XGMI/GMIMII. 3.36 Reference Point G2: a reference point between Tx Framer and TX Schedule. It stands for processing source of 10GMAC/GMAC physical layer before aggregate XGMII/GMII/MII.

3.37 Reference Point T1: a reference point between Tributary Rx Framer and MSR-LEP processor. It stands for processing sink of MSR-LEP before encapsulation of physical tributary of TCE etc.

3.38 Reference Point T2: a reference point between Tributary Tx Framer and MSR-LEP processor. It stands for processing source of MSR-LEP after stripping of physical tributary of TCE etc.

3.39 Rx Framer: an abstract of physical framer of Aggregate Pipe at Rx side, it stands for a framer of FE/GE/10GE. If Aggregate Pipe is Gigabit Ethernet for example, the related rate and signal are GMII at the Reference Point G1.

3.40 Timer_ct: a Timer of retransmission used to Configuration Table Operation. All nodes on a ring will wait to be assigned ICT during engineering installation or project installation phase. After issuing CT_Request frame, Node A will automatically send CT_Request frame again after retransmission Timer_ct (it is programmable) if Node A does not receive corresponding CT_Response frame. It is believed that Node B is not reachable after N_ct times of retransmission (N_ct is programmable also). N_ct is also used by CUT operation.

3.41 Timer_WTR: a Timer used to prevent L2PS oscillation, the L2PS can waits Timer_WTR period (its value is programmable) before MSR returns to Normal State. This Timer is used only when the L2PS function is set.

3.42 Tributary: an independent adding/dropping tributary (or service) channel over MAC frame of FE/GE/10GE (after packetizing) to/from the MSR data nodes, just like a series "Private Line or Private Circuit for Renting from Carrier". Tributary can be multi-service. The different tributary can be assigned to different priority.

3.43 Tributary Adaptation Function Unit: an adaptation function from/to various independent tributary type signals to/from reference point T1/T2. It has Tributary Adaptation Source Function and Tributary Adaptation Sink Function. Sink corresponds to reference point T1, source to reference point T2. This adaptation function can include the signal and rate transform, synchronous function between two sides.

3.44 Tributary Cross-connection Relationship (TCCR): a table reflecting Tributary cross-connection relationship of all nodes on MSR ring or other topologies. It is global table of MSR or other topologies, that is, source and sink connection relationship of all available tributaries.

3.45 Tributary Rx Framer: an abstract of physical framer of Tributary at Rx side, it stands for a framer of TCE framers. If tributary is TCM for example, the data at the Reference Point T1 is the payload of TCM frame.

3.46 Tributary Tx Framer: an abstract of physical framer of Tributary at Tx side, it stands for a framer of TCE.

3.47 Tributary Number (TN): a number of same type of Tributary Port on a node. This number is 7 if the 7th ISDN is provided in a node.

3.48 Tributary Type (TT): a type of an independent adding/dropping tributary channel to/from the MSR data nodes. This type can be TCE service.

3.49 Topology Discovery: A data link control function in the MSR-LEP, used to find out who is its neighbour and how many nodes is been working on the MSR (to ensure transmitted frame must be received by the same station, destination address of a frame is pointed to itself). Each station appends its NA as parameter to this Topology Discovery Frame by order, update the length of parameter and passes this frame to the neighbour along the MSR ring as shown in Table 6. It is not necessary to know what is mapping relationship between Node Address and the physical position. Each node performs topology discovery function periodically (The value of Timer is programmable) by sending topology discovery frame on the first or second working ring. Topology Discovery uses a signalling format.

3.50 Time to Live: this 6-bit field is a hop-count that must decremented every time a node forwards a frame. The maximum number of nodes in a MSR ring described in the patent is 32. In the L2PS case, the total node space can be 64 nodes on a ring.

3.51 Tx Framer: an abstract of physical framer of Aggregate Pipe at Tx side, it stands for a framer of FE/GE/10GE.

3.52 Wait to Restore (WTR): random or automatic, activated after the node entered L2PS meets the restoration criteria once the condition of the PSF, PSD or fibre facility failure disappears. To prevent L2PS oscillation, the L2PS can waits Timer_WTR period (its value is programmable) before MSR enters Normal State. This function is only used in the case of MSR ring (dual ring).

3.53 WTR_Request Frame: a frame used to transition peer node at the failure span to Normal State from L2PS State. After the node entered L2PS meets the restoration criteria once the condition of the PSF, PSD or fibre facility failure disappears. To prevent L2PS oscillation, the L2PS entity can waits Timer_WTR period (its value is programmable) to enter Normal State by using this frame. This function is only used in the case of MSR ring (dual ring).

4 Abbreviations 4.1 Abbreviations described in IEEE 802.3

This Patent makes use of the following abbreviations described in IEEE 802.3:

| | | |
|---|---|---|
| 1) 10GE | 10 Gigabit Ethernet | |
| 2) FE | Fast Ethernet, including 10/100 Mb/s auto-sense Ethernet | |
| 3) GE | Gigabit Ethernet | |
| 4) LAN | Local area network | |
| 5) MAC | Media access control | |
| 6) MII | Media Independent Interface | |
| 7) GMII | Gigabit Media Independent Interface | |
| 8) XGMII | 10 Gigabit Media Independent Interface | |

4.2 Abbreviations described in FITU-T I.321 and I.361

This Patent makes use of the following abbreviations described in ITU-T Recommendation:

a) ATM Asynchronous Transfer Mode 4.3 Abbreviations described in ETSI

This Patent makes use of the following abbreviations described in ETSI Recommendation EN 300 429:

a) DVB Digital Video Broadcast 4.4 Abbreviations described in this patent

| 1) FWR | First Working Ring |
|---|---|
| 2) CS&NM | Control Signalling and Network Management |
| 3) CT | Configuration Table |
| 4) CTI | Configuration Table Inquiry |
| 5) CUT | Configuration Updating Table |
| 6) CWDM | Coarse Wavelength Division Multiplex |
| 7) DL | Data Link |
| 8) DWDM | Dense Wavelength Division Multiplex |
| 9) ICT | Initial Configuration Table |
| 10) L2PS | Layer 2 Protection Switch |
| 11) LSFFU | Line-Speed Filtering Function Unit |
| 12) MAC | Media Access Control |
| 13) MDL | Layer Management of Data Link |
| 14) MSR | Multiple Services Ring |
| 15) MSR LEP | Multiple Services Ring-Link Encapsulation Protocol |
| 16) NWR | N-th Working Ring |
| 17) (N-1)WR | (N-1)-th Working Ring |
| 18) (N-2)WR | (N-2)-th Working Ring |
| 19) PDU | Protocol Data Unit |
| 20) PSD | Physical Signal Degrade |
| 21) PSF | Physical Signal Failure |
| 22) NA | Node Address |
| 23) Rx | Receive data |
| 24) SDU | Service Data Unit |
| 25) ST | Source Tributary |
| 26) TBM | Tributary Based Multicast |
| 27) TBP | Tributary Based Protection |
| 28) TCCR | Tributary Cross-Connection Relationship |
| 29) TCE | TDM Circuit Emulation |
| 30) TDM | Time Division Multiplex |
| 31) TMG | Tributary Merging Group |
| 32) TTBP | TCE Tributary Based Protection |
| 33) TN | Tributary Number |
| 34) TT | Tributary Type |
| 35) Tx | Transmission data |
| 36) WTR | Wait to Restore |

5 MSR Network Framework 5.1 Elements of Ring

MSR is a N-ring structure (N=1, 2, 3, 4, 5, . . . , ) consisting of the unidirectional (N−M) ringlets and M (1≦M<N) unidirectional counter-rotating ringlets as illustrated in FIG. 1. Normally, a specific (N−1) ringlet transports its data packets into (N−1) ringlet in unidirectional direction and control packets into N ringlet in the opposite direction. In the case of fibre facility failure or signal degradation, the node received loss of signal or signal degradation will notify the peer node at the failure span to switch the corresponding data and control packets to another count-rotating ringlet. No wrapping function is used in this case. Architecturally, single-ring, the link, broadcast and pseudo-mesh topologies are supported also. Each node could add and drop one or more independent tributary (e.g. DVB port, also could transmit and receive layer 3 (Ipv4/Ipv6 packet) forwarding data packet (also being a tributary), control signalling frame and network management frame. MSR supports multicast and broadcast of these Tributary service and forwarding data packet. Aggregate pipe can be FE/GE/10GE. A node can be inserted or removed online from the ring while other protected services will be operated normally without packet loss and service loss along a MSR ring in the case of one ring being set to standby of other.

5.2 Frame Types on a Ring and Multiple Services in Tributary

Each node has ability of adding and dropping one or more independent Tributary services defined in Table 1.

TABLE 1

Types of multi-service in Tributary

| Tributary types | Capabilities | | |
|---|---|---|---|
| TCEs | Full duplex point-to-point | Multicast | Broadcast |

Note 1: The bandwidth of aggregate pipe depends on deployment service requirements, the aggregate Tributary bandwidth be half the aggregate pipe bandwidth to provide protection bandwidth availability where needed. Where services requirements allow the aggregate Tributary bandwidth can exceed the aggregate bandwidth.
Note 2: Multicast is half duplex point-to-multipoint of node based, Broadcast is half duplex point of node based to all other points on a ring.

Transmitted and received frames on a ring have (1) frames of multi-service station by station, (2) layer 3 (Ipv4/Ipv6 packet) forwarding data packet (just like router), (3) control signalling frame and (4) network management frame described in Table 2, to show full capabilities of point-to-point, multicast and broadcast along a ring.

TABLE 2

Frame types

| Frame types | Capabilities | | |
|---|---|---|---|
| Frames of multi-service station by station | Point-to-point | Multicast | Broadcast |
| Layer 3 (Ipv4/Ipv6 packet) forwarding data packet (a node operates just like a router) | Point-to-point | Multicast | Broadcast |
| Control Signalling Frame | Point-to-point | Multicast | Broadcast |
| Network Management Frame | Point-to-point | Multicast | Broadcast |

Figure 2:
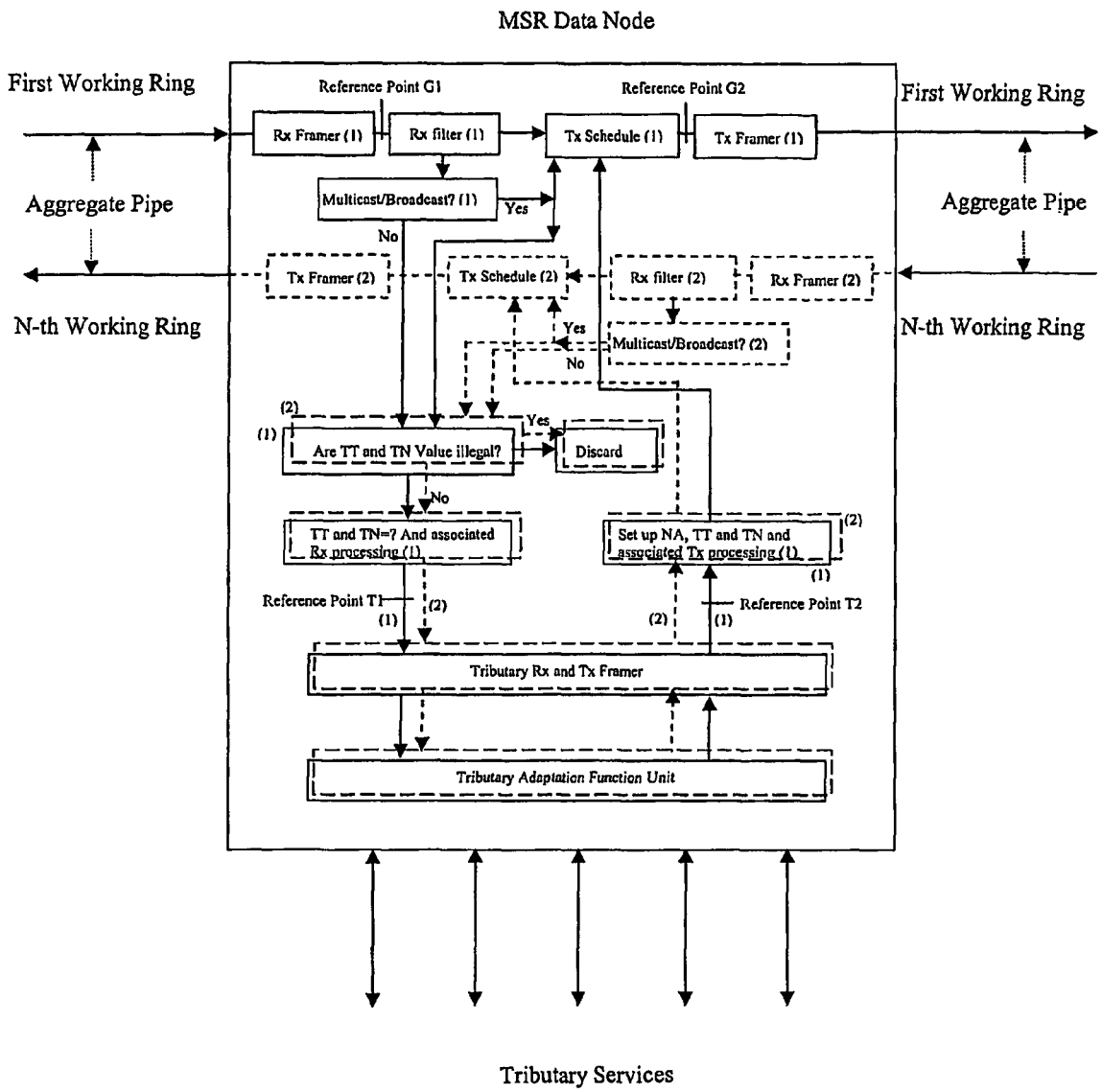
FIG. 2 illustrates Tx and Rx Function Diagram of MSR Data Node according to one embodiment of the invention.

FIG. 2 illustrates Tx and Rx Function Diagram of MSR Data Node according to one embodiment of the invention;

5.3 Components of Data Node

A MSR data node is the system equipment that has an eastward Rx, eastward Tx, westward Rx and westward Tx Aggregate Pipe connections, and one or more adding and dropping independent Tributaries. A MSR data node also has functions of receiving, transmitting and forwarding of network management frame, control signalling and data frame in a Node. The corresponding change should be made as the different connection configuration is applied for the different topologies. The basic components of a MSR data node are as follows.

5.3.1 Aggregate Pipe: a physical connection of two adjacent nodes. Aggregate pipe is a channel of FE/GE/10GE. It is recommended that the same bandwidth of Aggregate Pipe in different span along the same ring be used.

5.3.2 Tributary: an independent adding/dropping tributary channel to/from the MSR data nodes, just like a series "Private Line or Private Circuit for Renting from Carrier". Tributary can be a G.702 ports. The different tributary can be assigned to different priority.

5.3.3 First Working Ring (FWR): a first outer ring of N-ring structure (N=1, 2, 3, 4, 5, . . . ). Normally, it is ringlet and both data and control packets are sent in one direction. In the case of NWR fibre facility or node failure, tributary services over N-ring structure are protected automatically each other within 50 ms if the protection path from a ringlet to other counter-rotating ringlet is set in a node.

5.3.4 N-th Working Ring (NWR): a single ring of N-ring structure (N=1, 2, 3, 4, 5, . . . ). Normally, it is ringlet or counter-rotating ringlet and both data and control packets are sent in one direction. In the case of (N−1)-th ring facility or node failure, tributary services over N-ring structure are protected automatically each other within 50 ms if the protection path from a ringlet to other counter-rotating ringlet is set in a node.

5.3.5 N-ring Structure: a N-ring structure (N–1, 2, 3, 4, 5, ..., ) consisting of the unidirectional (N–M) ringlets and M (1≦M<N) unidirectional counter-rotating ringlets as illustrated in FIG. 1. The value of N and M is dependent upon the need of application, capacity allocation and protection strategy. It can be configured to 1:N or M:(N–M) (M≦N–M). Optionally, some ringlet uses GE, other uses 10GE. Normally, a specific (N–1) ringlet transports its data packets into (N–1)-ringlet in unidirectional direction and control packets into N-ringlet in the opposite direction. Analogically, a specific N-ringlet transports its data packets into N-ringlet in unidirectional direction and control packets into FWR in the opposite direction (if N is even) or in the same direction (if N is odd). Similarly, N-ringlet as a control channel of (N–1)-ringlet is also set default to protection channel of (N–1)-ringlet in the case of fibre facility failure or signal degradation of (N–1)-ringlet. In the case of fibre facility failure or signal degradation, tributary services over N-ring structure are protected automatically each other within 50 ms if the protection path from a ringlet to other counter-rotating ringlet is set in a node.

5.3.6 MSR filter Unit: a filtering and checking function unit for NA and TTL. All frames reaching to the MSR filter Unit will be sent first to a buffer in the Node. The MSR data node will check TTL and NA of a frame and perform XOR function with local NA. This frame will be taken away if TTL is zero. If its NA is match, those frames reaching destination will not be sent to neighbour (except for multicast and broadcast frames) along the same ring. Otherwise, those mismatched frame will go to neighbour directly by schedule unit without any processing after decrementing TTL field.

5.3.7 MSR Schedule Unit: a control function for transmitted frame in a node according to the priority level of forwarded frames from upstream station, multicast/broadcast frames and transmitted frame from the local station. If there are several frames to be sent in a node at the same time, the schedule unit will decide which frame will go first to the downstream along the ring.

5.3.8 Rx Framer: an abstract of physical framer of Aggregate Pipe at Rx side, it stands for a framer of GE and 10GE.

5.3.9 Tx Framer: an abstract of physical framer of Aggregate Pipe at Tx side, it stands for a framer of GE and 10GE.

5.3.10 Tributary Rx Framer: an abstract of physical framer of Tributary at Rx side, it stands for a framer of ISDN.

5.3.11 Tributary Tx Framer: an abstract of physical framer of Tributary at Tx side, it stands for a framer of ISDN.

5.4 Reference Point in Data Node

The four different Reference Points are defined in a node.

5.4.1 Reference Point G1: a reference point between Rx Framer and RX Filter. It stands for processing sink of 10GMAC/GMAC physical layer before aggregate XGMII/GMII/MII.

5.4.2 Reference Point G2: a reference point between Tx Framer and TX Schedule. It stands for processing source of 10GMAC/GMAC physical layer before aggregate XGMII/GMII/MG.

5.4.3 Reference Point T1: a reference point between Tributary Rx Framer and MSR-LEP processor. It stands for processing sink of MSR-LEP before encapsulation of physical tributary of TCE etc.

5.4.4 Reference Point T2: a reference point between Tributary Tx Framer and MSR-LEP processor. It stands for processing source of MSR-LEP after stripping of physical tributary of TCE etc.

5.5 Data Flow of Tx and Rx to Tributary

Normally, a specific (N–1) ringlet transports its data packets into (N–1)-ringlet in unidirectional direction and control packets into N-ringlet in the opposite direction. Analogically, a specific N-ringlet transports its data packets into N-ringlet in unidirectional direction and control packets into (N–1)WR in the opposite direction (if N is even) or in the same direction (if N is odd). Similarly, N-ringlet as a control channel of (N–1)-ringlet is also set default to protection channel of (N–1)-ringlet in the case of fibre facility failure or signal degradation of (N–1)-ringlet.

5.5.1 Rx direction: Rx frames entering a node at the Reference Point G1 are sent to Rx Filter Unit after Rx framer is performed. Rx Filter Unit will check and filter TTL, FCS and NA of frame. All frames reaching to the MSR Filter Unit will be sent first to a buffer in the Node. The MSR Filter Unit will check TTL, FCS and NA of frame and perform XOR function with local NA. This frame will be taken away and discarded if TTL is zero or FCS is error.

If its NA is match, those frames reaching destination will not be sent to neighbour along the same ring (e.g. (N–1)WR). Otherwise, those mismatched frame will go to neighbour directly by schedule unit without any processing after decrementing TTL field.

If the received frame is multicast or broadcast frames, it will be sent first to Tx Schedule Unit to downstream node after decrementing TTL field, and it is coped to other buffer for further related processing in the local node at the same time.

After checked the aspects of TTL, NA and multicast/broadcast, a frame to reach destination is operated second procedure in the local node (station). That is, are TT and TN illegal? If yes, this frame will be discarded. If no, this will be transferred to the corresponding Tributary port, Layer 3 forwarding unit, control signalling unit or network management unit at the Reference Point T1 according its value of TT and TN.

5.5.2 Tx direction: Rx frames entering a Tx processor from a Tributary port, Layer 3 forwarding unit, control signalling unit or network management unit at the Reference Point T2, will got TTL, FCS, TT, TN values and multicast/broadcast requirement first, and then got NA value according to types and ports configuration of Tributary, Layer 3 forwarding packet, requirement of control signalling or requirement of network management. After that, these frames are sent to TX Schedule Unit. There are three types input: multicast/broadcast frames from upstream from other node, point-to-point frame for transferring from upstream and transmitted frame from local station. They are all gone into TX Schedule Unit. Schedule Unit will operate a control function for these transmitted frames in a node according to the priority level of these frames. If there are several frames to be sent in a node at the same time, the schedule unit will decide which frame will go first to the downstream along the ring. It is also possible to discard those frames of lower priority level during Tx burst period.

5.6 Operation of Layer 3 forwarding Packets

MSR data node can be used as a router to forward IP related packets to other node on MSR ring according to relationship between Ipv4/Ipv6 routing table and its NA/TT/TN while this node could provide Tributary port for renting just like private line or circuit. When MSR data node is taken a role of router, the control plane (e.g. operation of routing protocols), network management plane (e.g. Simple Network Management Protocol) and data plane of a router (MSR data node) will share the same logical channel corresponding to the value of NA, TT and TN along the ring. That is, the control signalling frames of a router (MSR data node) will be operated, on the different channel from the control signalling frames of MSR ring itself.

5.7 Operation of Control Signalling Frames 5.7.1 Operation of Topology Discovery Frame 5.7.1.1. Operation of Topology Discovery Frame in Normal State Topology Discovery Frame is a control frame in the MSR-LEP, used to figure out who is its neighbour and how many nodes are been working on the MSR (to ensure transmitted frame must be received by same station sending Topology Discovery Frame, destination address of frame is pointed to itself). Periodically (Timer_topology_discovery defaults to 3 seconds and is programmable), each station (e.g. Node A) broadcasts Topology_Discovery_Request Frame with a Null parameter along all ringlets respectively. All stations (e.g. Node B) received Topology_Discovery_Request Frame give a response by Topology_Discovery_Response Frame with a local NA (e.g. NA of Node B) to that station (e.g. Node A). Node A appends received NA and TTL value to its Topology Address Library in Node A by order of stations after getting Topology_Discover_Response frame. The order of stations along a ring is dependent on difference of TTL value. TTL value, state (Normal State or L2PS State) of Node B, Ring state (Normal State or L2PS State) and value of (N−1)WR/NWR are bound to NA of Node B together as a record of Topology Address Library in Node A. The maximum and minimum values of TTL in a record of (N−1)WR or NWR correspond to two adjacent neighbours of Node A. The records of Topology Address Library of (N−1)WR and NWR are operated separately.

The operation of topology discovery frame is valid and topology status in a node is refreshed if the same results are got after consecutive 3 times transmission of topology discovery frame. Otherwise, the previous record of topology status will be kept unchanged. The operation and record of (N−1)WR and NWR topology discovery in a node are performed separately.

5.7.1.2 Operation of Topology Discovery Frame in the case of (N−1)WR Fibre Cut

The MSR-LEP does work by sending both data frame and the associated network management/control frames in (N−1)WR, sending both data frame and the associated network management/control frames in NWR and (N−2)WR also.

If single fibre is cut or PSF occurs on (N−1)WR from Node 2 to Node 1 in FIG. 1 for example, Node 1 detects PSF on (N−1)WR. Node 1 and Node 2 enter L2PS state from Node 2 to Node 1 on (N−1)WR and an L2PS_Event_Report Frame is broadcasted to all stations in a ring. At this moment, data frame and the corresponding network management/control frames in NWR, Node 3, 4, 5 and 6 are kept in normal state as usually. Periodically (Timer_topology_discovery defaults to 3 seconds and is programmable), any station of Node 1, 2, 3, 4, 5 and 6 (e.g. Node C) broadcasts Topology_Discovery_Request Frame with a Null parameter along a (N−1)WR first. When and if it reaches Node 1 or Node 2, or transmitted from Node 1 to Node 2, the route of this Topology_Discovery_Request Frame will be changed to NWR in the opposite direction. If Node 2 and Node 1 along (N−1)WR are involved in L2PS state, TTL value of those nodes sending frame and not being in L2PS state on NWR should be double of that in normal state when a frame is sent from these nodes. All stations (e.g. Node D) received Topology_Discovery_Request Frame will issue a response by Topology_Discovery_Response Frame with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of (N−1)WR/NWR are bound to NA of Node D together as a record of Topology Address Library in Node C. The maximum and minimum values of TTL in a record of (N−1)WR or NWR correspond to two neighbours of Node C. The records of Topology Address Library of NWR and (N−1)WR are operated separately.

5.7.1.3 Operation of Topology Discovery Frame in the case of NWR Fibre Cut

If single fibre is cut or PSF occurs on NWR from Node 1 to Node 2 in FIG. 1 for example, Node 2 detects PSF on NWR. Node 2 and Node 1 enter L2PS state from Node 1 to Node 2 on NWR and an L2PS_Event_Report Frame is broadcasted to all stations in a ring. At this moment, data frame and the corresponding network management/control frames in NWR, Node 3, 4, 5 and 6 are kept in normal state as usually. Periodically (Timer_topology_discovery defaults to 3 seconds and is programmable), any station of Node 1, 2, 3, 4, 5 and 6 (e.g. Node C) broadcasts Topology_Discovery_Request Frame with a Null parameter along a NWR first. When and if it reaches Node 1 or Node 2, or transmitted from Node 1 to Node 2, the route of this Topology_Discovery_Request Frame will be changed to (N−1)WR in the opposite direction. If the NWR span is involved in L2PS state, TTL value of those nodes sending frame and not being in L2PS state on NWR should be double of that in normal state when a frame is sent from these nodes. All stations (e.g. Node D) received Topology_Discovery_Request Frame give a response by Topology_Discovery_Response Frame with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of (N−1)WR/NWR are bound to NA of Node D together as a record of Topology Address Library in Node C. The maximum and minimum values of TTL in a record of (N−1)WR or NWR correspond to two neighbours of Node C. The records of Topology Address Library of NWR and (N−1)WR are operated separately.

5.7.1.4 Operation of Topology Discovery Frame in the case of Bidirectional Fibre Cut If bidirectional fibres are cut or PSF occurs on both (N−1)WR and NWR from Node 1 to Node 2 in FIG. 1 for example, Node 1 and Node 2 detect PSF on NWR and (N−1)WR respectively. Node 1 and Node 2 enter L2PS state from Node 1 to Node 2 on (N−1)WR and from Node 2 to Node 1 on NWR, and an L2PS_Event_Report Frame is broadcasted to all stations in a ring. At this moment, Node 3, 4, 5 and 6 are kept in normal state as usually. Periodically (Timer_topology_discovery defaults to 3 seconds and is programmable), any station of Node 1, 2, 3, 4, 5 and 6 (e.g. Node C) broadcasts Topology_Discovery_Request Frame with a Null parameter along both (N−1)WR and NWR. When and if it reaches Node 1 or Node 2, or transmitted from Node 1 to Node 2, or transmitted from Node 2 to Node 1, the route of this Topology_Discovery_Request Frame will be changed from (N−1)WR to NWR or from NWR to (N−1)WR in the opposite direction. If both (N−1)WR and NWR spans are involved in L2PS state, TTL value of those nodes sending frame and not being in L2PS state on both (N−1)WR and NWR should be double of that in normal state when a frame is sent from these nodes. All stations (e.g. Node D) received Topology_Discovery_Request Frame will issue a response by Topology_Discovery_Response Frame with a local NA (e.g. NA of Node D)

to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of (N–1)WR/NWR are bound to NA of Node D together as a record of Topology Address Library in Node C. The maximum and minimum values of TTL in a record of (N–1)WR or NWR correspond to two neighbours of Node C. The records of Topology Address Library of NWR and (N–1)WR are operated separately.

5.7.1.5 Operation of Topology Discovery Frame in the Case of Bidirectional Failure on Both Sides of Node If bidirectional Failure on Both Sides of Node 2 for example, Node 1 and Node 3 detect PSF on NWR and (N–1)WR respectively. Node 1 and Node 3 enter L2PS state from Node 1 to Node 3 on NWR and from Node 3 to Node 1 on (N–1)WR, and an L2PS_Event_Report Frame is broadcasted to all stations in a ring. At this moment, Node 4, 5 and 6 are kept in normal state as usually. Periodically (Timer_topology_discovery defaults to 3 seconds and is programmable), any station of Node 1, 3, 4, 5 and 6 (e.g. Node C) broadcasts Topology_Discovery_Request Frame with a Null parameter along both (N–1)WR and NWR. When and if it reaches Node 1 or Node 3, or transmitted from Node 1 to Node 3, or transmitted from Node 3 to Node 1, the route of this Topology_Discovery_Request Frame will be changed from (N–1)WR to NWR or from NWR to (N–1)WR in the opposite direction. If both (N–1)WR and NWR spans are involved in L2PS state, TTL value of those nodes sending frame and not being in L2PS state on both (N–1)WR and NWR should be double of that in normal state when a frame is sent from these nodes. All stations (e.g. Node D) received Topology_Discovery_Request Frame give a response by Topology_Discovery_Response Frame with a local NA (e.g. NA of Node D) to that station (e.g. Node C). Node C appends received NA and TTL value to its Topology Address Library in Node C by order of stations. The order of stations along a ring is dependent on difference of TTL value. TTL value, state (Normal State or L2PS State) of Node D, state of ring (Normal State or L2PS State) and value of (N–1)WR/NWR are bound to NA of Node D together as a record of Topology Address Library in Node C. The maximum and minimum values of TTL in a record of (N–1)WR or NWR correspond to two neighbours of Node C. The records of Topology Address Library of NWR and (N–1)WR are operated separately.

5.7.2 Operation of Manual Switch and Forced Switch Frames

L2PS_Request frame with a Manual_Switch or Forced_Switch parameter targeting one or two spans on MSR ring is sent to other nodes by unicast or multicast mode from a node (called Node A, e.g. Central station in the most case) by network management interface during initial engineering installation or engineering operation phase. All nodes (called Node B) received L2PS_Request frame will perform corresponding switching operation in the adjacent nodes (Node B and C) of targeted span and give a point-to-point response by L2PS-Response frame with a parameter of Successful_Switch or Unsuccessful_Switch to Node A, and issues L2PS_Event_Report frame with a set parameters of Forced_Switch/Manual_Switch and L2PS-State to designated node (connected to Network management) and/or broadcasts to all stations in normal state in a ring. The successful operation is performed if Node A receives two correct responses from both Node B and Node C. Otherwise, operation is unsuccessful.

5.7.3 Operation of L2PS in the case of PSF/PSD and Node Failure 5.7.3.1 Operation of (N–1)WR Fibre Cut If single fibre is cut or PSF occurs on (N–1)WR from Node 2 to Node 1 in FIG. 1 for example, Node 1 detects PSF on (N–1)WR. That is, neither Inter-frame Gap of MAC nor MAC frame is received within 20 ms (the values of T200 and N200 are programmable) in the (N–1)WR of shorter path. L2PS entity in a Node 1 will start L2PS function and perform following sub-functions:

(1) Node 1 goes into L2PS State and passes L2PS_Request Frame with a parameter of (N–1)WR_Fibre_Cut along shorter path of NWR to Node 2. After getting this frame, Node 2 enters L2PS State also, and issues L2PS_Event_Report frame with a set parameters of NWR_ Fibre_Cut/(N–1)WR_Fibre_Cut, PSF/PSD and L2PS-State to designated node (connected to Network management in the most case) and/or broadcasts to all stations in normal state in a ring. In L2PS State, all frames from Node 2 to Node 1 along shorter path of (N–1)WR are switched to the longest path of NWR in opposite direction.

(2) When PSF on Node 1 clears, Node 1 goes to Normal State, and starts Timer-WTR (it is programmable). Once Timer_WTR expires, Node 1 sends WTR-Request Frame with a parameter of Successful_WTR to Node 2 along both shorter path and the longest path at once. Node 2 goes back to Normal State from L2PS State after receiving this frame.

5.7.3.2 Operation of NWR Fibre Cut

If single fibre is cut or PSF occurs on NWR from Node 1 to Node 2 in FIG. 1 for example, Node 2 detects PSF on NWR. That is, neither Inter-frame Gap of MAC nor MAC frame is received within 20 ms (its value is programmable) in the NWR of short path. L2PS entity in a Node 2 will start L2PS function and perform following sub-functions:

(1) Node 2 goes into L2PS State and passes L2PS_Request Frame with a parameter of NWR-Fibre-Cut along shorter path of (N–1)WR to Node 1. After getting this frame, Node 1 enters L2PS State also, and issues L2PS_Event_Report frame with a set parameters of NWR_Fibre_Cut/(N–1)WR_Fibre_Cut, PSF/PSD and L2PS-State to designated node (connected to Network management) and/or broadcasts to all stations in normal state in a ring. In L2PS State, all frames from Node 1 to Node 2 along shorter path of NWR are switched to the longest path of (N–1)WR in opposite direction.

(2) When PSF on Node 2 clears, Node 2 goes to Normal State, and starts Timer_WTR (it is programmable). Once Timer_WTR expires, Node 2 sends WTR-Request Frame with a parameter of Successful_WTR to Node 1 along both shorter path of NWR and the longest path of (N–1)WR at once. Node 1 goes back to Normal State from L2PS State after receiving this frame.

5.7.3.3 Operation of Bidirectional Fibre Cut.

If bidirectional fibre is cut or PSF occurs on both (N–1)WR and NWR from Node 1 to Node 2 in FIG. 1 for example, Node 1/Node 2 detects PSF on NWR/(N–1)WR. That is, neither Inter-frame Gap of MAC nor MAC frame is received within 20 ms (its value is programmable) in both (N–1)WR and NWR of shorter path. L2PS entity in both Node 1 and Node 2 will start L2PS function and perform following sub-functions:

(1) Node 1/Node 2 goes into L2PS State itself and passes L2PS_Request Frame with a parameter of NWR_Fibre_Cut/(N–1)WR_Fibre_Cut along the longest path of (N–1)WR/NWR to Node 2/Node 1. After getting this frame, both Node 2 and Node 1 enters L2PS State, and issues L2PS_Event Report frame with a set parameters of NWR- _Fibre_Cut/(N−1)WR_Fibre_Cut, PSF/PSD and L2PS-State to designated node (connected to Network management) and/or broadcasts to all stations in normal state in a ring. In L2PS State, all frames from Node 1 to Node 2 or from Node 2 to Node 1 along shorter path of (N−1)WR/NWR are switched to the longest path of NWR/(N−1)WR in opposite direction.

(2) When PSF on Node 1 and Node 2 clears, Node 1 and Node 2 go to Normal State, and starts Timer_WTR (it is programmable). Once Timer_WTR expires, Node 1/Node 2 sends WTR_Request Frame with a parameter of Successful_WTR to Node 2/Node 1 along the long path at once. Node 1/Node 2 goes back to Normal State from L2PS State after receiving this frame.

5.7.3.4 Operation of Bidirectional Failure on Both Sides of Node

Bidirectional Failure on Both Sides of Node is complete node failure. If it is Node 2 in FIG. 1 for example, Node 1 and Node 3 detect PSF on both NWR and (N−1)WR. That is, neither Inter-frame Gap of MAC nor MAC frame is received within 20 ms (its value is programmable) in both (N−1)WR and NWR of shorter path via Node 2. L2PS entity in both Node 1 and Node 3 will start L2PS function and perform following sub-functions:

(1) Node 1/Node 3 goes into L2PS State itself in both directions and passes L2PS_Request Frame with a parameter of NWR_Fibre_Cut/(N−1)WR_Fibre_Cut along the longest path of (N−1)WR/NWR to Node 3/Node 1. After getting this frame, both Node 3 and Node 1 enters L2PS State in both directions, and issues L2PS_Event_Report frame with a set parameters of NWR_Fibre_Cut/(N−1)WR_Fibre_Cut, PSF/PSD and L2PS-State to designated node (connected to Network management) and/or broadcasts to all stations in normal state in a ring. In L2PS State of both directions, all frames from Node 1 to Node 3 or from Node 3 to Node 1 along shorter path of (N−1)WR/NWR are switched to the longest path of NWR/(N−1)WR in opposite direction.

(2) When PSF on Node 1 and Node 3 clears or Node 2 is restored, Node 1 and Node 3 go to Normal State, and starts Timer_WTR (it is programmable). Once Timer_WTR expires, Node 1/Node 3 sends WTR-Request Frame with a parameter of Successful_WTR to Node 3/Node 1 along the longest path at once. Node 1/Node 3 goes back to Normal State from L2PS State after receiving this frame.

5.7.3.5 Operation of Bidirectional Failure on One Side of Node

This case is the same as 5.7.3.3.

5.8 Operation of Network Management Frames 5.8.1 Initial Configuration Table (ICT) Operation ICT is a mapping table reflecting the initial and available value of TT and TN in a node and TCCR between nodes on the MSR ring during engineering installation. The ICT must be pre-installed before MSR engineering operation. The incorrect ICT will lead to fault of Tributary services on MSR ring. CT_Request frame with an ICT parameter reflecting initial TCCR of all nodes on MSR ring is sent to other nodes by broadcast mode from a node (called Node A, e.g. Central station in the most case) by network management interface during initial engineering operation period. All nodes (called Node B) received CT_Request frame will build corresponding mapping relations of TCCR in the local node and give a point-to-point response by CT_Response frame to Node A.

All nodes on a ring will wait to be assigned ICT during engineering installation period. After issuing CT_Request frame, Node A will automatically send CT_Request frame again after retransmit timer (it is programmable, named for Timer_ct) if Node A does not receive corresponding CT_Response frame. It is believed that Node B is not reachable after N_ct times of retransmission (N_ct is programmable also).

If Node A has received a message of CT_Response flame with a Null parameter from Node B either before CT retransmit expired or before N_ct times of retransmission, it is believed that ICT operation for Node B is successful.

5.8.2 Configuration Updating Table (CUT) Operation

CUT is a mapping table reflecting the available value modification of TT and TN in a node and TCCR between nodes on the MSR ring during the engineering operation. The CUT is applied during MSR engineering operation. The incorrect CUT will lead to fault of Tributary on MSR ring. CT_Request frame with a CUT parameter reflecting changed part of TCCR of all nodes on MSR ring is sent to other nodes (called one of them Node B) by broadcast mode from a node (called Node A, e.g. Central station in the most case) by network management interface during normal engineering operation period. All nodes received CT_Request frame will build corresponding mapping relations of TCCR in the local node and give a point-to-point response by CT_Response frame to Node A.

After issuing CT_Request frame, Node A will automatically send CT_Request frame again after retransmit timer (it is programmable, named for Timer_ct) if Node A does not receive corresponding CT_Response frame. It is believed that Node B is not reachable after N_ct times of retransmission (N_ct is programmable also).

If Node A has received a message of CT_Response frame with a Null parameter from Node B either before retransmitted CT expired or before N_ct times of retransmission, it is believed that CUT operation for Node B is successful.

5.8.3 Configuration Table Inquiry (CTI) Operation

CT_Request frame with a Null parameter is sent to other nodes (called one of them Node B) by unicast/multicast/broadcast mode from a node (called Node A, e.g. Central station in the most case) by network management interface during normal engineering operation period. All nodes received CT_Request frame with a Null parameter will send a point-to-point response by CT_Response frame with a CTI parameter reflecting actual configuration table of the local node on a MSR ring to Node A.

5.9 Fault Management

If a fault occurs, Fault_Report frame with a fault parameter defined in 11.6 is sent to designated node (connected to network management interface). The network management entity can pass Fault_Request Frame with a fault parameter defined in 11.6 from designated node to a targeted node. The targeted node issues Fault_Response Frame with a fault parameter defined in 11.6 to designated node as a responding.

5.10 Performance Management

Once 15 minutes or 24 hours expired, each node in a ring will issue Performance_Report frame with a performance parameter defined in 11.6 to designated node (connected to network management interface). The network management entity can pass Performance_Request Frame with a performance parameter defined in 11.6 from designated node to a targeted node if needed anytime. The targeted node responds by Performance_Response Frame with a performance parameter defined in 11.6 to designated node.

Figure 3:
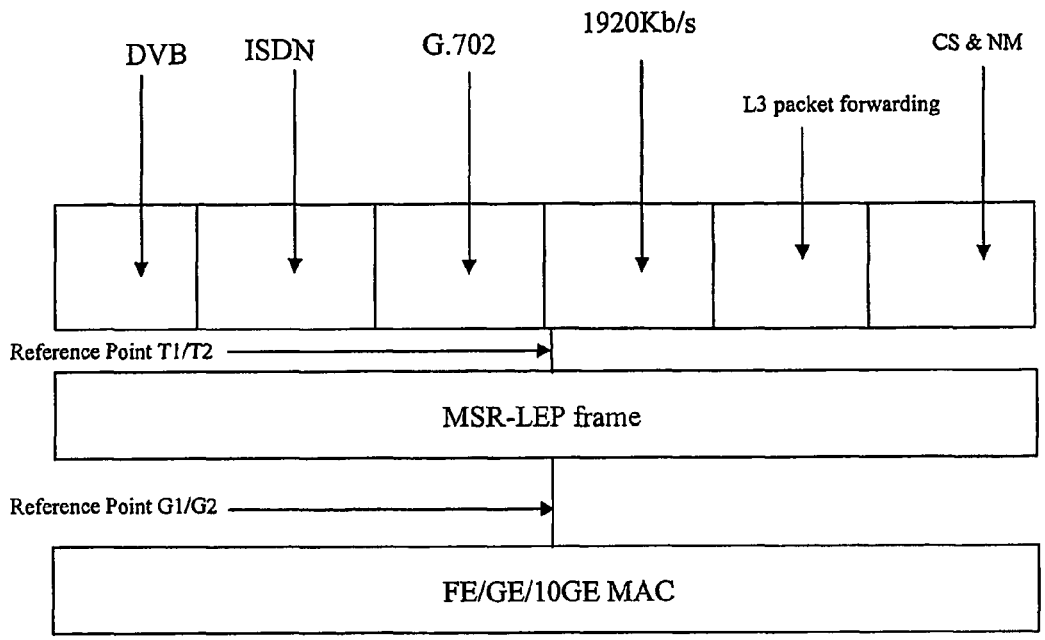
FIG. 3 is Generic Protocol Stack of MSR according to the present invention.

6 The Protocol Framework of Aggregate Pipe 6.1 The protocol framework of GE and 10GE based Aggregate Pipe The protocol framework of MSR-LEP is shown as FIG. 3. This Patent treats MSR-LEP as an upper layer protocol of Ethernet MAC of point-to-point full-duplex mode. The use of control signals is not required. The self-synchronous scrambling/descrambling function is not applied during insertion/ extraction into/from the MAC payload. Communication service facilities between MSR-LEP and MAC layer are accomplished by means of primitives (MAC-DATA request and MAC-DATA indication) according to the principle of ITU-T Recommendation X.211. Specification of Primitives presents the interaction between MSR-LEP and MAC layer to invoke and provide a service, and presents the elements of primitives.

MSR-LEP is the data link protocol, which provides point-to-point transferring over FE/GE/10GE MAC frame. The establishment and disconnection of tributary service are accomplished by the associated control signalling (just like Soft Permanent Virtual Circuit) or network management frames. Communications between data link and the associated upper protocols are accomplished by means of primitives according to the principle of ITU-T Recommendation X.212.

The service facility of MSR-LEP provided to other upper protocols via SAP (Service Access Point) is the DL-UNACK-DATA request primitive with "User data" (data frame in Tributary and L3 forwarding portion or frame of CS & NM) and "Priority" parameter set in a node, and the DL-UNACK-DATA indication primitive with "User data" (data frame in Tributary and L3 forwarding part or frame of CS & NM) and "Priority" parameter from received frame. "User data" is the outgoing/incoming upper layer packet. The default maximum frame size of MSR-LEP shall be within the scope of 1500 octets after taking into account the overhead of LEP frame. Supporting the maximum frame size of Ipv6 jumbo payload needs to further study. The octet stuffing procedure will not be used in this case.

An invalid frame is a frame which:
a) has fewer than sixteen octets within the MAC payload; or
b) contains a FCS error; or
c) contains a NA, U/M/B, TT or TN which are mismatched or not supported by the receiver.

Invalid frame shall be discarded without notification to the sender. But for the lost or duplicated frames of a tributary (including L3 forwarding packets), the results of performance monitoring should be reported to layer management entity and operated according to 11.6.

The connection management entity is used to monitor the link status of receiving the peer link frame. It is local matter only and has not any associated frame to be used between the two sides.

After initialization (the defaults of T200 and N200 are set to 10 milliseconds and 3 respectively), the MSR-LEP entity enters the normal way of transmitter and receiver.

If the timer T200 expires before any frame (including data/CS & NM frame and Inter-Frame Gap of Ethernet) is received, the MSR-LEP entity shall restart timer T200 and decrement the retransmission counter N200.

If timer T200 expires and retransmission counter N200 has been decremented to zero before any frame is received, the MSR-LEP entity shall indicate this to the local connection management entity by means of the MDL-ERROR indication primitive, and restart timer T200 and recover the value of N200.

The value of T200 and N200 shall be configurable. The minimum unit configured of T200 and N200 is 5 milliseconds and 1 respectively.

Figure 4:
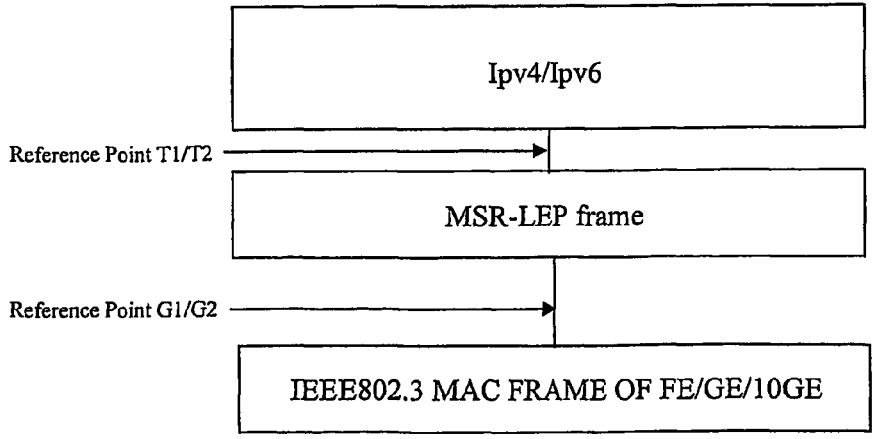
FIG. 4 is Protocol Stack of IP over LEP in GE and 10GE based Aggregate Pipe according to the invention, it will be used to Layer 3 forwarding packet.

Protocol stack of IP over FE/GE/10GE using MSR-LEP is shown in FIG. 4. It will be used to Layer 3 forwarding packets. The reference point G1/G2 and T1/T2 is reflected in and is corresponded to FIG. 2 and section 5.4 also.

FIG. 3 is Generic Protocol Stack of MSR according to the present invention;

FIG. 4 is Protocol Stack of IP over LEP in GE and 10GE based Aggregate Pipe according to the invention, it will be used to Layer 3 forwarding packet;

6.2 Tributary Adaptation Function Unit

Tributary Adaptation Function Unit is an adaptation function from/to various independent tributary type signals to/from reference point T1/T2. It has Tributary Adaptation Source Function and Sink Function. The Sink corresponds to reference point T1, The Source to reference point T2. This adaptation function includes the signal and rate transform, synchronous function between Tributary Rx/Tx Framer and tributary service interface.

7 Generic MSR Frame Format

Figure 5:
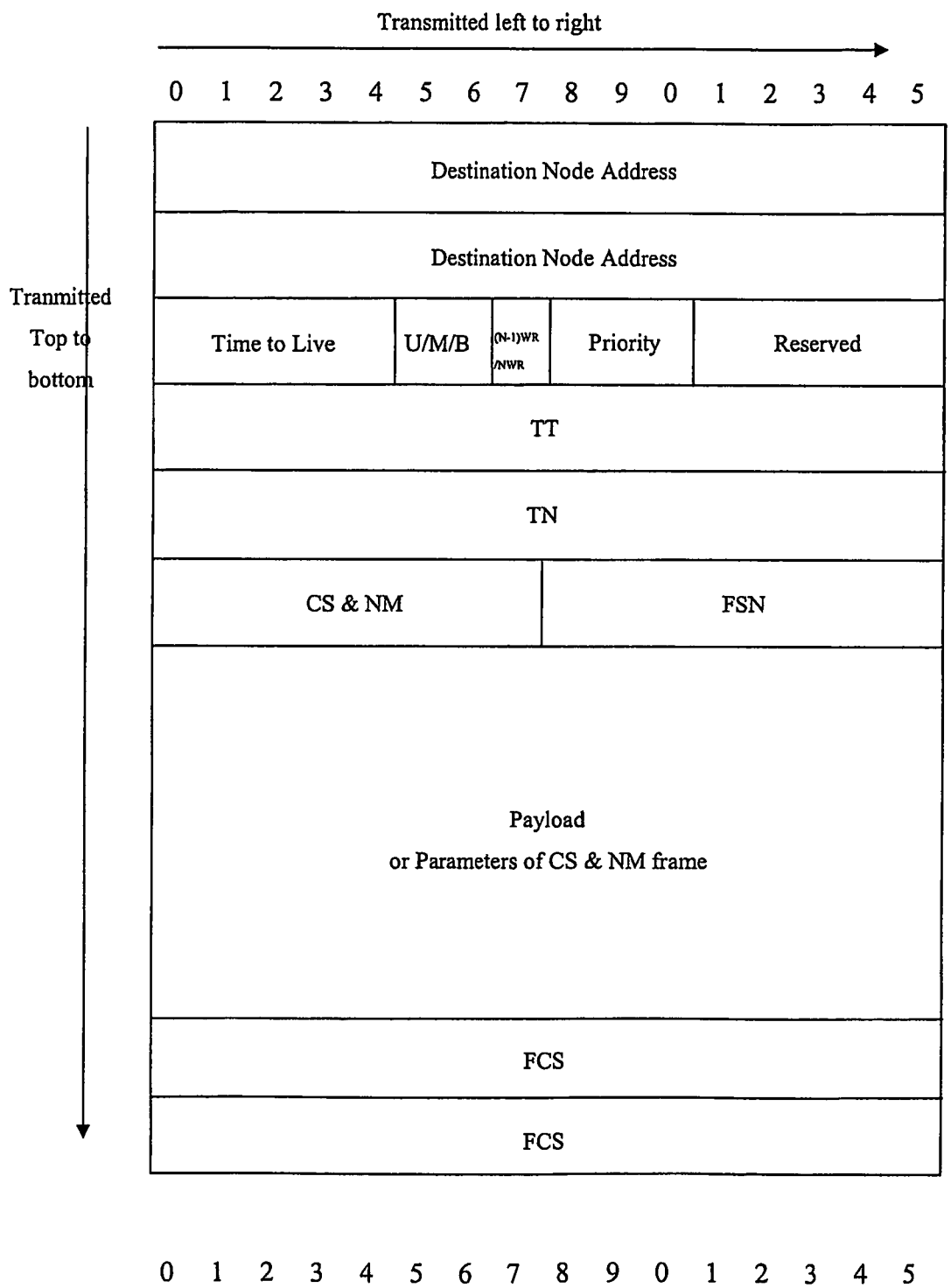
FIG. 5 illustrates Generic Frame Format of MSR for the working ring according to one embodiment of the invention.

Each MSR-LEP frame uses a fixed sized header. The generic frame format is shown in FIG. 5. All binary numbers in the following descriptions are in Most Significant Bit to Least Significant Bit order, reading from left to right, then two-octet based from top to bottom. The octets are also transmitted from left to right; then two-octet based from top to bottom, unless otherwise indicated. The 32-bit FCS transmission order and computation method of MSR frame are required to use the convention described in RFC 1662.

FIG. 5 illustrates Generic Frame Format of MSR for the working ring according to one embodiment of the invention;

The said fields are described below.

7.1 Destination Node Address

This 32-bit field is an address of Node Link on the MSR ring or other topologies defined in section 15. NA is a local address and has local meaning only along the MSR ring. It contains 4 octets. Each bit (binary "0" or "1") corresponds to a node. For example, the binary "00100000 00000000 00000000 00000000" stands for the $3^{rd}$ Node Address (station), the binary "00000100 00000000 00000000 00000000" stands for the $6^{th}$ Node Address (station) (refer to FIG. 1). You may also use binary "00000010 00000000 00000000 00000000" to stand for 7th Node Address of new insertion and the actual number location of the $7^{th}$ Node Address may be corresponded to middle position between Node 1 and Node 2 shown in FIG. 1 since the MSR supports online node insertion or deletion. All Node Address must be leftward alignment and be pre-installed by (NVROM) before engineering operation. The maximum node number of the MSR Ring is 32 (For implementation, people can use Ethernet MAC and Ipv4/Ipv6 address to perform external network management).

7.2 Time to Live

This 5-bit field is a count of hops that must be decremented every time of forwarding a frame from a node on MSR ring or other topologies defined in section 15.

7.3 (N−1)WR/NWR Field for the Working Ring

This single bit field indicates on which ring this frame is assigned to run. "0" and "1" stand for (N−1)WR for working ring and NWR indicated for protection respectively. If NWR is the working ring, "0" and "1" stand for NWR for working and FWR indicated for protection respectively.

7.4 U/M/B Field

The U/M/B stands for Unicast/Multicast/Broadcast of node based. This 2-bit field is defined as Table 3.

TABLE 3

Codes of U/M/B field

| U/M/B | Codes |
|---|---|
| Reserved | 00 |
| Unicast | 01 |
| Multicast | 10 |
| Broadcast | 11 |

7.5 Priority Field

This 3-bit field reflects priority level of MSR-LEP frame from 0 to 7. The value of priority is determined by manual setting of configuration via network management interface before engineering installation according to Service Level Agreement from carrier at the Tx side in a node. The larger the value is, the higher the priority is. It may also be modified online during service operation by using CT_Request and CT_Response frames.

7.6 Reserved Field

This 5-bit field is reserved for future use.

7.7 Tributary Type (TT) Field

This 16-bit field stands for a type of an independent adding/dropping tributary channel to/from the MSR (or other topologies) data nodes, Layer 3 forwarding packet, Control Signalling and Network management frame. Tributary channel can be various TCEs. Its codes are as follows (see Table 4).

7.8 Tributary Number (TN) Field

This 16-bit field is a number of same type of Tributary Port within a node. TN is 7 (Hex 0x0007) if the 7th ISDN or G.702 port is provided in front of panel in a node for example.

7.9 CS & NM Field

This 8-bit field is used to identify the types of control signalling and network management frame shown in Table 5 when TT is assigned to the value (Binary 00110111) of CS & NM frame. The FSN field is not used and set to Binary 00000000.

TABLE 5

Type of Control Signalling and Network Management Frame

| CS&NM Frame Types | Code |
|---|---|
| Reserved | 00000000 |
| Topology_Discovery_Request Frame | 00000001 |
| Topology_Discovery_Response Frame | 00000010 |
| L2PS_Request Frame | 00000011 |
| L2PS_Response Frame | 00000100 |
| L2PS_Event_Report | 00000101 |
| WTR_Request Frame | 00000110 |
| CT_Request Frame | 00000111 |
| CT_Response Frame | 00001000 |
| Fault_Report Frame | 00001001 |
| Fault_Inquiry_Request Frame | 00001010 |
| Fault_Inquiry_Response Frame | 00001011 |
| Performance_Report Frame | 00001100 |
| Performance_Inquiry_Request frame | 00001101 |
| Performance_Inquiry_Response frame | 00001110 |
| SYNCHRONIZATION Request | 00001111 |
| SYNCHRONIZATION Confirm | 00010000 |

TABLE 4

TT Codes

| Tributary types | Code |
|---|---|
| Reserved | 00000000-00001000 |
| G.702 PDH circuit - Synchronous circuit transport | 00001001 |
| G.702 PDH circuit - Asynchronous circuit 1.544 Mbit/s | 00001010 |
| G.702 PDH circuit - Asynchronous circuit 2.048 Mbit/s | 00001011 |
| G.702 PDH circuit - Asynchronous circuit 6.312 Mbit/s | 00001100 |
| G.702 PDH circuit - Asynchronous circuit 8.448 Mbit/s | 00001101 |
| G.702 PDH circuit - Asynchronous circuit 34.368 Mbit/s | 00001110 |
| G.702 PDH circuit - Asynchronous circuit 44.736 Mbit/s | 00001111 |
| G.702 PDH circuit - Synchronous circuit 1.544 Mbit/s | 00010000 |
| G.702 PDH circuit - Synchronous circuit 2.048 Mbit/s | 00010001 |
| G.702 PDH circuit - Synchronous circuit 6.312 Mbit/s | 00010010 |
| G.702 PDH circuit - Synchronous circuit 8.448 Mbit/s | 00010011 |
| G.702 PDH circuit - Synchronous circuit 34.368 Mbit/s | 00010100 |
| G.702 PDH circuit - Synchronous circuit 44.736 Mbit/s | 00010101 |
| Reserved for other PDH or DSL specification | 00010110-00010111 |
| Video signal - Distributive television services | 00011000 |
| Video signal - Conversational services of bit rates higher than primary rates | 00011001 |
| Video signal - Conversational services of p × 64 kbit/s signals | 00011010 |
| Reserved for other Video signals | 00011011-00011111 |
| Voiceband signal - 64 kbit/s A-law coded Recommendation G.711 signals | 00100000 |
| Voiceband signal - 64 kbit/s μ-law coded Recommendation G.711 signals | 00100001 |
| Reserved for other Voiceband signals | 00100010-100111 |
| Digital channel supported by 64 kbit/s-based ISDN - Transport of 64 kbit/s channel | 00101000 |
| Digital channel supported by 64 kbit/s-based ISDN - Transport of 384, 1536 or 1920 kbit/s channel | 00101001 |
| Reserved for other TCEs | 00101010-00101000 |
| Reserved | 00110100-00110101 |
| L3 Forwarding Packet | 00110110 |
| CS & NM Frame | 00110111 |
| Other MSR Tributary for GE | 00111000 |
| Reserved | 00111001-11111111 |

Node 1: The higher octet (left octet) of TT is default set to "00000000" and reserved for future use.

TABLE 5-continued

Type of Control Signalling and Network Management Frame

| CS&NM Frame Types | Code |
|---|---|
| CONNECTION_Request frame | 00010001 |
| CONNECTION_Confirm frame | 00010010 |
| DISCONNECTION_Request frame | 00010011 |
| DISCONNECTION_Confirm frame | 00010100 |
| MDL_ERROR_Indication Request frame | 00010101 |
| L2PS_RECOVERY_EVENT_Report | 00010110 |
| Reserved | 00010111-11111111 |

Node 1: Node_SYNCHRONIZATION Request frame will have the highest priority of delivery and receiving for each station.
Node 2: The codes assignment of Tributary based protection, multicast, bandwidth policing, security and rate duplication is also shown in section 12, 13 and 14.

7.10 Frame Sequence Number (FSN) Field

This 8-bit field is used to identify Frame Sequence Number (FSN) of TCE data frames or IP related L3 forwarding packets in numbered modulo N_fsn=64 (default value, N_fsn is programmable and can be configured to 256 if application needs) from 0 to 63. The field is used to performance monitoring function for packet lost or duplicated of TCE based tributary. The related operation is given in section 11.3. The FSN field will be set to zero if the signalling control frames or network management frames are used.

7.10.1 Processing in the Transmit Side

The DL provides a sequence count value and a DL indication associated with each frame in the transmit side. The count value applied to FSN field and starts with 0, it is incremented sequentially to 63 and numbered modulo is 64. When the data link frames carrying Tributary payloads traverse a MSR or other topologies, they may arrive destination station disorderly, or lost or duplicated one or more frames. Due to this reason, it is required that frames must be delivered in order.

7.10.2 Processing in the Receive Side

The Data Link entity in the receive side must detect the lost or duplicated frames, and track the following status of dynamic data stream:

a Frame sequence number and count;

Frame loss (if occur);

Frame duplication (if occur).

There are two ways to solve the real-time processing problem, (1) try to reorder and sort into the correct order, or (2) drop those disordering frames, when disordering case occurred. In implementation, these two methods should be all supported. If method (1) does not meet reliability transport and performance requirement still, the method (2) will be applied. Due to the limitation of native speed and acceptable delay of data link processing, this Patent does not support correction method for bit errors and frame losses. If the event of any lost or duplicated frame occurred, data link entity will report to the layer management entity by MDL-ERROR-Indication (see 11.3.2.2.3).

7.11 Payload

When Tributary or Node based Layer 3 Forwarding Packet is applied, payload field is used to encapsulate upper layer protocols listed in Table 4. Payload is octet-oriented and its size is variable. The default maximum frame size shall be capable of supporting an information field of 1500 octets (at least) for both IPv4-based and IPv6-based applications (the support of jumbo payload needs to study further). Except for Tributary, the payload of Layer 3 forwarding packet, control signalling frame and network management is described below.

7.11.1 Node Layer 3 Forwarding Part

Layer 3 forwarding Packet is a packet used to forward data packet in a node. This packet is different from those packets of reaching a Tributary in a node, is also different from network management frames and control signalling frames. Logically, a MSR data node can be treated as a router of performing Layer 3 forwarding when a Layer 3 forwarding Packet is forwarded according to routing table and routing protocols of IPv4/IPv6 in a node from the node to other node along the MSR ring or other topologies.

7.11.2 Control Signalling and Network Management Part

Figure 6:
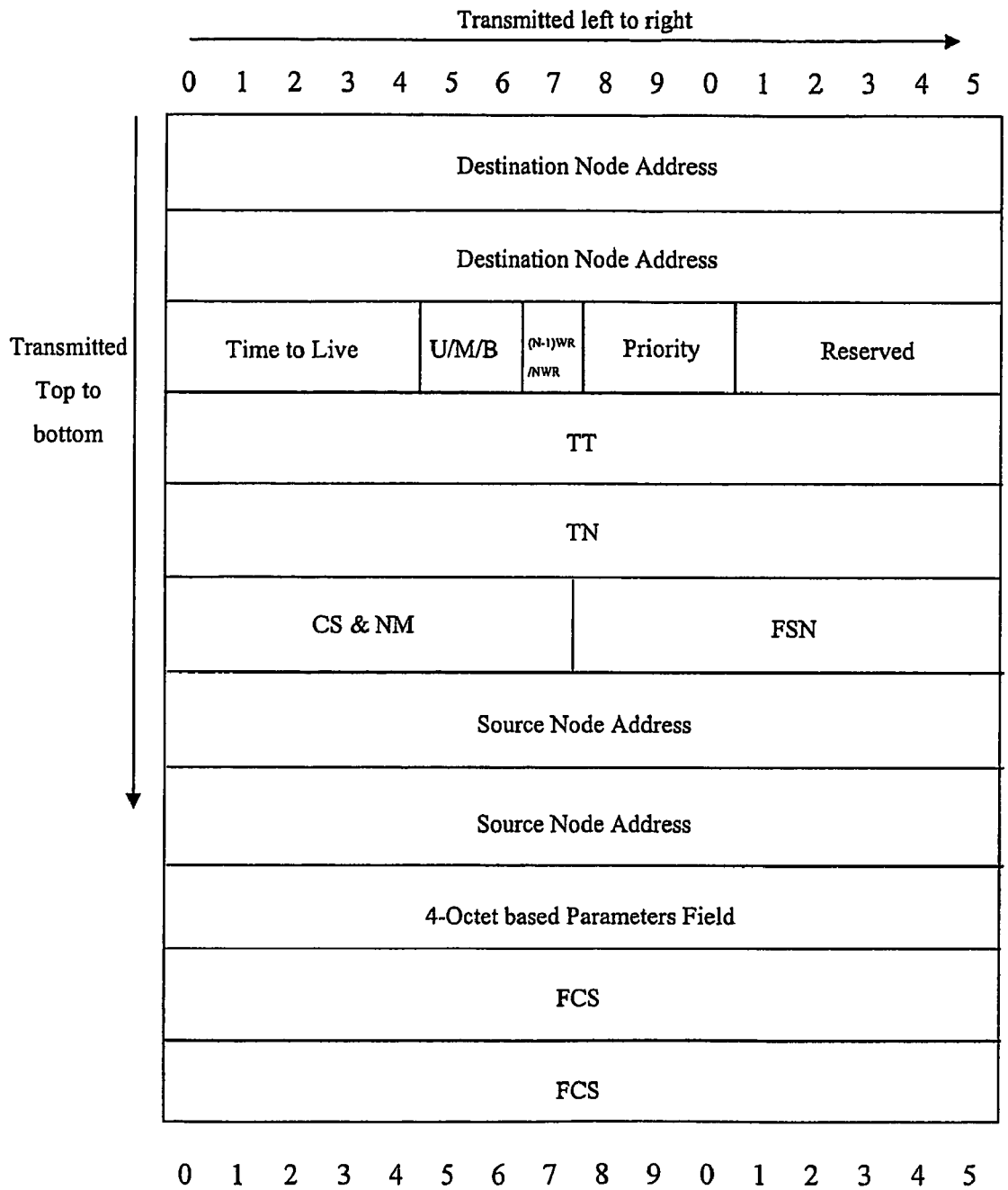
FIG. 6 illustrates Generic Format of CS & NM Frames according to one embodiment of the invention.

FIG. 6 illustrates Generic Format of CS & NM Frames according to one embodiment of the invention;

The above arrangement of the specific fields can be adjusted or modified according to the scope of the invention. The above embodiments are only for example.

The MSR-LEP does work by sending both data frame and the associated network management/control frames in both (N−1)WR and NWR. Generic format of CS & NM Frames is shown in FIG. 6. The difference of the parameter field indicates various control signalling and network management frames below. The first octet of parameters field is used to identify how many parameters are used by CS & NM frame. Each parameter following $1^{st}$ octet consists of type (or tag), length and value of parameter. If the total octet number of parameters field is not based on 4-octet, it is optional that the octets padding (Binary 00000000) may be used.

7.11.2.1 Topology Discovery Frame

The initial TTL value should be the total number of actual working stations (or nodes) and is determined by provisioning during project installation. The operation of Topology_Discovery_Request and Topology_Discovery_Response Frame are shown in 5.7.1 and Table 6 gives a Null parameter. U/M/B field is set to broadcast and priority is 6 (prior to the highest).

TABLE 6

/X.msr - Parameter Type of Topology_Discovery_Request and Topology_Discovery_Response Frames

| Parameter type | Value of Parameter Field |
|---|---|
| Null | Binary "00000001 00000000 00000000 00000000" |

7.11.2.2 Parameters of L2PS_Request Frame

The First and Second Parameter Type of L2PS_Request Frame has Forced Switch, PSF, PSD and Manual Switch. Its value is defined as Table 7 and Table 8. The corresponding operation can be got in 5.7.2 and 5.7.3.

TABLE 7

/X.msr - First Parameter Type of L2PS_Request Frame

| Parameter type | Value of Parameter Field |
|---|---|
| Forced_Switch | Binary "00000001 00000100 00000001 00000000" |
| PSF | Binary "00000001 00000011 00000001 00000000" |
| PSD | Binary "00000001 00000010 00000001 00000000" |
| Manual_Switch | Binary "00000001 00000001 00000001 00000000" |

TABLE 8

/X.msr - Second Parameter Type of L2PS_Request Frame

| Parameter type | Value of Parameter Field |
|---|---|
| FWR_Fibre_Cut | Binary "00000001 00000110 00000001 00000000" |
| NWR_Fibre_Cut | Binary "00000001 00000101 00000001 00000000" |

7.11.2.3 Parameters of L2PS_Response Frame

The Parameter Type of L2PS_Request Frame has Successful_Switch, or Unsuccessful_Switch. Its value is defined as Table 9. The corresponding operation can be got in 5.7.3.

TABLE 9

Parameter Type of L2PS_Response Frame

| Parameter type | Value of Parameter Field |
| --- | --- |
| Successful_Switch | Binary "00000001 00001000 00000001 00000000" |
| Unsuccessful_Switch | Binary "00000001 00000111 00000001 00000000" |

7.11.2.4 Parameters of L2PS_Event_Report Frame

The Parameter Type of L2PS_Event_Report Frame has Successful_Switch, or Unsuccessful_Switch. Its value is defined as Table 10, Table 11 and Table 12. The corresponding operation can be got in 5.7.3.

TABLE 10

First Parameter Type of L2PS_Event_Report Frame

| Parameter type | Value of Parameter Field |
| --- | --- |
| Forced Switch | Binary "00000001 00000100 00000001 00000000" |
| PSF | Binary "00000001 00000011 00000001 00000000" |
| PSD | Binary "00000001 00000010 00000001 00000000" |
| Manual Switch | Binary "00000001 00000001 00000001 00000000" |

TABLE 11

Second Parameter Type of L2PS_Event_Report Frame

| Parameter type | Value of Parameter Field |
| --- | --- |
| (N-1)WR_Fibre_Cut | Binary "00000001 00000110 00000001 00000000" |
| NWR_Fibre_Cut | Binary "00000001 00000101 00000001 00000000" |

TABLE 12

Third Parameter Type of L2PS_Event_Report Frame

| Parameter type | Value of Parameter Field |
| --- | --- |
| L2PS_State | Binary "00000001 00001010 00000001 00000000" |
| Normal_State | Binary "00000001 00001001 00000001 00000000" |

7.11.2.5 Parameters of WTR_Request Frame

The corresponding operation can be got in 5.7.3 and parameter is shown in Table 13.

TABLE 13

Parameter Type of WTR_Request Frame

| Parameter type | Value of Parameter Field |
| --- | --- |
| Successful_WTR | Binary "00000001 00001011 00000001 00000000" |

7.11.2.6 CT_Request Frame

The code value of CT-Request Frame is binary "00000111". CT-Request Frame can be applied to point-to-point operation of Tributary based and node based, and also used to node based multicast/broadcast operation. For the Tributary based multicast/broadcast operation, please refer to as section 13 of this Patent. The major portion of CT is TCCR ID. A TCCR ID consists of TNi ID (This is an identifier of Tributary p within node x), 2-bit U/M/B field, 14-bit length field (This filed is used to represent the total number of Tributary TNj ID following length field) and one or more TNj ID (This is an identifier of Tributary q within node y). ID is a value of identifier, TNi, TNj, TNk and TNm are the ith Tributary Number of same TT of Node n, the jth Tributary Number of same TT of Node o, the kth Tributary Number of same TT of Node p and the mth Tributary Number of same TT of Node q. The values of n, o, p, q are 0 through 31, and stands for numbering of node. The values of i, j, k, l are 0 through $2^{16}-1$, and stands for tributary number with the same TT value.

Figure 7:
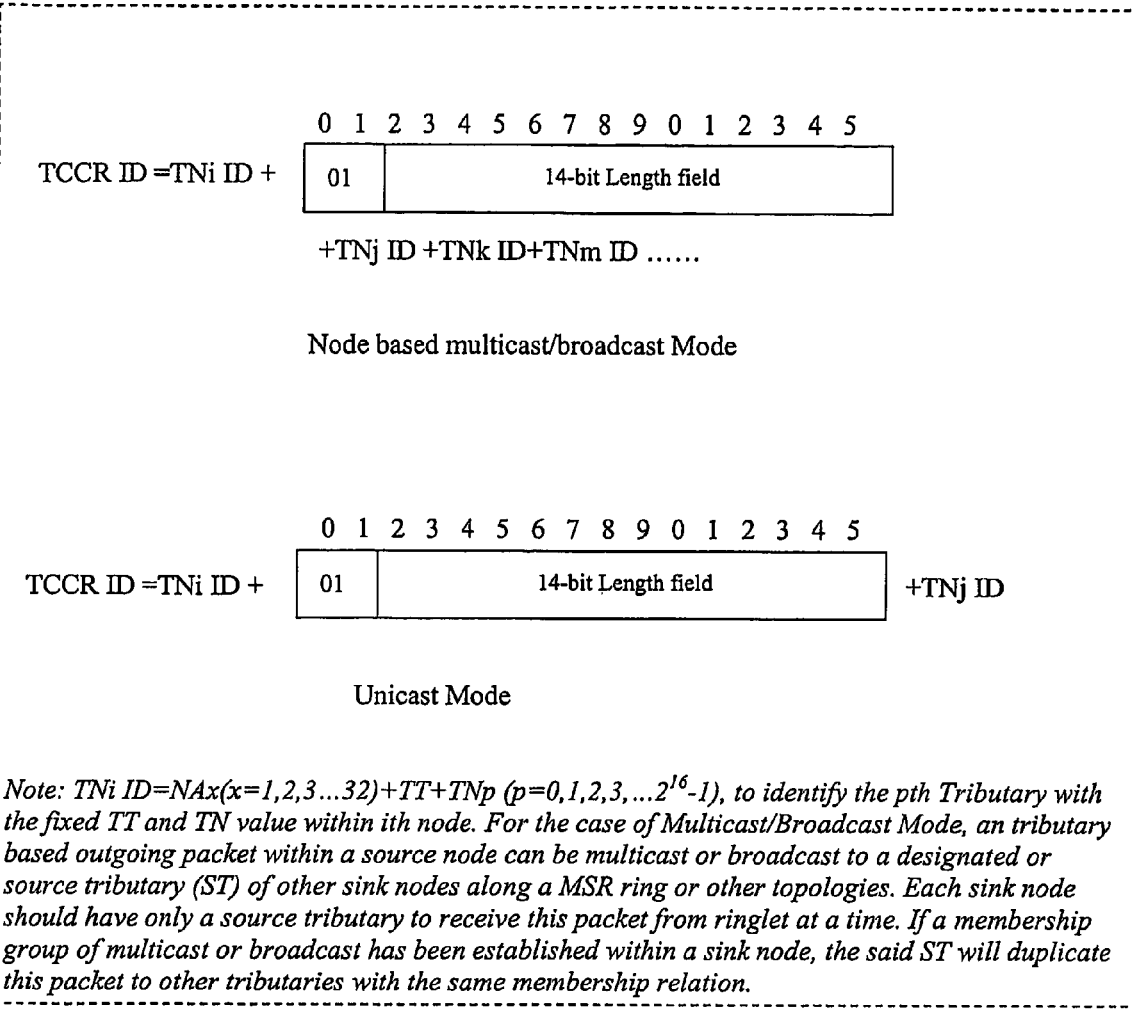
FIG. 7 is expressions of TNID and TCCR ID according to the invention.

FIG. 7 is expressions of TNID and TCCR ID according to the invention. In FIG. 7, TNi ID=NAx(x=1, 2, 3 . . . 32)+TT+TNp (p=0, 1, 2, 3, . . . $2^{16}-1$), to identify the pth Tributary with the fixed TT and TN value within ith node. For the case of Multicast/Broadcast Mode, an tributary based outgoing packet within a source node can be multicast or broadcast to a designated or source tributary (ST) of other sink nodes along a MSR ring or other topologies. Each sink node should have only a source tributary to receive this packet from ringlet at a time. If a membership group of multicast or broadcast has been established within a sink node, the said ST will duplicate this packet to other tributaries with the same membership relation.

What the ICT, CUT and Null parameters indicate is three different operations: ICT, CUT and CTI. Its type and field are described below in Table 14.

TABLE 14

Parameter Type of CT_Request Frame

| Parameter type | Parameter Field |
| --- | --- |
| ICT | Binary "00000001 00100000 +" octet number of parameter"+"value of TCCR ID shown in FIG. 7" |
| CUT | Binary "00000001 00100001 +" octet number of parameter"+"value of TCCR ID shown in FIG. 7" |
| Null | Binary "00000001 00100011 00000001 00000000" |

7.11.2.7 CT_Response Frame

Null parameter in CT_Response Frame is used by ICT and CUT operation. CTI parameter is followed by CTI operation.

TABLE 15

Parameter Type of CT_Request Frame

| Parameter type | Parameter Field |
| --- | --- |
| CTI | Binary "00000001 00100100 +" octet number of parameter"+"value of TCCR ID shown in FIG. 7" |
| Null | Binary "00000001 00100011 00000001 00000000" |

The corresponding operation can be got in 5.8 and parameter is shown in Table 15.

7.11.2.8 Fault_Report Frame

TABLE 16

Parameter Type of Fault_Report Frame

| Parameter type | Parameter Field |
| --- | --- |
| PSF | Binary "00000001 00000011 00000001 00000000" |
| PSD | Binary "00000001 00000010 00000001 00000000" |

The corresponding operation can be got in 5.9 and parameter is shown in Table 16.

7.11.2.9 Parameter of Fault_Inquiry_Request Frame

TABLE 17

Parameter Type of Fault_Inquiry_Request Frame

| Parameter type | Parameter Field |
|---|---|
| Null | Binary "00000001 00100011 00000001 00000000" |

The corresponding operation can be got in 5.9 and parameter is shown in Table 17.

7.11.2.10 Parameter of Fault_Inquiry_Response Frame

TABLE 18

Parameter Type of Fault_Inquiry_Request Frame

| Parameter type | Parameter Field |
|---|---|
| PSF | Binary "00000001 00000011 00000001 00000000" |
| PSD | Binary "00000001 00000010 00000001 00000000" |

The corresponding operation can be got in 5.9 and parameter is shown in Table 18.

7.11.2.11 Parameter of Performance_Report Frame

TABLE 19

Parameter Type of Performance_Report Frame

| Parameter type | Parameter Field |
|---|---|
| A set of TNi in a node (designated) | Binary "00000001 01000000 + " octet number of parameter" + "value of TNi shown in FIG. 7" |
| TNFCS_15m (Total Number of FCS error in 15 minutes, 4 octets, 4 octets length) | Binary "00000001 01000001 00000100" value of TNFCS-15m shown in FIG. 7" |
| TNPL_15m (Total Number of Frame Loss in 15 minutes, 4 octets length) | Binary "00000001 01000001 00000100" value of TNPL-15m shown in FIG. 7" |
| TNFCS_24h (Total Number of FCS error in 24 hours, 5 octets length) | Binary "00000001 01000001 00000101" value of TNFCS-24h shown in FIG. 7" |
| TNPL_24h (Total Number of Frame Loss in 24 hours, 5 octets length) | Binary "00000001 01000001 00000101" value of TNPL-24h shown in FIG. 7" |

TNFCS and TNPL represents two different registers reflected values of "Total Number of FCS error" and "Total Number of Frame Loss" respectively.

The corresponding operation can be got in 5.10 and parameter is shown in Table 19.

7.11.2.12 Parameter of Performance_Inquiry_Request Frame

TABLE 20

Parameter Type of Performance_Inquiry_Request Frame

| Parameter type | Parameter Field |
|---|---|
| A set of TNi in a node (designated) | Binary "00000001 01000000 + "octet number of parameter" + "value of TNi shown in FIG. 7" |

The corresponding operation can be got in 5.10 and parameter is shown in Table 20.

7.11.2.13 Parameter of Performance_Inquiry_Response Frame

TABLE 21

Parameter Type of Performance_Inquiry_Response Frame

| Parameter type | Parameter Field |
|---|---|
| A set of TNi in a node (designated) | Binary "00000001 01000000 + " octet number of parameter" + "value of TNi shown in FIG. 7" |
| TNFCS_15m (Total Number of FCS in 15 minutes, 4 octets length) | Binary "00000001 01000001 00000100" value of TNFCS-15m shown in FIG. 7" |
| TNPL_15m (Total Number of Frame Loss in 15 minutes, 4 octets length) | Binary "00000001 01000001 00000100" value of TNPL-15m shown in FIG. 7" |
| TNFCS_24h (Total Number of FCS in 24 hours, 5 octets length) | Binary "00000001 01000001 00000101" value of TNFCS-24h shown in FIG. 7" |

TABLE 21-continued

Parameter Type of Performance_Inquiry_Response Frame

| Parameter type | Parameter Field |
| --- | --- |
| TNPL_24h (Total Number of Frame Loss in 24 hours, 5 octets length) | Binary "00000001 01000001 00000101" value of TNPL-24h shown in FIG. 7" |

TNFCS and TNPL represents two different registers reflected values of "Total Number of FCS error" and "Total Number of Frame Loss" respectively.

The corresponding operation can be got in 5.10 and parameter is shown in Table 21.

7.12 FCS

The Frame Check Sequence field defines as 32 bits (four octets). The FCS field is calculated over all bits of the Destination Node Address, Time to Live, U/M/B, Priority, TT, TN, CS & NM, payload (or associated parameters for CS & NM frames). Please refer to X.85/Y.1321 for the calculation of 32-bit FCS.

8 Filter and Schedule Function

MSR filtering function is a filtering and checking facility for NA and TTL of a frame. All frames reaching to the MSR filter Unit will be sent first to a buffer in the Node. The MSR data node will check TTL and NA of a frame and perform XOR function with local NA. This frame will be taken away if TTL is zero. If its NA is match, those frames reaching destination will be processed by MSR-LEP processor and not be sent to neighbour (except for multicast and broadcast frames). Otherwise, those mismatched frame will go to neighbour directly by schedule unit along MSR ring or other topologies without any processing after decrementing TTL field. This is MSR filtering function.

MSR scheduling function is a set of functions used to MSR-LEP protocol processing in Tx direction. It includes Tx Schedule Unit, functions of determination of NA, TTL, TT, TN, FSN, FCS, multicast/broadcast according to types and port configuration of Tributary, a route of Layer 3 forwarding packet, requirement of control signalling or requirement of network management. The other associated MSR-LEP protocol processing is also covered.

9 Data Node insertion and Deletion

A data node can be inserted/removed online into/from the ring by using topology discovery (5.7.1) and L2PS (5.7.2 and 5.7.3) functions while other data nodes and services will be operated normally without frame loss and service loss on (N−1)-ringlet on condition that either NWR is protection channel of (N−1)WR.

10 Tributary Loopback

Once loopback function is set, a node provides local or remote data channel shortcut from Tx interface to Rx interface in Tributary.

11 TDM Circuit Emulation (TCE) over MSR 11.1 Introduction

This section provides a protocol model along MSR for TDM based bit-stream or octet-steam over MSR. Each station can have one or more TCEs as Tributary. TCE is operated end-to-end and is originated from the source station and terminated at the sinkstation. TCE can be operated in the way of half-duplex point-to-point, full-duplex point-to-point or half-duplex point-to-multipoint. The two TCE channels are shown in FIG. 8.

Figure 8:
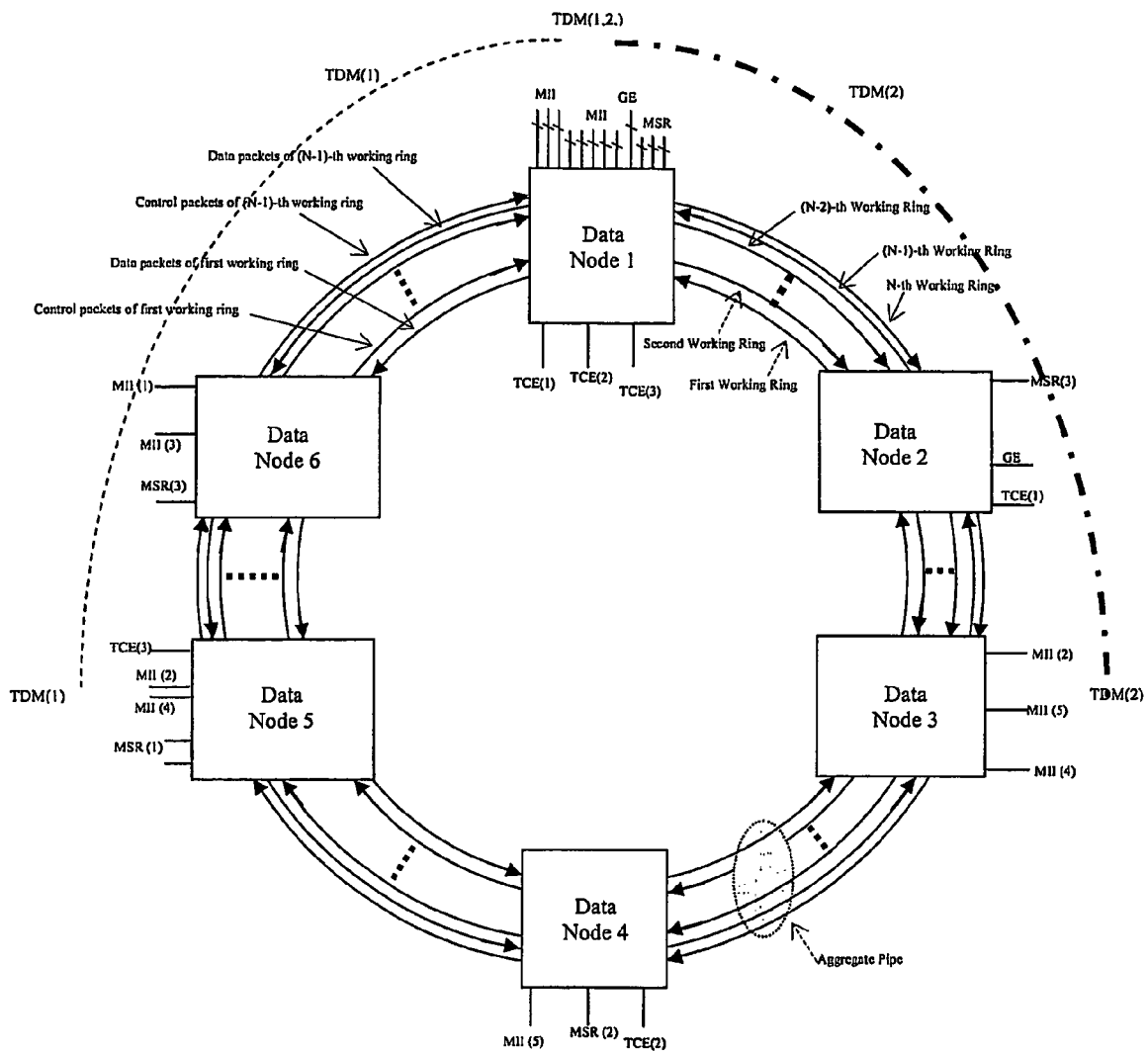
FIG. 8 illustrates the TDM Service Channel along MSR according to the invention.

FIG. 8 illustrates the TDM Service Channel along MSR according to the invention;

11.2 Protocol Framework of TDM Circuit Emulation (TCE)

Figure 9:
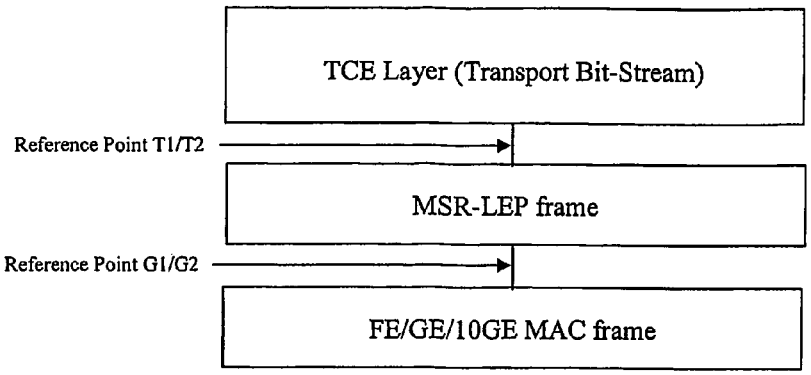
FIG. 9 shows The TDM Service Channel over Bit FE/GE/10GE according to the invention.

The protocol framework of TCE is involved in the underlying FE/GE/10GE aggregate pipe shown in FIG. 9. The functions of encapsulation, real-time transport of order, detection of disorder and duplication, sorting, error report, primitives and related parameters, and timing synchronous processing etc are performed within the MSR-LEP.

FIG. 9 shows The TDM Service Channel over Bit FE/GE/10GE according to the invention;

11.3 Services provided by MSR Data Link 11.3.1 Definitions

The layer services provided by MSR Data link to TCE layer are:

Transfer of service data units with a constant source bit rate from TCE layer and the delivery of them with the same bit rate in MSR data link layer; and/or Transfer of timing information between source and destination; and/or Transfer of structure information between source and destination; and/or Indication of lost, duplicated or errored information that is not recovered by MSR data link if needed.

11.3.2 Primitives between DL and the DL User 11.3.2.1 General

At the Service Access Point (SAP) of MSR DL, the following primitives is used between the MSR DL and the TCE layer:

From a TCE layer to the MSR DL,
  DL-UNACK-DATA Request;
From the MSR DL to the TCE layer,
  DL-UNACK-DATA Indication.
From the MSR DL to the management entity;
  MDL-ERROR Indication.

A DL-UNACK-DATA request primitive at the local DL-SAP (Data Link-Service Access Point) will result in a DL-UNACK-DATA indication primitive at its peer DL-SAP.

11.3.2.2 Definition of Data Link Primitives 11.3.2.2.1 DL-UNACK-DATA request (not be used to signalling frame)

DL-UNACK-DATA request (USERDATA [Necessary], STRUCTURE [optional])

The DL-UNACK-DATA request primitive requests the transfer of the DL-SDU (Data Link-Service Data Unit), i.e. contents of the USERDATA parameter, from the local DL entity to its peer entity. The length of the DL-SDU and the time interval between two consecutive primitives is constant. These two constants are a function of the DL service provided to the TCE layer.

11.3.2.2.2 DL-UNACK-DATA indication (Does not have signalling frame)

DL-UNACK-DATA indication (USERDATA [Necessary], STRUCTURE [optional], ERROR [optional])

A DL user is notified by the DL that the DL-SDU, i.e. contents of the USERDATA parameter, from its peer is available. The length of the DL-SDU and the time interval between two consecutive primitives should be constant. These two constants are a function of the DL service provided to the TCE layer.

11.3.2.2.3 MDL-ERROR Indication

MDL-ERROR indication (T_error [Necessary],
REG_lost [optional],
REG_duplicated [optional])

REG_lost and REG_duplicated parameters are used to identify how many sequence frames are lost and duplicated by FSN detection from the transmit side to receive side in the specific period (T_error). Once sequence lost or duplicated is occurred, MDL-ERROR indication will be applied.

11.3.2.4 Definition of Primitive Parameters 11.3.2.4.1 USERDATA Parameter

The USERDATA parameter carries the DL-SDU to be sent or delivered. The size of each block to be delivered depends on the specific DL layer service used. For the same type of TCE payload, i.e. ITU-T G.702 PDH circuit, the payload length of DL-PDU is constant and default is set to 64 bytes. For the supported TCE payloads, the payload length of DL-PDUs (Data Link-Protocol Data Unit) is defined as following.

TABLE 22

Selection of Default Payload Length of DL-PDU

| Types of TCE payload | Default Payload Length of DL-PDU (bytes) |
|---|---|
| G.702 PDH circuit - Synchronous circuit transport | 64 |
| G.702 PDH circuit - Asynchronous circuit transport | 64 |
| Video signal - Distributive television services | 188 |
| Video signal - Conversational services of bit rates higher than primary rates | 188 |
| Video signal - Conversational services of p × 64 kbit/s signals | 188 |
| Voiceband signal - 64 kbit/s A-law or μ-law coded Recommendation G.711 signals | 64 |
| Digital channel supported by 64 kbit/s-based ISDN - Transport of 64 kbit/s channel | 64 |
| Digital channel supported by 64 kbit/s-based ISDN - Transport of 384, 1536 or 1920 kbit/s channel | 64 |

11.3.2.4.2 STRUCTURED Parameter (Option of DL-UN-ACK-DATA Primitive)

The STRUCTURED parameter can be used when the data stream of TCE layer to be transferred to the peer DL entity is organized into groups of bits. The length of the structured block is fixed for each instance of the DL service. The length is an integer multiple of 32 bits. An example of the use of this parameter is to support circuit mode bearer services of the 64 kbit/s-based ISDN. The two values of the STRUCTURED parameter are:

BOUND and
DATA-STREAM.

The value BOUND is used when the USERDATA is the first part of a structured block which can be composed of consecutive USERDATA. In other cases, the structure parameter is set to DATA-STREAM. The use of the STRUCTURED parameter depends on the type of DL service provided. The use of this parameter is agreed prior to or at the connection establishment by network management between the TCE layer and the DL layer. In most application, the function of "STRUCTURE parameter" has been covered by the transform and adaptation function of Tributary at the Tributary interface within a node since MSR-LEP uses pre-plan and connection oriented policy, and TCCR is made (e.g. ISDN 64 kb/s Tributary source in a node to ISDN 64 kb/s Tributary sink, E1 Tributary source in a node to E1 Tributary sink) by network management entity or control signalling before Tributary service is operated on-line.

11.3.2.4.3 ERROR Parameter (Option of DL-UNACK-DATA Primitive)

The ERROR parameter is involved to identify that the USERDATA is errored or non-errored. The ERROR parameter has two values:

NO and
YES.

The "YES" value does imply that the USERDATA covers a dummy value within this frame. The "NO" value implies that the no error is found from transmit to receive side. The use of the ERROR parameter and the choice of dummy value depend on the type of DL service provided. The use of this parameter is agreed prior to or at the connection establishment of TCCR between the TCE layer and the DL layer.

11.3.2.4.4 T_error, REG_lost and REG_duplicated Parameters

The connection management entity is used to monitor the error status of receiving the peer link frame at peer-to-peer level. It is local matter only and has not any associated frame to be used between the two sides.

REG_lost and REG_duplicated parameters are attached to MDL-ERROR Indication primitive to identify how many sequence frames are lost and/or duplicated from the transmit side to receive side in the specific period (T_error). Their accumulation values are stored and transformed to the two specific registers in the receive side. The parameter T_error in the unit of second is an initial value (15 minutes and 24 hours are two default values) and configurable by the network management entity according to the rate of specific service over DL. Each Tributary has the corresponding REG_lost and REG_duplicated, and is separated operated from other Tributary. At the beginning of MSR Data Node start-up, the REG_lost and REG_duplicated of each Tributary are clear and set to zero.

If the timer T_error expires before no lost or duplicated frames are received, the link entity shall restart timer T_error. The DL entity shall not indicate this to the local connection management entity.

Once the timer T_error expires if any lost or duplicated frame is received, the DL entity shall indicate this to the local connection management entity by means of the MDL-ERROR indication primitive, and restart timer T_error.

11.4 Supported Functions of MSR DL for TCE Case

The following functions can be performed in the MSR DL in order to meet requirements of TDM timing, structure, jitter and wander:

a) source clock frequency recovery at the receiver;
b) recovery of the source data structure at the receiver;
c) blocking and deblocking of DL user information;
d) control of frame latency variation;
e) processing of lost or duplicated frames;

NOTE—For some DL users, the end-to-end QOS monitoring may be needed to provide. This function can be achieved by calculating a CRC, reporting lost or duplicated frames in the default period (e.g. 15 minutes and 24 hours) for the DL-PDU, A corresponding periodic count of CRC computation, values of REG_lost and REG_duplicated are sent to network management entity.

11.4.1 TCE Processing Mode 11.4.1.1 Processing mode of G.702 PDH

For this sub-section, it is necessary to identify TCE data structure and the clock operation mode at the DL service boundary, i.e. framing or non-framing, types of clock (synchronous or asynchronous) where needed to make comparison to a network clock. Asynchronous and synchronous TCE transport provides transport of signals from TCE sources whose clocks are non-frequency-locked and frequency-locked to a network clock respectively. The judgement of synchronous or asynchronous will depend on the service provided by the specific network, i.e. PDH, SDH, or ISDN. Care should be. taken to select the shortest transport path, control priority of delivery and transient, and reduce transport latency and latency variation along MSR during the project installation phase.

1) Asynchronous G.702 circuit
Circuit rate at DL service boundary: 1.544, 2.048, 6.312, 8.448, 44.736 and 34.368 Mbit/s as described in Recommendation G.702.
Payload size to be encapsulated: see Table 22
Source clock frequency recovery: Asynchronous frequency
Error status indication at the receiver: count report of lost or duplicated frames by MDL-ERROR Indication primitive.

2) Synchronous G.702 circuit
Circuit rate at DL service boundary: 1.544, 2.048, 6.312, 8.448, 44.736 and 34.368 Mbit/s as described in Recommendation G.702.
Payload size to be encapsulated: see Table 22
Source clock frequency recovery: Synchronous timing
Error status indication at the receiver: count report of lost or duplicated frames by MDL-ERROR Indication primitive.

11.4.1.2 Processing Mode of Video Signal Transport

This sub-section presents the processing mode of Video signal transport. Care should be taken to select the shortest transport path, control priority of delivery and transient, and reduce transport latency and latency variation along MSR during the project installation phase.

1) Mode of Conversational Services of p×64 kbit/s Signals
This sub-section gives the processing mode of interactive video signals of the p×64 videotelephony and videoconference applications as described in Recommendation H.320.
a) Circuit rate at DL service boundary: 384, 1536 or 1920 kbit/s in the 64 kbit/s-based ISDN by using H0, H11, H12, respectively.
b) Payload size to be encapsulated: see Table 22
c) Source clock frequency recovery: Synchronous timing
d) Error status indication at the receiver: count report of lost or duplicated frames by MDL-ERROR Indication primitive.

2) Mode of Distributive Television Services
This sub-section illustrates transport of distributive television signals encoded by using MPEG2 with a constant bit rate described in Recommendation J.82.
a) Circuit rate at DL service boundary: Depending on MPEG2 parameters
b) Payload size to be encapsulated: see Table 22
c) Source clock frequency recovery: Asynchronous frequency
d) Error status indication at the receiver: count report of lost or duplicated frames by MDL-ERROR Indication primitive.

3) Mode of Conversational Services of Bit Rates Higher Than Primary Rates
This sub-section illustrates transport of interactive video signals for, i.e. video-telephony and conference application described in Recommendation H.310.
a) Circuit rate at DL service boundary: Depending on H.310 parameters
b) Payload size to be encapsulated: see Table 22
c) Source clock frequency recovery: Synchronous/Asynchronous per
Recommendation H.310
d) Error status indication at the receiver: count report of lost or duplicated frames by MDL-ERROR Indication primitive. Recommendation H.310 should be taken into account.

11.4.1.3 Processing Mode of Digital Channel Supported by 64 kbit/s-based ISDN

This sub-section presents the processing mode of digital channel supported by 64 kbit/s-based ISDN. Care should be taken to select the shortest transport path, control priority of delivery and transient, and reduce transport latency and latency variation along MSR during the project installation phase.

1) Mode of 64 kbit/s channel
a) Circuit rate at DL service boundary: 64 kbit/s
b) Payload size to be encapsulated: see Table 22
c) Source clock frequency recovery: Synchronous timing
d) Error status indication at the receiver: count report of lost or duplicated frames by MDL-ERROR Indication primitive.

2) Mode of 384, 1536 or 1920 kbit/s channel
a) Circuit rate at DL service boundary: 384, 1536 or 1920 kbit/s
b) Payload size to be encapsulated: see Table 22
c) Source clock frequency recovery: Synchronous timing
d) Error status indication at the receiver: count report of lost or duplicated frames by MDL-ERROR Indication primitive.

11.4.1.4 Processing Mode of Voice-band Signal

This sub-section presents the processing mode of 64 kbit/s A-law or μ-law coded Recommendation G.711 signals. Care should be taken to select the shortest transport path, control priority of delivery and transient, and reduce transport latency and latency variation along MSR during the project installation phase.

a) Circuit rate at DL service boundary: 64 kbit/s
b) Payload size to be encapsulated: see Table 22
c) Source clock frequency recovery: Synchronous timing
d) Error status indication at the receiver: count report of lost or duplicated frames by MDL-ERROR Indication primitive.

11.4.2 TCE Function of MSR Data Link 11.4.2.1 TCE Functions for Circuit

The following sections provide both asynchronous and synchronous TCE transport function along MSR or other topologies. Asynchronous and synchronous TCE supports transport of signals from constant bit rate sources whose clocks are non-frequency-locked and frequency-locked respectively to a network clock. Asynchronous examples are Recommendation G.702 signals at 1.544, 2.048, 6.312, 8.448, 32.064, 44.736 and 34.368 Mbit/s, Synchronous examples are at 64, 384, 1536 and 1920 kbit/s as described in Recommendation I.231.

1) Consideration of DL User Information
The length of the DL-SDU is 64 octets. A DL-SDU constitutes one DL PDU payload. For those DL users that require a peer-to-peer presetting of structured data, i.e. 8 kHz structured data for circuit mode bearer services of the 64 kbit/s-based ISDN.

2) Processing Strategy of Frame Delay Variation
A buffer mechanism is used to support this function. In the event of buffer underflow, it can be necessary for the DL to maintain bit count integrity by inserting the appropriate number of dummy bits. In the event of buffer overflow, it may be necessary for the DL to maintain bit count integrity by dropping the appropriate number of bits.

When Recommendation G.702 1.544-Mbit/s and 2.048-Mbit/s signals are being transported, the inserted dummy bits shall be all "1"s.

3) Processing Strategy of Lost and Duplicated Frames

A destination DL can determine whether the frames have been lost by tracking the Frame Sequence Number (FSN) or sequence count values of the received DL PDUs. Detected duplicated frames are discarded. The DL procedure to be used for sequence count processing is described in 11.5.2.

In order to maintain the bit count integrity of the DL user information, it may be necessary to compensate for lost frames detected by buffer underflow and sequence count processing by inserting the appropriate number of dummy payloads. The content of this dummy payload depends on the DL service being provided. For example, this dummy payload is all "1"s for Recommendation G.702 1.544 Mbit/s and 2.048-Mbit/s signals.

4) Guaranty of Jitter and Wander

This function is required for delivery of DL-SDUs to a DL user at a constant bit rate. Recovered source clock should meet the requirement of jitter and wander performance of the related Recommendation defined. For example, the jitter and wander performance for Recommendation G.702 signals is described in Recommendations G.823 and G.824, for which the DL procedure to be used.

11.4.2.2 TCE Functions of Video Signal

The following sections present processing of video signals for interactive and distributive services:

1) Consideration of DL User Information

The length of the DL-SDU is 188 octets. A DL-SDU constitutes one DL PDU payload.

For those DL users that require a peer-to-peer presetting of structured data. Depending on the type of DL service provided (i.e. the interface to the DL user), the ERROR parameter will be passed to the DL user to facilitate further picture processing.

2) Processing Strategy of Frame Delay Variation

A buffer mechanism is used to support this function. The size of this buffer is dependent upon descriptions video signal. In the event of buffer underflow, it may be necessary for the DL to maintain bit count integrity by inserting the appropriate number of dummy bits. In the event of buffer overflow, it may be necessary for the DL to maintain bit count integrity by dropping the appropriate number of bits.

3) Processing of Lost and Duplicated Frames

A destination DL can determine whether the frame has been lost by tracking the Frame Sequence Number (FSN) or sequence count values of the received DL PDUs. Detected duplicated frames are discarded. The DL procedure to be used for sequence count processing is described in 11.5.2.

In order to maintain the bit count integrity of the DL user information, it may be necessary to compensate for lost frames detected by buffer underflow and sequence count processing by inserting the appropriate number of dummy payloads. The content of this dummy payload depends on the DL service being provided.

Information in lost frames may be recovered by the mechanism described in e).

4) Guaranty of Jitter and Wander

This function is required for delivery of DL-SDUs to a DL user at a constant bit rate.

Some DL users may require source clock frequency recovery, i.e. recovery in the receive side of camera clock frequency that is not locked to the network clock. The DL procedures available for that purpose are given in 11.5.2.

11.4.2.3 TCE Functions of Voice-band Signal

The following sections support processing of a single voice-band signal, i.e. one 64 kbit/s A-law or -law coded Recommendation G.711 signal.

1) Consideration of DL User Information

The length of the DL-SDU is 64 octets. A DL-SDU constitutes one DL PDU payload.

2) Processing of Frame Delay Variation

A buffer mechanism is used to support this function. The size of this buffer depends on descriptions provided in voice-band signal.

3) Processing Strategy of Lost and Duplicated Frames

For voice-band signals, there is a need still to detect duplicated and lost frames.

The receiving DL entity must detect/compensate for lost frame events to maintain bit count integrity and must also minimize the delay, i.e. to alleviate echo performance problems, in conveying the individual voice-band signal octets from the DL-PDU payload to the DL user. The receiving DL entity may take actions based on the received Sequence Number values, but such actions must not increase the conveyance delay across the DL receiving entity to alleviate echo performance problems.

The DL receiving entity must accommodate a sudden increase or decrease in the nominal frame transfer delay. (A protection switching event in the MSR may result in a change of transfer delay.)

4) Guaranty of Jitter and Wander

The DL provides synchronous circuit transport for the voice-band signal.

NOTE 1—Example receiver techniques using a timing-based mechanism or a buffer-fill-based mechanism, possibly supplemented by a Sequence Number processing algorithm that does not introduce additional delay.

NOTE 2—For transporting signals of speech and 3.1 kHz audio bearer services as described in 64 kbit/s ISDN, the need for A/ -law conversion is identified. The conversion between A-law and -law coded PCM octets are as described in Recommendation G.711. This conversion function is outside the scope of this Patent.

11.4.2.4 TCE Functions of High Quality Audio Signal

The case is the same as the above. The TCE functions of high quality audio signals in DL include the following capabilities in principle.

a) Consideration of DL user information;
b) Processing strategy of frame delay variation;
c) Processing of lost and duplicated frames;
d) Guaranty of jitter and wander;

11.5 DL Protocol Involved to Support TCE

The following sub-sections describe DL procedures to be provided for implementing DL functions involved to support TCE.

11.5.1 Processing Strategy of Frame Sequence Number (FSN)

11.5.1.1 Processing in the Transmit Side

The DL provides a sequence count value and a DL indication associated with each DL-PDU payload in the transmit side. The count value applied to FSN field starts with 0, is incremented sequentially to 63 and is numbered modulo 64 when TT field is set to support TCE function. When the data link frames carrying TCE payloads traverse a MSR or other topologies, then may arrive destination station disorderly.

Due to this reason, it is required that frames must be delivered in order. Ensuring in-order delivery is also effective approach to out-of-order detection.

11.5.1.2 Processing in the Receive Side

The DL receives and derives the following information associated with each DL-PDU payload in receive side:
  sequence number;
  count;
  check error of the frame sequence number and count.

The implementation of sequence count values and number will be described on a service specific basis (e.g. REG_lost and REG_duplicated). The DL entity in the receive side identifies lost or duplicated DL-PDU payloads.

DL entity tracks the following status of dynamic data stream:
  DL-PDU payload sequence number and count;
  DL-PDU payload loss (if occur);
  DL-PDU payload duplication (if occur).

There are two ways to solve the real-time processing problem, (1) try to reorder and sort into the correct order or (2) drop those disordering frames, when disordering case occurred. In implementation, These two methods should be all supported. If method (1) does not meet reliability transport and performance requirement still, the method (2) will be applied. Due to the limitation of native speed and acceptable delay of data link payloads listed in Table 22, this Patent does not provide correction method for bit errors and frame losses.

11.5.2 Recovery Method of Timing and Structured Information

To support TCE services available in Table 22, the requirements of timing and structured information should be based on the native characteristics of the these services, and it is necessary for these TCEs to recover these signal characteristics as closely described in the related standard as possible in the receive side, including the signal jitter, bit-rate, timing characteristics and structured information transfer (if it has) as it was sent. In most application, STRUCTURE information could be provided by the transform and adaptation function of Tributary at the Tributary interface within a node since MSR-LEP uses pre-plan and connection oriented policy, and TCCR is made (e.g. ISDN 64 k/bits Tributary source in a node to ISDN 64 k/bits Tributary sink, E1 Tributary source in a node to E1 Tributary sink) by network management entity or control signalling before Tributary service is operated on-line.

For the timing characteristics, there are two methods involved: timing (synchronous) signalling broadcasted periodically from that designated station with an external synchronous source along the MSR ring or other topologies, or timing (synchronous) information received from an external facility for referencing to all stations.

SYNCHRONIZATION Request (Local NA, T_sync)

The signalling frame of broadcast SYNCHRONIZATION Request primitive has been assigned to have the highest priority among all other signalling frame defined in this Patent. The broadcasted period is Timer T_sync. Its default value is 8000 frames per second. This value is programmable and can be changed by network management entity.

SYNCHRONIZATION Confirm(Non parameter)

After getting the signalling flame of SYNCHRONIZATION Request, said each station will align the phase relations of its oscillator facility (including frequency-locked) and send SYNCHRONIZATION Confirm signalling frame with lower priority to that source station initiated the signalling frame of SYNCHRONIZATION Request. The codes of these two signalling are listed in the Table 5.

Since the service types and connection relations of TCEs from source to destination, including Node address, TT and TN, are pre-plan before service Tributary is operated, said initial timing (except for phase relations and actual bit-stream) and structured information should be pre-set by configuration function of network management entity before operation of those TCE services. The phase relations and actual bit-stream of TCE signals are designed to perform the extraction of output transmission bit timing information from the delivered frame stream, and requires a phase-locking mechanism.

11.6 Management Function Involved to Support TCE

The following functions is required to be provided to the network management entity:

11.6.1 TCE Property (Including Structured Information of Data Stream) Mismatch Between the Source and Destination The related operation is described detailed and refer to section 5.8.

12 Tributary Based Protection (TBP)

The said Tributary of this section is a logical service channel defined in 3.41, such as TCEs with a fixed value of Tributary Type (TT) and Tributary Number (TN) in the frame format. The application scope of Tributary based protection involved in this section is located at full-duplex point-to-point application only. The tributary protection operation of half-duplex point-to-point, multicast and broadcast will not be the scope of this section. A Node of MSR can provide support of multiple ETBP and Multiple TTBP at the same time.

12.1 TCE Tributary Based Protection (TTBP)

When needed to support the TTBP function, TTBP Function Unit embedded in the corresponding Tributary in DL entity will be activated by the configuration of network management (this configuration is performed either in the projection installation phase or MSR on-line operation phase) and the corresponding Tributary is set to a Working Tributary.

For Operation of 1+1 TTBP, it is needed to designate a mate Standby Tributary with the same service property, source and sink. The payloads of the mate Working Tributary and Standby Tributary carrying the same traffic are required.

For 1:1 TTBP, it is also needed to designate a mate Standby Tributary with the same service property, source and sink. The payloads of the Standby Tributary can run the other additional traffic (Once TTBP occurred for this Working Tributary, the additional traffic will be dropped out).

For 1:N TTBP, there are N Working Tributaries; it is also needed to designate a mate Standby Tributary with the same service property, source and sink. The payloads of the Standby Tributary can run the other additional traffic (Once TTBP in one of N Working Tributary occurred, this additional traffic will be dropped out).

The CS&NM operational codes of TTBP are listed in the Table 23.

TABLE 23

Codes of TTBP frame

| CS&NM Frame Types | Code |
| --- | --- |
| 1 + 1 TTBP_Request Frame | 00100111 |
| 1 + 1_TTBP_Response Frame | 00101000 |
| 1:1 TTBP_Request Frame | 00101001 |
| 1:1_TTBP_Response Frame | 00101010 |
| 1:N TTBP_Request Frame | 00101011 |
| 1:N_TTBP_Response Frame | 00101100 |
| TTBP_RECOVERY_EVENT_Report | 00101101 |

Note:
1 + 1 and 1:1 TTBP_Request Frame is a multicast frame and should be issued to four ends of two targeted Tributaries (including the working and standby tributaries) at the same time. 1:N TTBP_Request Frame is a multicast frame and should be issued to multiple ends of targeted Tributaries (including the N working tributaries and a standby tributary) at the same time.

The parameters of the 1+1, 1:1 and 1:N TTBP Response frame in this sub-section are described in Table 24.

TABLE 24

Parameters of Bandwidth Limitation_Response Frame

| CS&NM Frame Types | Code |
| --- | --- |
| TTBP successful | Binary "00000001 00010011 00000001 00000000" |
| TTBP unsuccessful | Binary "00000001 00010100 00000001 00000000" |

The parameters of 1+1 TTBP_Request Frame and 1:1 TTBP_Request Frame have the same format as that of the unicast mode of TCCR ID. This parameter consists of TNi ID (This is an identifier of Tributary p within node x), 2-bit U/M/B field, 14-bit length field (This filed is used to reflect the total number of Tributary TNj ID following length field, its value should be binary 000000 00000001) and a TNj ID (This is an identifier of Tributary q within node y).

Figure 10:
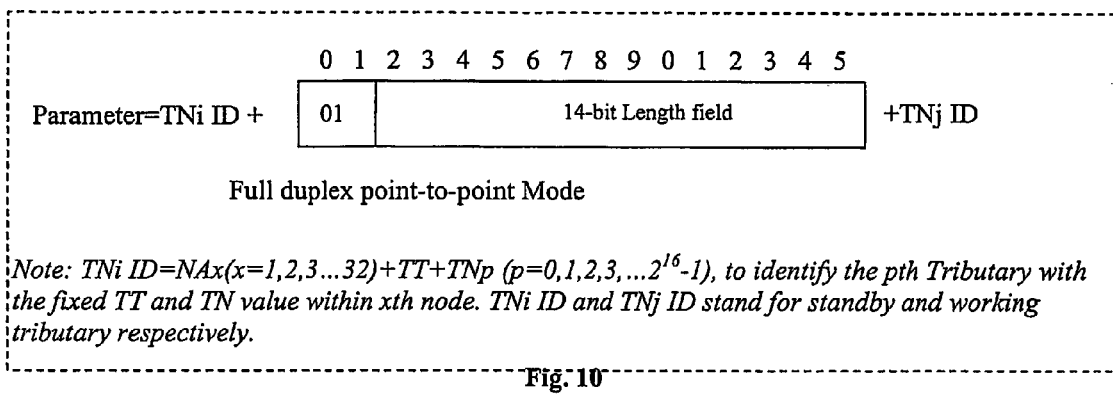
FIG. 10 shows expressions of 1+1 and 1:1 tributary protection parameters according to the invention.

FIG. 10 shows expressions of 1+1 and 1:1 tributary protection parameters according to the invention. In FIG. 10, TNi ID=NAx(x=1, 2, 3 ... 32)+TT+TNp (p=0,1, 2, 3, ... $2^{16}-1$), to identify the pth Tributary with the fixed TT and TN value within xth node. TNi ID and TNj ID stand for standby and working tributary respectively.

The parameters of 1+1 TTBP_Response Frame and 1:1 TTBP_Response Frame are the same as that of Request primitives above.

The parameters of 1:N TTBP_Request Frame have the same format as that of the multicast/broadcast mode of TCCR ID. This parameter also consists of TNi ID (This is an identifier of Tributary p within node x), 2-bit U/M/B field, 14-bit length field (This filed is used to reflect the total number of Tributary TNj ID following length field, its value should be binary 000000 00000001) and a TNj ID (This is an identifier of Tributary q within node y). Please refer to as FIG. 11.

Figure 11:
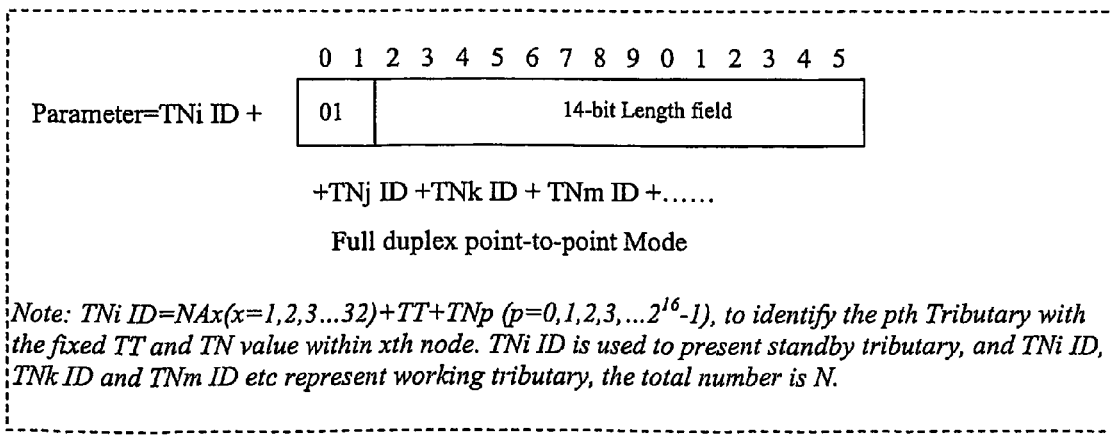
FIG. 11 shows EXPRESSIONS OF 1:N TRIBUTARY PROTECTION PARAMETER ACCORDING TO THE INVENTION.

FIG. 11 shows EXPRESSIONS OF 1:N TRIBUTARY PROTECTION PARAMETER ACCORDING TO THE INVENTION. In FIG. 11, TNi ID=NAx(x=1, 2, 3 ... 32)+TT+TNp (p=0,1, 2, 3, ... $2^{16}-1$), to identify the pth Tributary with the fixed TT and TN value within xth node. TNi ID is used to present standby tributary, and TNi ID, TNk ID and TNm ID etc represent working tributary, the total number is N.

The TTBP Function Unit is used to monitor the link status of Tributary by monitoring the peer link frames of an aggregate. Normally, the entity in the receive side of aggregate does always receive the MAC frame or Inter-frame Gap from the peer. No link-error occurs and no Error-Hello is also sent to the local Tributary entity within a node. It is local matter only and has not any associated frame to be used between the two sides.

- After initialization (the defaults of T_ttbp and N_ttbp are set to 10 mill-seconds and 3 respectively), the link entity enters the normal way of transmitter and receiver.
- If the timer T_ttbp expires before any MAC frame or Inter-frame Gap from the aggregate is received, the link entity of aggregate shall restart timer T_ttbp and decrement the retransmission counter N_ttbp.
- If the timer T_ttbp expires and retransmission counter N_ttbp has been decremented to zero before any MAC frame or Inter-frame Gap from the aggregate is received, the link entity of the aggregate shall inform the all local Tributary entities (within a node), which are set to have the other protection Tributary, of error report by sending a Error-Hello message from entity of the aggregate to those entities of Tributary within that node. After getting Error-Hello, the local Tributary entity will perform an action of TTBP (1+1, 1:1 or 1:N) to the corresponding Standby Tributary within the same node, change previous transmission channel of aggregate to the counter-rotating ringlet of pre-setting. After the entity of Tributary enters into the normal transmission operation, the local aggregate entity will restart timer T_ttbp and recover the value of N_ttbp. Every Standby Tributary has its T_ttbp and N_ttbp of itself.

The value of T_ttbp and N_ttbp shall be configurable. The minimum unit configured of T_ttbp and N_ttbp is 1 milliseconds and 1 respectively.

Once TTBP Function Unit detects that the failure span is recovered and enters normal status from the TTBP, TTBP Function Unit will wait T_ttbp_wtr (The default to 10 minutes, its value is also programmable and should be much greater than T_ttbp), and then switch to the Working Tributary. After switching to the Working Tributary, TTBP Function Unit issues a TTBP_RECOVERY_EVENT Report with parameters of TT and TN to network management entity.

13 Tributary Based Multicast (TBM)

The Tributary of this section is a logical service channel defined in 3.42, such as TCE with a fixed value of Tributary Type (TT) and Tributary Number (TN) in the MSR frame. The application scope of Tributary Based Multicast (TBM) is located at the operation of half-duplex point-to-multi-point only. The full-duplex point-to-point will not be recommended to the scope of this section.

The TBM Function Unit built in a MSR Node is defined to support one or more independent hierarch of multicast possibly involved the same or different TT at the same time. TBM Function Unit implements a duplication function within a node (station) from a Tributary getting a payload of DL frame from the related topologies (e.g. a N-ring structure) to other multiple Tributary with the same TT value and with being set to have a relation of membership group. A group of TN with the same TT value within a Node can be set to become a membership group. It is required that a designated Tributary in the membership group should receive data frames at the reference point T1 from the related topologies (e.g. a N-ring structure). This Patent presents this designated Tributary as a Source Tributary (ST). Once getting data frames, the ST duplicates those frames to every Tributary in the corresponding membership group within a node. The ST should be set and designated to a given value of TT and TN by network management entity during the project installation phase or on-line operation phase. The one or more STs can be designated or changed dynamically within a node according to the customer requirements.

The CS&NM operational codes of TBM are listed in the Table 25.

TABLE 25

Codes of TBM frame

| CS&NM Frame Types | Code |
| --- | --- |
| TBM_Request Frame | 00101101 |
| TBM_Response Frame | 00101110 |

If a TBP is applied to operation of TBM, it is recommended that a ST be designated to a Working Tributary, and the ST can also be operated to become the working Tributary of 1+1 and 1:1 application described in 12.1.

The parameters of TBM_Request and TBM_Response frame in this sub-section are described in Table 26 if the multicast/broadcast field is changed from "01," to "10" or "11".

TABLE 26

Parameters of TBM_Response Frame

| CS&NM Frame Types | Code |
|---|---|
| TBM successful | Binary "00000001 00010101 00000001 00000000" |
| TBM unsuccessful | Binary "00000001 00010110 00000001 00000000" |

14 Bandwidth Policing, Merging, Line-Speed Filtering, Stacking and Mirroring of Tributary 14.1 Tributary Based Policing—Bandwidth Limitation with Symmetry and Asymmetry TCE rate at DL service boundary should be operated and be fully compliant with the IEEE 802.3, G.702, ISDN and other related standards in the normal case. But in some application of service level agreement, the policy of operation and maintenance needs a limitation for rate to perform the bandwidth-based accounting. The MSR entity provides a Bandwidth Limitation Function Unit. When this Function Unit is activated to a Tributary, this Tributary provides configuration incremental level with minimum unit granularity (64 k/bits for TCE) from 0 to the standard value.

The corresponding standard values of bandwidth are described in the related standard and must not be passed over. Once bandwidth is set up for a Tributary during project installation or on-line operation phase, this programmable threshold limit applies to this Tributary and its corresponding port. The setting of bandwidth threshold and monitoring of actual traffic flow are performed by configuration function and management entity.

The CS&NM operational codes of Bandwidth Limitation are listed in the Table 27.

TABLE 27

Codes of Bandwidth Limitation frame

| CS&NM Frame Types | Code |
|---|---|
| Bandwidth Limitation_Request Frame | 00101111 |
| Bandwidth Limitation_Response Frame | 00110000 |

Note:
Bandwidth Limitation_Request Frame is a multicast frame and should be issued to two ends of targeted Tributary at the same time.

The parameter of Bandwidth Limitation Request Frame includes the following elements:

Targeted (Tributary) Port A: TNi=NAx+TT+TNp
Targeted (Tributary) Port B: TNj=NAy+TT+TNq
Bandwidth required to be provided from Port A to Port B: a designated integer value (an octet) between 0 and Standard Bandwidth, e.g. binary code: 01000100 represents 68*64 k/bits Bandwidth.
Bandwidth required to be provided from B to A: a designated integer value (an octet) between 0 and Standard Bandwidth, e.g. binary code: 00100000 represents 32*64 k/bits Bandwidth (This is an example of asymmetrical bandwidth availability), binary code: 00000000 represents no Bandwidth available, it is needed that customers use the operation of half duplex point-to-point from port A to port B.
Standard Bandwidth: the related standard (binary code of G.702 E1: 00100000) for TCE
Minimum Granularity: 64 k/bits (binary code: 0000001) for TCE
Bandwidth from port A to port B and from port B to port A is independent each other. The separated bandwidth can be symmetrical or asymmetrical. All of these elements will be mapped to CS&NM control frame in the above order. Bandwidth Limitation _Response Frame uses two parameters: Bandwidth Limitation successful or Bandwidth Limitation unsuccessful shown in the Table 28.

TABLE 28

Parameters of Bandwidth Limitation_Response Frame

| CS&NM Frame Types | Code |
|---|---|
| Bandwidth Limitation successful | Binary "00000001 00010111 00000001 00000000" |
| Bandwidth Limitation unsuccessful | Binary "00000001 00011000 00000001 00000000" |

Bandwidth Limitation of Tributary Based can be used to operations of half duplex point-to-point, full duplex point-to-point, multicast and broadcast.

14.2 Tributary Merging with Symmetry and Asymmetry

The MSR entity provides a Merging Function Unit by which up to sixteen Tributaries of the same TT can be merged together to form a Tributary Merging Group (TMG). Up to eight TMGs can be established in a MSR or other topology node. The TMG is similar to one logical link and is very useful when the higher bandwidth of application is required. The member Tributary of a TMG must be of the same TT and configured in full-duplex mode. The benefits of forming a TMG are link redundancy, aggregate throughput, incremental bandwidth and load balancing on the TMGs. Once a TMG is formed, a TMG of TCE must be identified using only a TN value (It is usual the first member Tributary) in the corresponding frames of data, signalling and network management. For the upper layer application over a TMG, a logical channel can only be seen externally.

The CS&NM operational codes of Tributary Merging are listed in the Table 29.

TABLE 29

Codes of Tributary Merging frame

| CS&NM Frame Types | Code |
|---|---|
| Tributary Merging_Request Frame | 00110001 |
| Tributary Merging_Response Frame | 00110010 |

The parameter of Tributary Merging_Request Frame includes the following elements:

First Targeted Tributary: TNi=NAx+TT+TNp
Second Targeted Tributary: TNj=NAy+TT+TNq
Third Targeted Tributary: TNk=NAz+TT+TNr
Fourth Targeted Tributary: . . .

Tributary Merging from A to B and from B to A is independent each other. The Tributary Merging of two half-duplex channels can be symmetrical or asymmetrical. All of these elements will be mapped to CS&NM control frame in the above order. Tributary Merging _Response Frame uses two parameters: Tributary Merging_successful or Tributary_Merging_unsuccessful shown in the Table 30.

TABLE 30

Parameters of Tributary Merging Response Frame

| CS&NM Frame Types | Code |
| --- | --- |
| Tributary_Merging_successful | Binary "00000001 00011001 00000001 00000000" |
| Tributary_Merging_unsuccessful | Binary "00000001 00011010 00000001 00000000" |

Tributary Merging can be used to operations of half duplex point-to-point and full duplex point-to-point.

14.3 Tributary Based Security—Line-Speed Filtering

The MSR entity provides a Line-Speed Filtering Function Unit (LSFFU) of Tributary based to Content-Aware frame classification, which enables a node processing application to filter and classify frames based on certain protocol fields of upper layer in the payload of frame. Filters can be set on the defined fields from Layer 2 to Layer 4 within a frame. LSFFU of a node can filter individual ingress or egress ports of Tributary. Filtering algorithm uses two constructs, (a) the filter mask, which defines which fields to filter, and (b) the rules table, which defines the filtering options. Up to 48 filters are available, each containing a 64-byte wide shuttered filter mask value to apply on any protocol field at any offset within the first 96 bytes of the incoming frame. The rule table is up to 256 entries deep for TCE Tributary.

Once the classification results and filter match or partial match have been gotten, the following policies can be taken, or in their combination:

Modification of the IP Type Of Service (TOS precedence) field

Delivery of a copy of the related frames to the domain of management

Discarding the related frames

Transferring the related frames to other egress port of a Tributary

Transmission of a copy of the related frames to the "mirrored to" Tributary

Modification of protocol field

The LSFFU provides the ability to track and profile up to 1024 data flows. The traffic on these data flows can be monitored or regulated via internal meters and has the ability to assign two independent policies to the profile status of a data flow and execute these actions at line rate.

The CS&NM operational codes of Line-Speed Filtering are listed in the Table 31.

TABLE 31

Codes of Line-Speed Filtering frame

| CS&NM Frame Types | Code |
| --- | --- |
| Line-Speed Filtering_Request Frame | 00110011 |
| Line-Speed Filtering_Response Frame | 00110100 |

The parameter of Line-Speed Filtering Request Frame includes the following elements:

Targeted Tributary: TNi=NAx+TT+TNp

Modification of the IP Type Of Service (TOS precedence) field, binary code: 10000001, the detailed operation is under study. Otherwise, binary code: 00000000 will be used.

Delivery of a copy of the related frames to the domain of management, binary code: 10000010 represents that action of "Delivery of a copy of the related frames to the domain of management" will be taken. Otherwise, binary code: 00000000 will be used.

Discarding the related frames, binary code: 10000011 represents that action of "Discarding the related frames" will be taken. Otherwise, binary code: 00000000 will be used.

Transferring the related frames to other egress port of a Tributary, binary code: 10000100 represents that action of "Transferring the related frames to other egress port of a Tributary (This Tributary is presented as TNj=NAx+ TT+TNq)" will be taken. So the octet "10000100" plus "TNj" will be used for this function. Otherwise, binary code: 00000000 will be used.

Modification of protocol field, binary code: 10000101, the detailed operation is under study. Otherwise, binary code: 00000000 will be used.

Line-Speed Filtering from A to B and from B to A is independent each other. The Line-Speed Filtering of two half-duplex channels can be selected to use or not use. All of these elements will be mapped to CS&NM control frame in the above order. Line-Speed Filtering_Response Frame uses two parameters: Line-Speed Filtering successful or Line-Speed Filtering unsuccessful shown in the Table 34.

TABLE 34

Parameters of Line-Speed Filtering Response Frame

| CS&NM Frame Types | Code |
| --- | --- |
| Line-Speed_Filtering_successful | Binary "00000001 00011011 00000001 00000000" |
| Line-Speed_Filtering_unsuccessful | Binary "00000001 00011100 00000001 00000000" |

Tributary Merging can be used to operations of half duplex point-to-point and full duplex point-to-point.

15 Topology Application of Single Fibre Ring, Link-type, Broadcast Network and Pseudo-mesh 15.1 Support of a Single Fibre Ring MSR is defined for a default application on a N-ring structure. In some case of access, due to the limitation of fibre resource in which two fibres are available to a ring, it is recommended that a single fibre ring shown in the FIG. 12 be applied. If the topology is involved in FIG. 12, the L2PS of Aggregate Pipe based, data node insertion and deletion should not be used. Instead, these functions will be switched off via configuration function of the network management. The data and control packet will share the same channel and (N−1)WR/NWR field is always set to "0".

Figure 12:
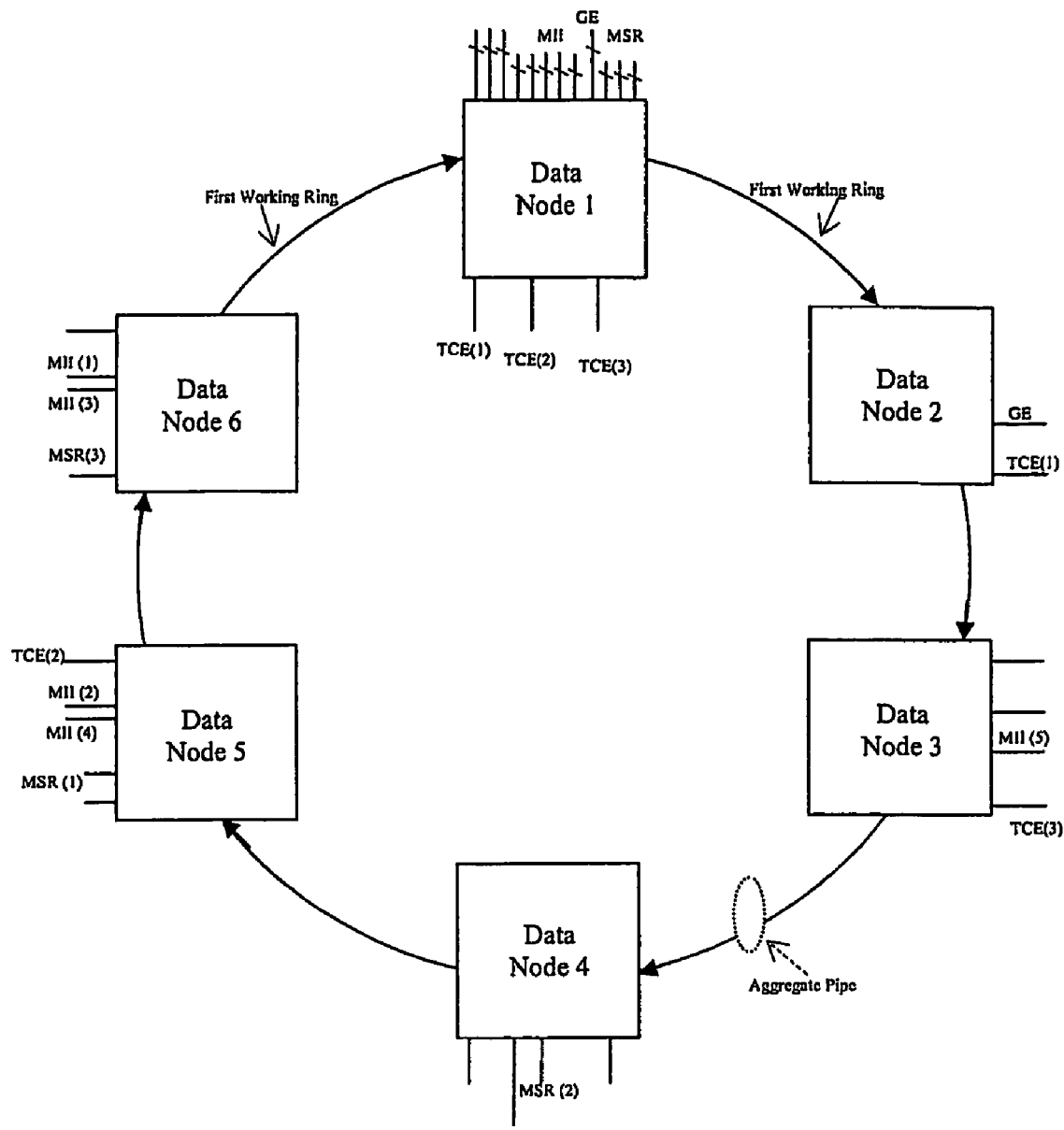
FIG. 12 is the Single Fibre Ring of MSR according to the ;another embodiment of the invention.

FIG. 12 is the Single Fibre Ring of MSR according to the; another embodiment of the invention;

15.2 Support of a Link-type with Adding and Dropping Tributary Services

Figure 13:
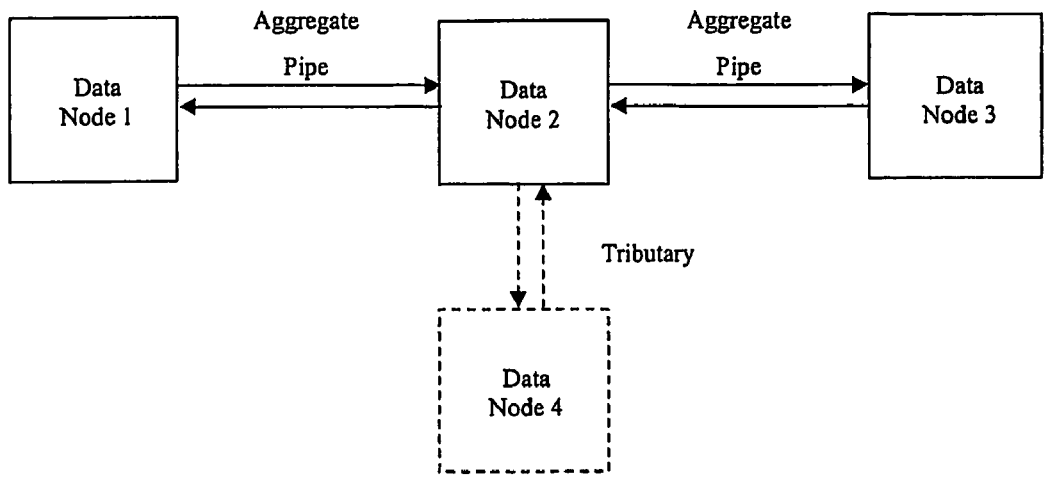
FIG. 13 shows A MSR Topology, Link-type with Adding and Dropping Tributary Services according to the invention.

In some application, it is needed to build a link-type topology shown in the FIG. 13 in which the connection between Node 2 and Node 4 (it is suppositional) is one or more Tributaries. This Tributary may be a Tributary of other MSR. If the topology is involved in FIG. 13, the L2PS of Aggregate Pipe based, data node insertion and deletion should not be used. Instead, these functions will be switched off via configuration function of the network management. The data and control packet will share the same channel and (N−1)WR/NWR field is always set to "0".

Figure 14:
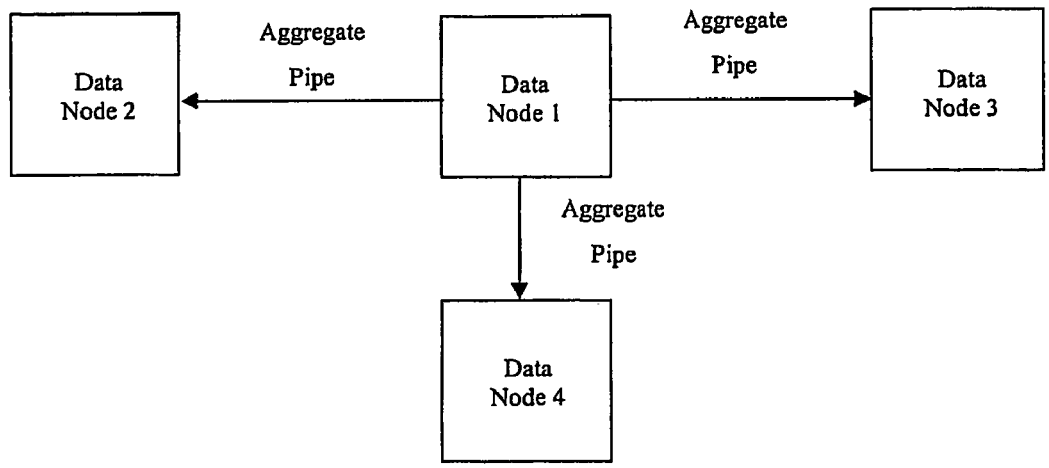
FIG. 14 shows a MSR Topology, Broadcast Connection to DVB Application according to the present invention.
Figure 15:
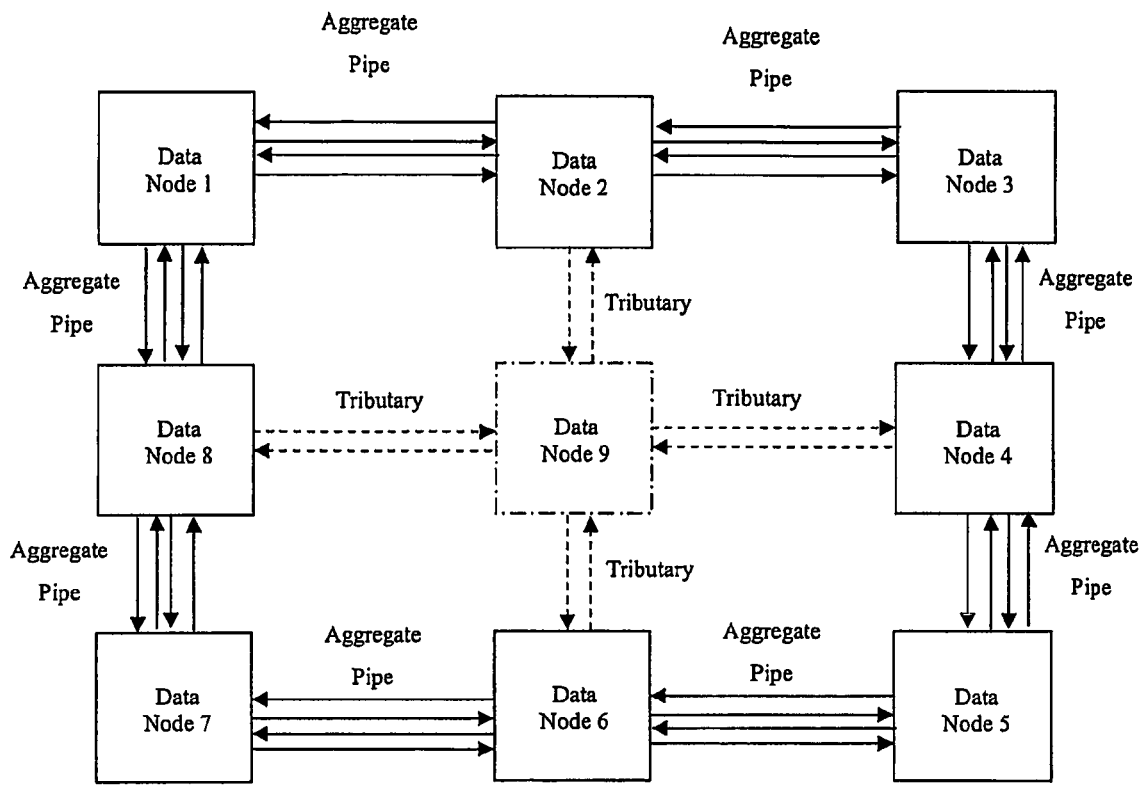
FIG. 15 shows a MSR Topology, Pseudo-mesh Connection according the invention.

FIG. 13 shows A MSR Topology, Link-type with Adding and Dropping Tributary Services according to the invention;

FIG. 14 shows a MSR Topology, Broadcast Connection to DVB Application according to the present invention;

FIG. 15 shows a MSR Topology, Pseudo-mesh Connection according the invention;

15.3 Support of a Broadcast Connection to DVB Application

In DVB application for example, it is needed to build a broadcast network topology shown in the FIG. 14 in which the connections from Node 1 to Node2/3/4 are aggregate pipes of single direction. If the topology is involved in FIG. 14, the L2PS of aggregate pipe based, data node insertion and deletion, Tributary based Protection and in-band network management should not be used. Instead, these functions will be switched off via configuration function of the network management. The data and control packet will share the same channel and (N−1)WR/NWR field is always set to "0".

15.4 Support of a Pseudo-mesh Topology

Pseudo-mesh Topology presented in FIG. 20 is a particular example of MSR ring. Eight Nodes via aggregate pipe are attached together to form a MSR ring. This Tributary may be an aggregate pipe of other MSR span with a lower rate than that of this aggregate pipe. The Tributaries of Node 2, 4, 6 and 8 are connected to the Node 9 (it is suppositional). In this application, all function and descriptions described in the patent can be used effectively.

16 The Physical Architecture of a MSR Node

A physical architecture of a MSR node (out-of-band CS&NM bus) consists of (1) Aggregate circuit board (for working mode), which is responsible for the Aggregate. Processor, schedule of traffic bus from all tributaries, Routing Engine, L3 packet forwarding for IP packet, Processing unit of control signalling & Network Management within a node;

(2) Aggregate circuit board (for protection mode), which is responsible for the aggregate processor, schedule of traffic bus from all tributaries, routing engine, L3 packet forwarding for IP packet, processing unit of control signalling & network management within a node when aggregate circuit board (for working mode) is detected to be involved in failure. If the working board is recovered from failure, this board will be go back to protection mode.(3) CWDM/DWDM unit, which is in charge of transmission of multiple aggregates. For the CWDM, the aggregate will be FEs and GEs. For the DWDM, the aggregate is 10GE.

(4) Tributary circuit board, which is in charge of receive and transmission by traffic bus from Aggregate circuit board, the adaptation and processing of various independent adding/dropping tributary channel to/from the MSR data nodes, just like a series "Private Line or Private Circuit for Renting from Carrier". Tributary can be a various G.702 interfaces, ISDN, DVB, audioband, videoband. The different tributary can be assigned to different priority. In the transmission side, all services are sent in packet way after adaptation function of Tributary circuit board is performed. The access of all services is implemented in this board. This board does also receive CS&NM message from CS&NM bus.

(5) Traffic bus, which is responsible for the traffic information exchange between Aggregate circuit board and Tributary circuit board.

(6) CS & NM bus, which is responsible for the information exchange of CS& NM between Aggregate circuit board and Tributary circuit board. The PCI bus or RS-485 is a example of CS&NM bus.

Figure 16:
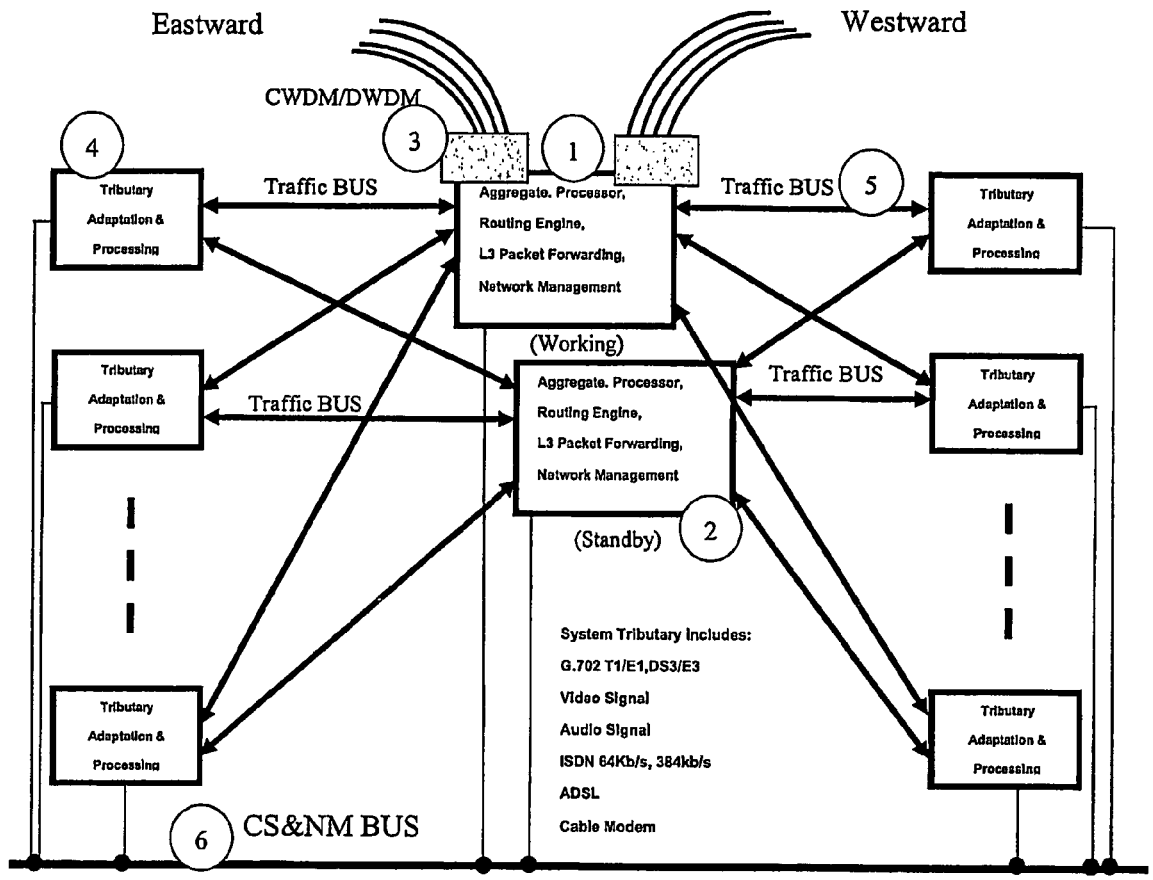
FIG. 16 shows the Physical Architecture of a MSR node (Out-of-band CS&NM Bus) according to one embodiment according to the present invention.

Please refer to as FIG. 16. FIG. 16 shows the Physical Architecture of a MSR node (Out-of-band CS&NM Bus) according to one embodiment according to the present invention.

Figure 17:
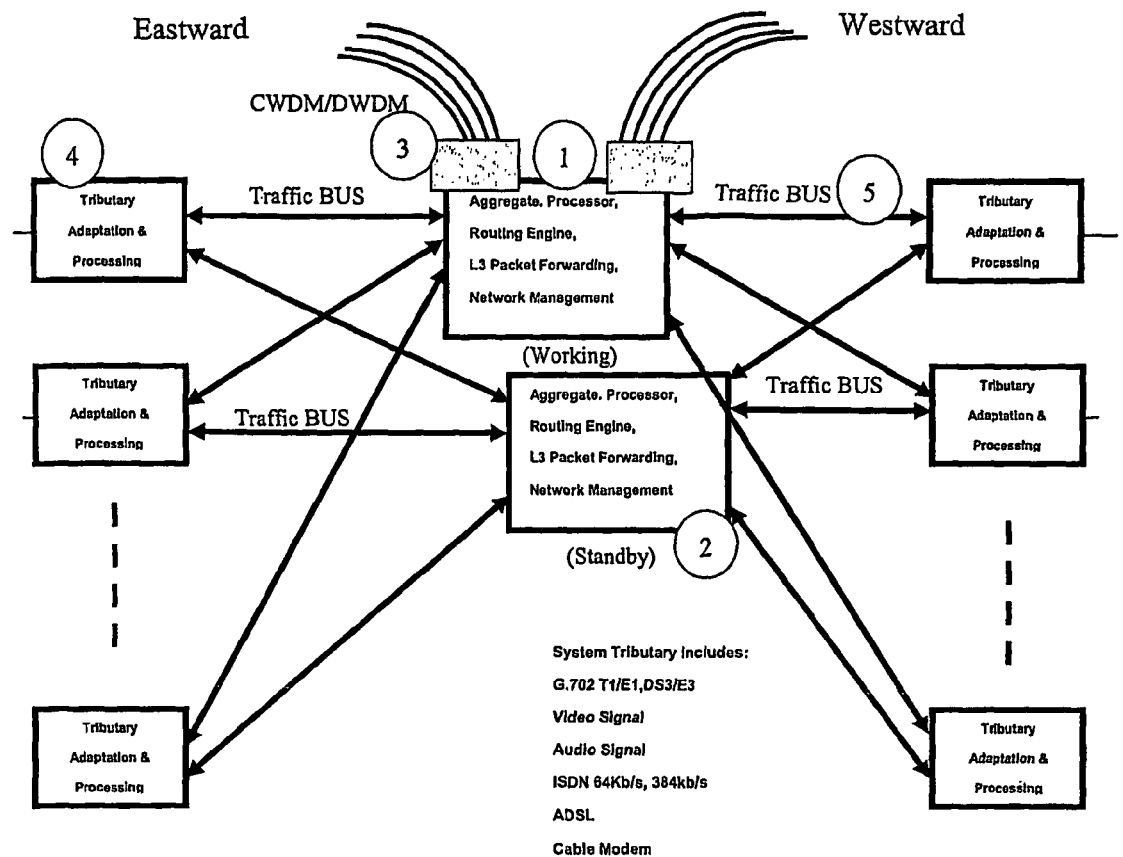
FIG. 17 is the Physical Architecture of a MSR node (in-band CS&NM Bus) according to one embodiment of the invention.

The FIG. 17 shows a physical architecture of a MSR node (in-band CS&NM bus) consisting of (1) Aggregate circuit board (for working mode), (2) Aggregate circuit board (for protection mode), (3) CWDM/DWDM unit, (4) Tributary circuit board, this board does also receive CS&NM message from traffic bus.

(5) Traffic bus, which is responsible for the traffic information exchange between Aggregate circuit board and Tributary circuit board.

(6) CS & NM bus shares the physical channel of traffic, which is responsible for the information exchange of CS& NM between Aggregate circuit board and Tributary circuit board.

Figure 18:
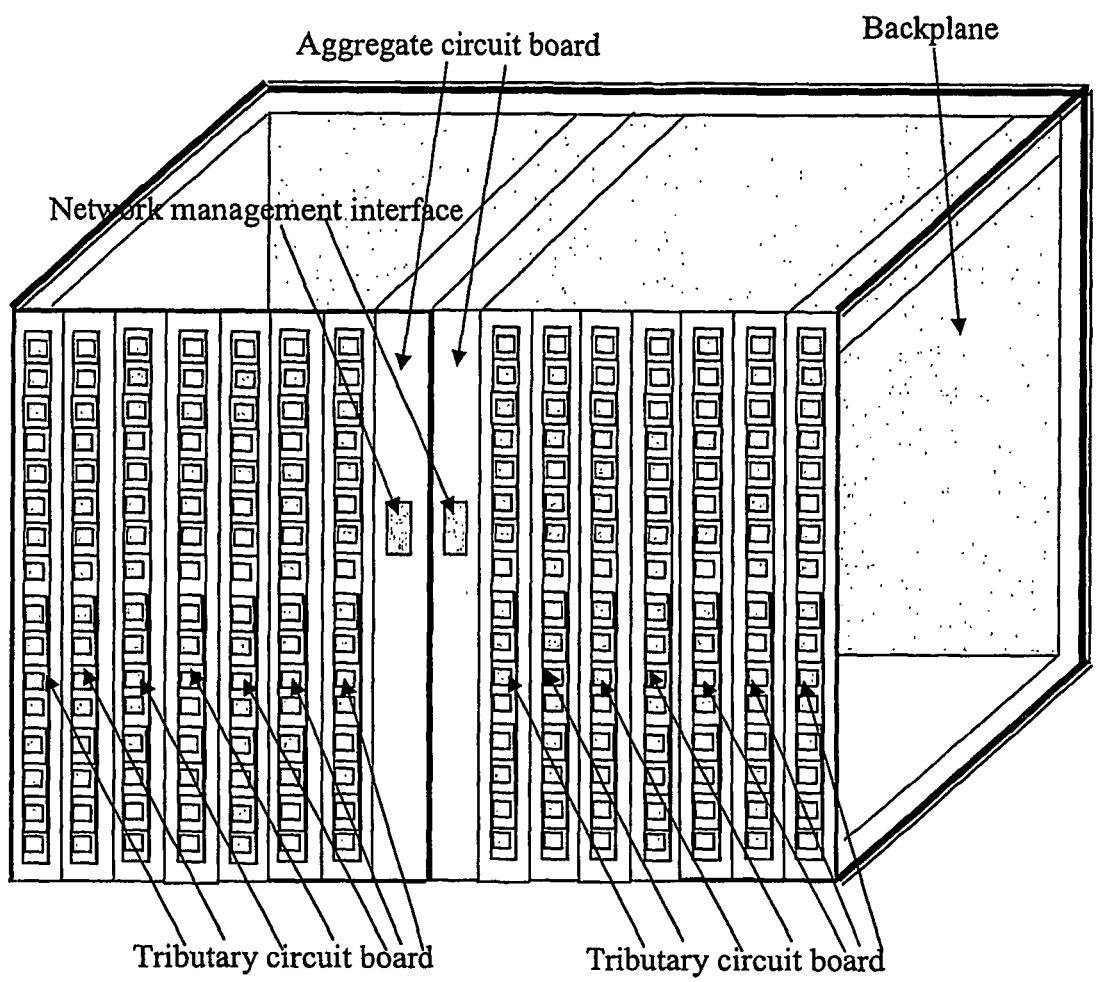
FIG. 18 is Layout of system equipment of a MSR node according to one embodiment of the invention.

FIG. 17 is the Physical Architecture of a MSR node (in-band CS&NM Bus) according to one embodiment of the invention;

FIG. 18 is Layout of system equipment of a MSR node according to one embodiment of the invention.

The layout of system equipment of a MSR node is shown in FIG. 18, including the shelf, backplane, Aggregate circuit board (for working and protection respectively), fourteen Tributary circuit boards, network management interface etc.

17. CWDM/DWDM Unit

This unit is used to two-fibre and multiple wavelength transmission based on coarse wavelength division multiplex (CWDM) or dense wavelength division multiplex (DWDM). When CWDM is used in N-ringlet architecture, N can be 4, 8, 16 and the aggregate can be FE/GE/10GE. If DWDM is used in N-ringlet architecture, N can be 8, 16, 32, 64, 128, 256, 512 and 1024 and the aggregate must be 10GE with Wide Area Interface—SONET (Synchronous Optical Network) transmission, or using STM-16/OC-48 channel (into DWDM) in which STM-16/OC-48 carries GEs and FEs.

INDUSTRIAL APPLICABILITY

The present invention can provide the following capabilities:

(1) The protocol encapsulation and transport of G.702 PDH circuit—Synchronous and asynchronous circuit transport, Video signal, Voiceband signal, Digital channel supported by 64 kbit/s-based ISDN etc over a two-fibre ring, a single fibre ring, a link-type and broadcast topology of fibres.

(2) Service (or tributary) based protection of 1+1, 1:1, and 1:N models within 50 ms.

(3) Service or tributary based multicast and station-based multicast and broadcast.

(4) Bandwidth limitation of service (or tributary) based with symmetry and asymmetry.

(5) Tributary merging with symmetry and asymmetry.

(6) Line-speed filtering of tributary based.

(7) Tributary based performance monitoring in 15-minute and 24-hour.

(8) Mirroring of tributary.

(9) Frame based transparent PPPoE and PPPoA transport from access to backbone along a MSR ring or other topologies, in order to simplify accounting mechanism (e.g. Radius), reduce maintenance work, and improve latency variation (compared to Layer 2 and Layer 3 switch) in Access Network Application.

This application will be used to Metro Area Network, concentrator of telecom and datacom, enterprise and campus network, and other private network. The related network may include interface to coarse wavelength division multiplex (CWDM) or dense wavelength division multiplex (DWDM) equipments.

It is to be understood that the above descriptions should not be construed as limitations on the scope of the invention, but rather as an exemplification of preferred embodiments thereof. Accordingly, the scope of the invention should be determined by the appended claims and their equivalents. Any variations or modifications within the spirit and scope of the invention are covered by the appended claims.

The invention claimed is:

1. A data transmission apparatus for use in a multiple service ring comprising at least two nodes transmissively coupled to at least one aggregate pipe and to at least one tributary, said data transmission apparatus comprising:
a tributary receiving (RX) framer transmissively coupled to a tributary, the tributary RX framer for deframing data frames received from said tributary and for extracting destination node addresses from received data frames;
a transmitting (TX) framer for encapsulating destination node addresses and data received from the tributary into data frames for the multiple service ring and for transmitting the data frames for the multiple service ring along an aggregate pipe to a downstream neighbor node in the multiple service ring;
a RX framer for receiving, and for deframing, data frames from the multiple service ring from an upstream neighbor node along an aggregate pipe of the multiple service ring to obtain at least destination node addresses and data;
a filter for determining data frames for a local node based on at least one obtained destination node address, and for forwarding other data frames that are not for the local node to said TX framer to forward to another node of the multiple service ring;
a tributary TX framer for encapsulating data frames for the local node into tributary data frames and for sending the tributary data frames to a corresponding tributary;
wherein at least one aggregate pipe in the multiple service ring has an N-ring structure comprised of N−M unidirectional ringlets and M unidirectional counter-rotating ringlets, where N and M are integers and $1 \leq M < N$; and
a ring management unit for controlling use of ringlets in the at least one aggregate pipe, wherein controlling use of ringlets comprises assigning an (n−1)-th ringlet to transport data packets in a unidirectional direction and an n-th ringlet to transport control packets in a direction opposite to the unidirectional direction, where $1 < n \leq N$.

2. The data transmission apparatus according to claim 1, wherein said n-th ringlet comprises a protection channel for the (n−1)th ringlet in case of failure of, or signal degradation of, the (n−1)th ringlet.

3. The data transmission apparatus according to claim 1, further comprising means for setting-up an identifier for use in identifying an originating tributary, wherein the identifier is encapsulated with a destination node address and data received from the tributary in at least one data frame for the multiple service ring.

4. The data transmission apparatus according to claim 3, further comprising means for determining a tributary type and a tributary number from at least one of the data frames for a local node for use in sending tributary data frames to a corresponding tributary.

5. The data transmission apparatus according to claim 4, wherein data frames of the multiple service ring comprise FE/GE/10GE MAC frames.

6. The data transmission apparatus according to claim 5, further comprising a CWDM/DWDM (Coarse Wavelength Division Multiplex/Dense Wavelength Division Multiplex) unit for transmitting multiple aggregates, wherein:
for CWDM, an aggregate comprises FE, GE and 10GE frames, where N=4, 8, or 16; and
for DWDM, an aggregate comprises 10GE frames using Wide Interface sublayer-SONET (Synchronous Optical Network) transmission, or comprises GE and FE frames using an STM-16/OC-48 channels wherein, for DWDM, N is at most 1024.

7. The data transmission apparatus according to claim 1, wherein aggregate pipes in the multiple service ring comprise link and broadcast topologies.

8. The data transmission apparatus according to claim 1, wherein one of the ringlets comprises a protection channel for at least one other of the ringlets.

9. A data transmission method used with a multiple service ring that comprises at least two nodes transmissively coupled to at least one aggregate pipe and to at least one tributary, said method comprising:
(A) for data frames from a tributary:
receiving the data frames from the tributary;
deframing data frames received from said tributary;
extracting destination node addresses from received data frames;
encapsulating extracted destination node addresses and data received from the tributary into data frames for the multiple service ring; and
transmitting the data frames for the multiple service ring along an aggregate pipe to a downstream neighbor node in the multiple service ring; and
(B) for data frames from a neighbor node that is upstream along an aggregate pipe in the multiple service ring:
receiving data frames from the neighbor node that is upstream;
deframing received data frames to obtain at least destination node addresses and data;
determining data frames for a local node based on at least one obtained destination node address;
forwarding other data frames that are not for the local node to another node of the multiple service ring;
encapsulating data frames for the local node into tributary data frames; and
sending the tributary data frames to a corresponding tributary;
wherein at least one aggregate pipe in the multiple service ring has an N-ring structure comprised of N−M unidirectional ringlets and M unidirectional counter-rotating ringlets, where N and M are integers and $1 \leq M < N$; and
wherein the method further comprises controlling use of ringlets in the at least one aggregate pipe, wherein controlling use of ringlets comprises assigning an (n−1)-th ringlet to transport data packets in a unidirectional direction and an n-th ringlet to transport control packets in a direction opposite to the unidirectional direction, where $1 < n \leq N$.

10. The data transmission method according to claim 9, wherein said n-th ringlet comprises a protection channel for the (n−1)th ringlet in case of failure of, or signal degradation of, the (n−1)th ringlet.

11. The data transmission method according to claim 9, wherein, for data frames from the neighbor node that is upstream, said method further comprises:
setting-up an identifier for use in identifying an originating tributary, wherein the identifier is encapsulated with a destination node address and data received from the tributary in at least one data frame of the multiple service ring.

12. The data transmission method according to claim 11, further comprising determining a tributary type and tributary number from at least one of the data frames for a local node for use in sending tributary data frames to a corresponding tributary.

13. The data transmission method according to claim 12, wherein data frames of the multiple service ring comprise FE/GE/10GE MAC frames.

14. The data transmission method according to claim 13, wherein multiple aggregates are transmitted using CWDM/DWDM (Coarse Wavelength Division Multiplex/Dense Wavelength Division Multiplex), wherein:

for CWDM, an aggregate comprises FE, GE, and 10GE frames, where N=4, 8 or 16; and for DWDM, an aggregate comprises 10GE frames using Wide Interface sublayer-SONET (Synchronous Optical Network) transmission, or comprises GE and FR frames using an STM-16/OC-48 channel, wherein, for DWDM, N is at most 1024.

15. The data transmission method according to claim 9, wherein aggregate pipes in the multiple service ring comprise link and broadcast topologies.

16. The data transmission method according to claim 9, wherein one of the ringlets comprises a protection channel for at least one other of the ringlets.

\* \* \* \* \*

UNITED STATES PATENT AND TRADEMARK OFFICE
CERTIFICATE OF CORRECTION

PATENT NO. : 7,778,162 B2  Page 1 of 1
APPLICATION NO. : 10/534211
DATED : August 17, 2010
INVENTOR(S) : Shaohua Yu It is certified that error appears in the above-identified patent and that said Letters Patent is hereby corrected as shown below:

Column 50, Line 6, Claim 6:
delete "channels" and insert -- channel, --, therefor.

Signed and Sealed this
Twenty-eighth Day of February, 2012

David J. Kappos
*Director of the United States Patent and Trademark Office*